(12) United States Patent
Lim

(10) Patent No.: US 11,093,007 B2
(45) Date of Patent: Aug. 17, 2021

(54) IMAGE DISPLAY DEVICE HAVING KEYBOARD AND KEYBOARD UNIT THEREFOR

(71) Applicant: GANANHANDONGJIDUL INC., Seoul (KR)

(72) Inventor: You Seob Lim, Goyang-si (KR)

(73) Assignee: GANANHANDONGJIDUL INC., Seoul (KR)

( * ) Notice: Subject to any disclaimer, the term of this patent is extended or adjusted under 35 U.S.C. 154(b) by 0 days.

(21) Appl. No.: 16/634,879

(22) PCT Filed: Jul. 30, 2018

(86) PCT No.: PCT/KR2018/008649
§ 371 (c)(1),
(2) Date: Jan. 28, 2020

(87) PCT Pub. No.: WO2019/027213
PCT Pub. Date: Feb. 7, 2019

(65) Prior Publication Data
US 2020/0233465 A1 Jul. 23, 2020

(30) Foreign Application Priority Data

Jul. 31, 2017 (KR) .................. 10-2017-0096694

(51) Int. Cl.
*G06F 1/16* (2006.01)
(52) U.S. Cl.
CPC .......... *G06F 1/1669* (2013.01); *G06F 1/1616* (2013.01); *G06F 1/1647* (2013.01);
(Continued)

(58) Field of Classification Search
CPC .... G06F 1/1669; G06F 1/1616; G06F 1/1647; G06F 1/1652; G06F 1/1686;
(Continued)

(56) References Cited

U.S. PATENT DOCUMENTS 9,651,987 B2 * 5/2017 Yeo ....................... G06F 1/1669
2002/0024499 A1 * 2/2002 Karidis ................ G06F 1/1632
345/156
(Continued)

FOREIGN PATENT DOCUMENTS

KR 10-2002-0062714 A 4/2004
KR 1020040033569 A 4/2004
(Continued)

*Primary Examiner* — Abhishek M Rathod
(74) *Attorney, Agent, or Firm* — Patent Office of Dr. Chung Park

(57) ABSTRACT

The present invention relates to a foldable image display device or a foldable and rollable composite application image display device, which has a flexible display device capable of meeting requirements for a large screen and portability. The image display device having a keyboard is configured such that in a minimized state of the image display device, an attachable/detachable keyboard unit is mounted on the body of the image display device so that the attachable/detachable keyboard unit can be carried as a single piece with the image display device, and in a partially unfolded or wholly unfolded state of the image display device, the keyboard unit is detached to function as a keyboard, where a camera unit applied to the keyboard unit recognizes a user's one-handed gesture, such that it is possible for a user to perform tasks with the device even in the absence of a mouse.

17 Claims, 63 Drawing Sheets

(52) U.S. Cl.
CPC .......... *G06F 1/1652* (2013.01); *G06F 1/1686* (2013.01); *G06F 1/1698* (2013.01)

(58) Field of Classification Search
CPC ...... G06F 1/1698; G06F 1/1673; G06F 3/021; G06F 3/017; G06F 3/0304; G06F 3/0425; G06F 1/1641; G06F 1/1666
See application file for complete search history.

(56) References Cited

U.S. PATENT DOCUMENTS

| | | | | |
|---|---|---|---|---|
| 2003/0081375 | A1* | 5/2003 | Yamamoto | G06F 1/1624 361/679.3 |
| 2006/0104013 | A1* | 5/2006 | Sakakibara | G06F 1/1656 361/679.11 |
| 2011/0187646 | A1* | 8/2011 | Mahmoud | G09G 5/00 345/168 |
| 2012/0314399 | A1* | 12/2012 | Bohn | G06F 1/1652 362/97.1 |
| 2013/0021762 | A1* | 1/2013 | van Dijk | H05K 5/0226 361/749 |
| 2013/0100027 | A1* | 4/2013 | Wang | G06F 1/1643 345/168 |
| 2013/0148282 | A1* | 6/2013 | Chen | G06F 1/1601 361/679.08 |
| 2013/0203473 | A1* | 8/2013 | Kota | H04M 1/23 455/575.8 |
| 2013/0257733 | A1* | 10/2013 | Moore | G06F 1/1669 345/168 |
| 2014/0185218 | A1* | 7/2014 | Chen | G06F 1/1669 361/679.09 |
| 2014/0347812 | A1* | 11/2014 | Lee | G06F 1/1679 361/679.55 |
| 2015/0062792 | A1* | 3/2015 | Lee | G06F 1/166 361/679.09 |
| 2016/0139629 | A1* | 5/2016 | Yeo | G06F 1/1666 361/679.27 |
| 2016/0277562 | A1* | 9/2016 | Chen | H04M 1/72575 |
| 2016/0320807 | A1 | 11/2016 | Lee et al. | |
| 2019/0306290 | A1* | 10/2019 | Lee | G06F 1/1641 |

FOREIGN PATENT DOCUMENTS

| | | |
|---|---|---|
| KR | 1020130102872 A | 9/2013 |
| KR | 1020140054498 A | 5/2014 |
| KR | 1020160059054 A | 5/2016 |

\* cited by examiner

Diverse hand gestures

IMAGE DISPLAY DEVICE HAVING KEYBOARD AND KEYBOARD UNIT THEREFOR

CROSS-REFERENCE TO PRIOR APPLICATIONS

This application is a national Stage Patent Application of PCT International Patent Application No. PCT/KR2018/008649, filed on Jul. 30, 2018 under 35 U.S.C. § 371, which claims priority of Korean Patent Application No. 10-2017-0096694, filed on Jul. 31, 2017, which are all hereby incorporated by reference in their entirety.

TECHNICAL FIELD

In an image display device provided with a flexible display device which can satisfy a large screen and portability, the present invention relates to an image display device provided with a keyboard, which can increase portability as a keyboard unit works as a cover and maintains a minimum thickness when the keyboard unit is mounted and folded, implement a large screen when the keyboard unit is mounted and unfolded, and provide a user with input convenience like using a mouse without a physical input device such as a mouse by sensing a motion of any one hand of the user using a raisable camera unit applied to the keyboard unit, in addition to allowing free keyboard input like a notebook computer or a desktop computer when the keyboard unit is withdrawn or detached to be unfolded.

BACKGROUND ART

Although a patent which applies a video input device to a keyboard is presented to further accurately input a video chatting screen of a user after a video input device begins to be applied to a desktop computer (Korean Patent Registration No. 10-2002-0062714), it is not generalized.

After the appearance of smart phones and tablet computers as a mobile device provided with excellent portability, easy Internet searching, and photographing functions, user's environment has been rapidly moved from desktop environment to mobile environment.

However, although conventional shape-invariant plate-shape smart phones are convenient to use image information, they are inconvenient to be used as a productivity tool since keyboard input and mouse input are limited unlike the desktop or notebook computers.

Similarly, although shape-invariant tablet devices of a plate shape also have difficulties in keyboard input and mouse input, some problems of the keyboard input have been solved as two-in-one products having a detachable cover applying a keyboard function on one side which covers the screen display surface of the tablet device are released. However, the problems such as inconvenience of portability that cannot be gripped with one hand, occurrence of keyboard contact scratches on the screen display surface, and limited use of a mouse input device that is important as a productivity tool have not been solved yet.

Although notebook computers widely used in the present are evaluated as a productivity tool that can be carried within a limited range as a keyboard is provided on one side of a folding surface, it does not satisfy high-level portability such as one-hand grip due to the limitation of shape invariant.

In addition, an image display device to which a flexible display device that can be folded and rolled will be applied needs to protect the screen display surface, in addition to the folding or rolling occurrence area that is a vulnerable portion of the flexible display device, from scratches or dents, and therefore, unlike the plate-shape smartphones and tablet computers, it inevitably requires to provide a cover case in the image display device itself, or customers need to purchase and apply a cover case later as an additionally applied product.

In addition, the trend in the size of a plate-shape smart phone is presently moving from products having an aspect ratio of 16:9 to products of 18:9, and it is expected that the ratio of 18:9 will be maintained and applied even in a folded state of an image display device, to which a flexible display device expected to be released in the future is applied, and if it is considered to virtually project keys of a keyboard on the plate-shape surface of a smartphone itself having a ratio of 18:9, the size will be reached as to be capable of fully configuring keyboard keys without significant reduction.

DISCLOSURE OF INVENTION

Technical Problem

The technical problems to be solved by the present invention are as follows.

First, a detachable or withdrawable keyboard unit is applied to an image display device provided with a flexible display device that can be bent, rolled or expanded (an infolding image display device, an outfolding image display device, a dual-folding image display device implementing both infolding and outfolding, a rollable infolding image display device, or a rollable outfolding image display device) to have its own keyboard input function in an unfolded state without increasing thickness of a folded state.

Second, a user may perform mouse input without separately carrying and using a physical mouse device in an unfolded state, without increase of thickness when the image display device is folded.

Third, the image display device itself may protect the screen display surface of an outfolding image display device and portions vulnerable in relation to folding.

Fourth, the image display device may perform its own drop shock absorption.

Technical Solution

To accomplish the above objects, according to one aspect of the present invention, after a keyboard application space is formed by removing an area to have a predetermined depth and range, from a portion of an exposed surface on an opposite side of the front surface to which the flexible display device is applied, toward the front surface so as to apply a keyboard that can be attached, detached, stored and withdrawn without increase of thickness in a folded state of an image display device provided with a flexible display device that can be bent, rolled or expanded (an infolding image display device, an outfolding image display device, a dual-folding image display device implementing both infolding and outfolding, a rollable infolding image display device, or a rollable outfolding image display device), a keyboard unit that can be attached, detached, stored and withdrawn in correspondence to the formed keyboard application space is applied.

Since the width of the image display device having a flexible display device is insufficient compared with the width of a general keyboard, a keyboard arrangement from a first row to a fourth row, which is essential for keyboard input, is basically applied to the keyboard unit, and keys of a fifth or higher rows may be additionally applied.

A folding groove is formed at an inner location of the keyboard body, apart from one end of the keyboard body by a predetermined distance, so that the protruding portion of the keyboard body can be rotated and closely attached to the edge of the image display device.

Attaching, detaching, storing or withdrawing of the keyboard unit from the keyboard application space may be performed by linearly moving the keyboard unit in a direction parallel or perpendicular to the folding axis direction of the flexible display device regardless of a folded or unfolded state of the image display device, by rotating the keyboard unit after moving it to the end portion of the keyboard application space in a direction perpendicular to the folding axis direction of the flexible display device when the image display device is unfolded, or by attaching or detaching the keyboard unit regardless of the folding axis direction of the flexible display device when the image display device is unfolded. To accomplish these operations, a configuration related to attachment, detachment, storage and withdrawal and components related thereto are applied to the keyboard application space of the image display device, and corresponding configuration and components are also applied to the keyboard unit, which is a target object.

For the image display device provided with a flexible display device to replace mouse input without carrying and applying a physical mouse, the keyboard unit includes: a keyboard body having keys arranged on one side, and applying a configuration or a component corresponding to a configuration or a component applied to a keyboard application space of the image display device and related to attachment, detachment, storage and withdrawal of the keyboard unit; and a camera unit including a rotatable single or dual camera module, and a supporting arm of a predetermined length, an end of which is assembled at one side of the keyboard body in a rotatable state, having a rotation support piece formed at an opposite end to rotate and support the camera module.

A camera module storage space and a supporting arm storage groove are formed on one side of the keyboard body to store and rotate the camera module and to store and maintain the supporting arm without interference with the keys, and a support slope surface is formed at an end portion of the supporting arm storage groove to apply a contact sustaining force to the supporting arm so that the supporting arm rotating and protruding from the supporting arm storage groove may maintain a predetermined angle and a standing state without help of an external force.

The keyboard unit includes a hand position sensing means applied at one end portion of the keyboard body located on an opposite side of the camera module storage space to sense a user's hand entering a camera module area under the camera module in a character input state or a user's hand moving from the camera module area under the camera module toward the keys capable of inputting characters, and transfer a sensing result to the control unit.

The keyboard unit is provided with a charging means including a battery and a charging terminal, and a keyboard unit sensing means is applied to any one of the keyboard unit and the image display device to sense whether the keyboard unit has been separated from or coupled to the keyboard application space, and transfer a sensing result to the control unit.

In addition, the supporting arm protrusion sensing means capable of sensing a stored or a rotating and protruding state of the supporting arm is applied to the keyboard body or the camera unit of the keyboard unit.

For the image display device itself to protect the screen display surface of an outfolding image display device and portions vulnerable in relation to folding, a display device cover for covering the outfolding screen display surface of the flexible display device is formed to be extended or assembled as a separate component at an edge of the keyboard unit, and an edge cover for covering a portion where outfolding of the flexible display device is generated is formed to be extended at one end of the display device cover.

A cover penetration window is formed in the display device cover to be penetrated or partially removed to confirm partial image information even when the display device cover covers the flexible display surface or not to cover the camera module after the display device cover is opened.

For the image display device itself to perform its own drop shock absorption, the perimeter of the exposed edge of the image display device or out of the edge, in the perimeter of the keyboard body of the keyboard unit, is formed by applying a protruding bumper or made of a soft material capable of absorbing shock.

Advantageous Effects

As described above, according to the embodiments of the present invention, the present invention has following advantages.

First, an image display device provided with a flexible display device that can be bent, rolled or expanded (an infolding image display device, an outfolding image display device, a dual-folding image display device implementing both infolding and outfolding, a rollable infolding image display device, or a rollable outfolding image display device) may function as a portable productivity tool capable of keyboard input functions without increasing thickness of the image display device in a folded state and the inconvenience of carrying a separate keyboard, as it is allowed to attach, detach, store or withdraw its own keyboard unit in an unfolded state.

Second, as a camera unit including a single or dual camera is applied to recognize a user's one-handed motion and replaces physical mouse input, the keyboard unit applied to the image display device may function as a portable productivity tool without carrying a mouse input device.

Third, as a display device cover and an edge cover, which are applied to be assembled as a separate component or formed to be extended at an end portion of the keyboard unit applied to be attached, detached, stored and withdrawn in a space applying the keyboard of the image display device, selectively cover the screen display surface of the image display device and the portions vulnerable in relation to folding, increase of the thickness of the image display device in a folded state can be minimized, and the protection function of the flexible display device can be implemented.

Fourth, as a drop shock absorbing means is applied around the keyboard body of the keyboard unit applied to the image display device, durability of the image display device and the keyboard unit can be enhanced together with the user's convenience.

BEST MODE FOR CARRYING OUT THE INVENTION

Hereinafter, embodiments of the present invention will be described in detail with reference to the accompanying drawings.

The terms used in this specification are for describing embodiments and not intended to limit the present invention. In this specification, singular forms also include plural forms unless specially mentioned otherwise in the phrases. In addition, comments on directionality of the front surface and the rear surface define a side to which a flexible display device described below is applied and supported as a front surface, and an exposed side located on the opposite side of the front surface as a rear surface. In addition, reference symbols presented in the order of description are not necessarily limited to the order, and some of the symbols to which a numeral is assigned may be omitted from the presented drawings.

Figure 1:
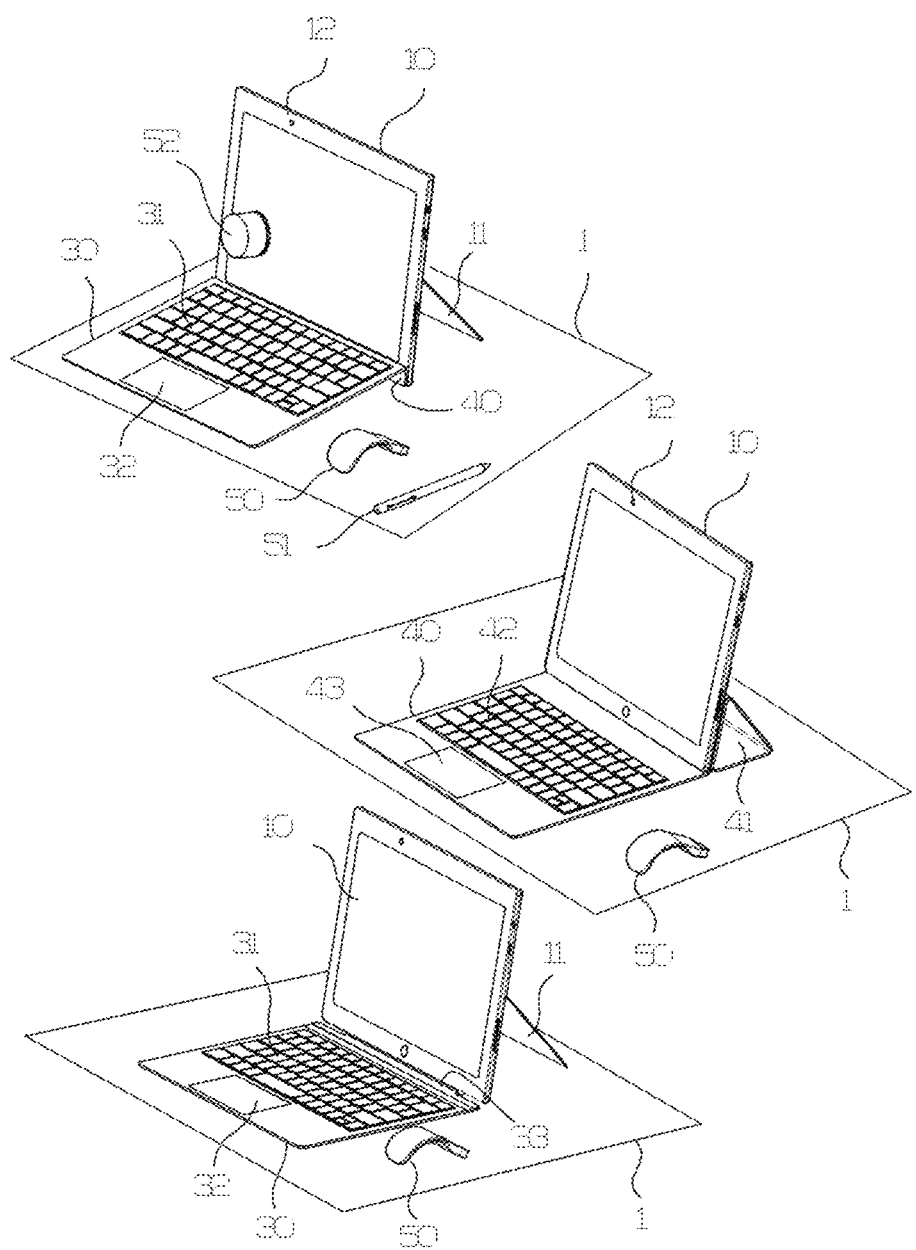
FIG. 1 is perspective views showing the examples of applying a detachable keyboard cover and additional peripheral devices to a shape-invariant plate-shape tablet product.
Figure 2:
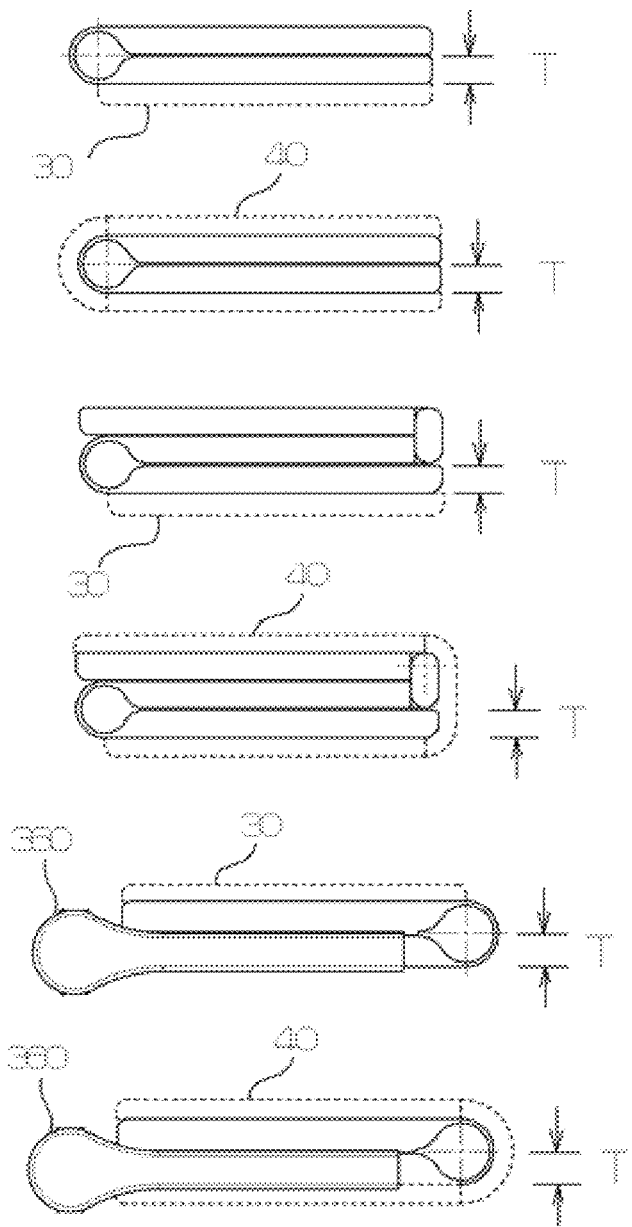
FIG. 2 is top views showing the examples of applying the concept of the keyboard cover applied in FIG. 1 to examples of an infolding image display device, a dual-folding image display device implementing both infolding and outfolding, and a rollable infolding image display device.
Figure 3:
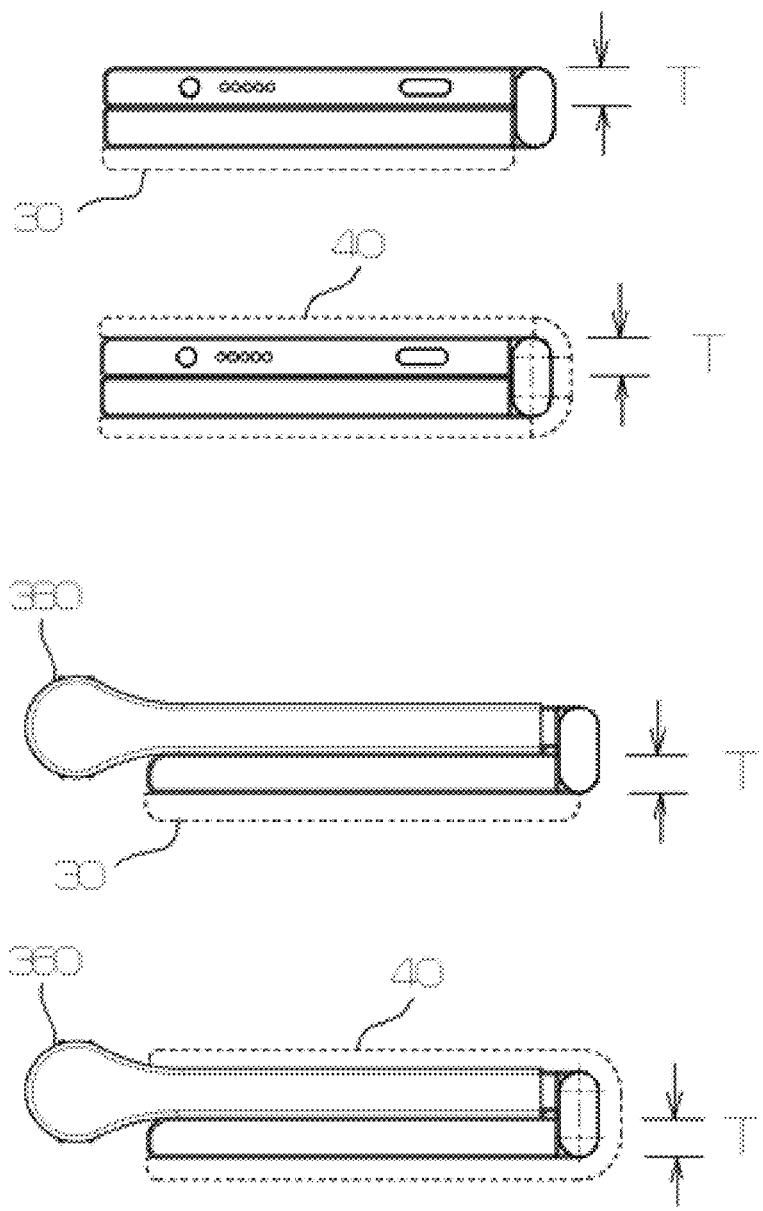
FIG. 3 is top views showing the examples of applying the concept of the keyboard cover applied in FIG. 1 to examples of an outfolding image display device and a rollable outfolding image display device.

FIG. 1 is perspective views showing the examples of applying a detachable keyboard cover and additional peripheral devices to a shape-invariant plate-shape tablet product, FIG. 2 is top views showing the examples of applying the concept of the keyboard cover applied in FIG. 1 to examples of an infolding image display device, a dual-folding image display device implementing both infolding and outfolding, and a rollable infolding image display device, and FIG. 3 is top views showing the examples of applying the concept of the keyboard cover applied in FIG. 1 to examples of an outfolding image display device and a rollable outfolding image display device.

After the advent of smartphones and tablet devices applied with a shape-invariant and plate-shape LCD panel, the use environments of users are gradually moving from desktop computers to mobile devices such as smartphones and tablet devices, except for the works requiring productivity such as creation of a document.

As a way of providing productivity to a tablet device, a tablet cover 40 applying a keyboard on the cover is presented and additional devices such as an electronic pen 51, a changeable mouse 50, and a surface dial 52 are secondarily used as shown in FIG. 1 although it is restrictive. However, it cannot be applied widely due to the portability lower than that of a notebook computer, low productivity, and high cost.

In addition, if a flexible display means including a flexible OLED panel and an electronic paper different from the LCD panel is applied, a situation using a foldable or rollable image display device is expected, in which the user may carry a foldable device in a minimized state at normal times and switch the foldable device to an unfolded state when a large screen is needed or a productive work is performed.

Although simple implementation of portability and a large screen in a foldable or rollable image display device may be accomplished by various related patents proposed before, the problem of productive work which requires keyboard input or mouse input cannot be solved by the various patents of rollable or foldable image display devices presented before, unless an additional keyboard and mouse are separately carried and applied.

To solve this problem, a foldable or rollable image display device should be provided with its own keyboard and mouse input means, and portability and convenience of using a large screen should also be maintained.

As shown in FIGS. 2 and 3, when a two-in-one cover 30 or a tablet cover 40 having a concept the same as the concept applied in FIG. 1 is applied to an infolding image display device, a dual-folding image display device implementing both infolding and outfolding, a rollable infolding image display device, an outfolding image display device, or a rollable outfolding image display device, the following problems may occur.

First, due to the two-in-one cover 30 or the tablet cover 40 additionally applied on the outer exposed surface of the image display device, thickness of the folded image display device increases as much as the two-in-one cover 30 or the tablet cover 40.

Second, the two-in-one cover 30 or the tablet cover 40 additionally applied on the outer exposed surface of the image display device generates interference with a rear camera 13.

Third, despite the additionally applied two-in-one cover 30 or tablet cover 40, a separate mouse 50 for mouse input should be carried, and even when the mouse is carried, it is difficult to use the mouse 50 in an environment such as a sofa or a user's knee, which cannot provide a flat working plate 1 as shown in FIG. 1.

Fourth, since the rear camera 13 of the image display devices shown in FIGS. 2 and 3 is fixedly applied on the rear surface of the image display device, i.e., a surface opposite to the screen display surface of the image display device, the problem lacking of immediacy, such as stopping the document work, obtaining a photographed image using the image display device, reentering the document working state, and attaching the photographed image to photograph a document to be attached or obtain an image photographing a target object while creating the document, cannot be solved.

To solve these problems, the present invention is proposed to apply a keyboard unit that is attached, detached, stored and withdrawn by utilizing a space of an image display device itself in order to provide a productivity improving ability, while preventing or minimizing increases of thickness of the image display device in a folded state, in an image display device provided with portability and ability of implementing a large screen (an infolding image display device, a dual-folding image display device implementing both infolding and outfolding, a rollable infolding image display device, an outfolding image display device, or a rollable outfolding image display device) by applying a flexible display device (means).

In addition, in a productive work such as creating and editing a document, it is proposed to substitute for mouse input even in an environment having inconvenience of carrying a mouse and without a working plate 1 by substituting the mouse input using the keyboard unit that can be attached, detached, stored and withdrawn although a user does not separately possess the mouse 50, which is an important additional device.

In a productive work such as creating and editing a document, it is proposed to immediately perform, in real-time, a scan input function or a document photographing function, which are important input means, in addition to keyboard input and mouse input, without interrupting the work of creating a document during the work of creating a document using a detachable keyboard unit even without help of a separate scanner, camera or smart phone during the work of creating a document, while watching the document to be scanned or an object being photographed on the screen display surface of the image display device.

Figure 4:
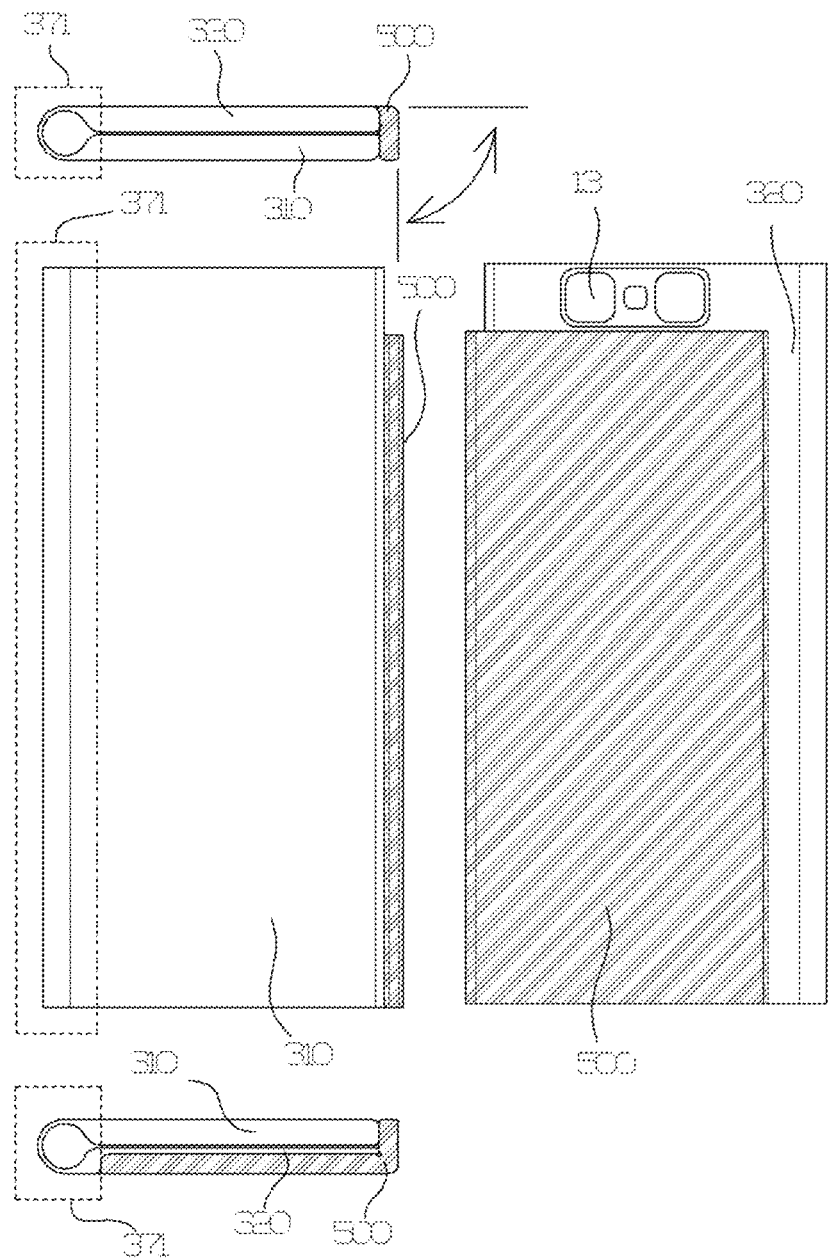
FIG. 4 is a front view, a rear view, a bottom view and a top view showing a folded state of a first embodiment applying a keyboard unit that can be attached, detached, stored and withdrawn to an infolding image display device.
Figure 63:
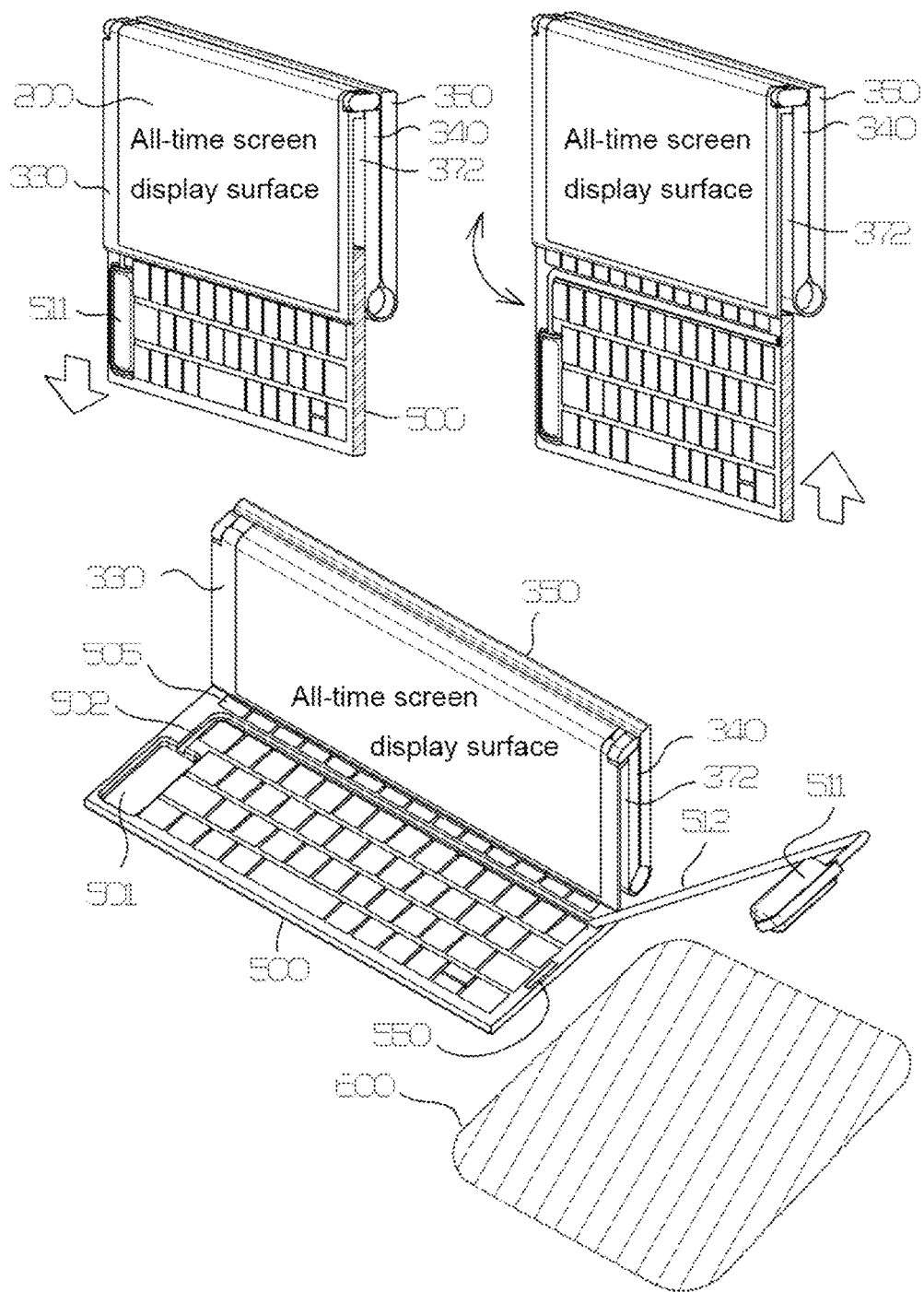
FIG. 63 is perspective views showing examples of a process of withdrawing the keyboard unit in the folded state of FIG. 59 of the eleventh embodiment and a perspective view showing an example of using the same.

To solve the technical problems described above, the present invention presents embodiments targeting an image display device (infolding image display device, a dual-folding image display device implementing both infolding and outfolding, a rollable infolding image display device, an outfolding image display device, or a rollable outfolding image display device), to which the flexible display device 200 is applied, by using the drawings of FIGS. 4 to 63 and the description described below, and common parts are grouped and described together to minimize the quantity of description.

FIGS. 8, 18, 19 and 21 that will be presented below are not limited only to the embodiments to minimize the number of drawings to be presented for the description of the present invention, and the concepts are applied to all the embodiments as long as the application concepts of the individual embodiments corresponding to the concepts desired to be presented through FIGS. 8, 18, 19 and 21 are not violated.

All the embodiments of the image display device 100 provided with a keyboard presented by utilizing the drawings of FIGS. 4 to 63 include: a flexible display device 200 that can be bent, rolled or expanded; a body 300 supported by the front surface so that the flexible display device 200 may be bent, rolled or expanded, and having a keyboard application space 372 formed by removing an area to have a predetermined depth and range, from a portion of an exposed surface on an opposite side of the front surface to which the flexible display device is applied, toward the front surface, and a component related to attachment, detachment, storage and withdrawal of an object applied to the keyboard application space 372; and a keyboard unit 500 applied to the keyboard application space 372 in a state capable of switching an application state to be coupled to and carried together with the body 300 or to be detachable from the body 300, and performing a function as an input means by using a wired or wireless communication means.

Among the embodiments of the image display device 100 provided with a keyboard, the first, second and third embodiments described below are targeting an infolding image display device.

Figure 5:
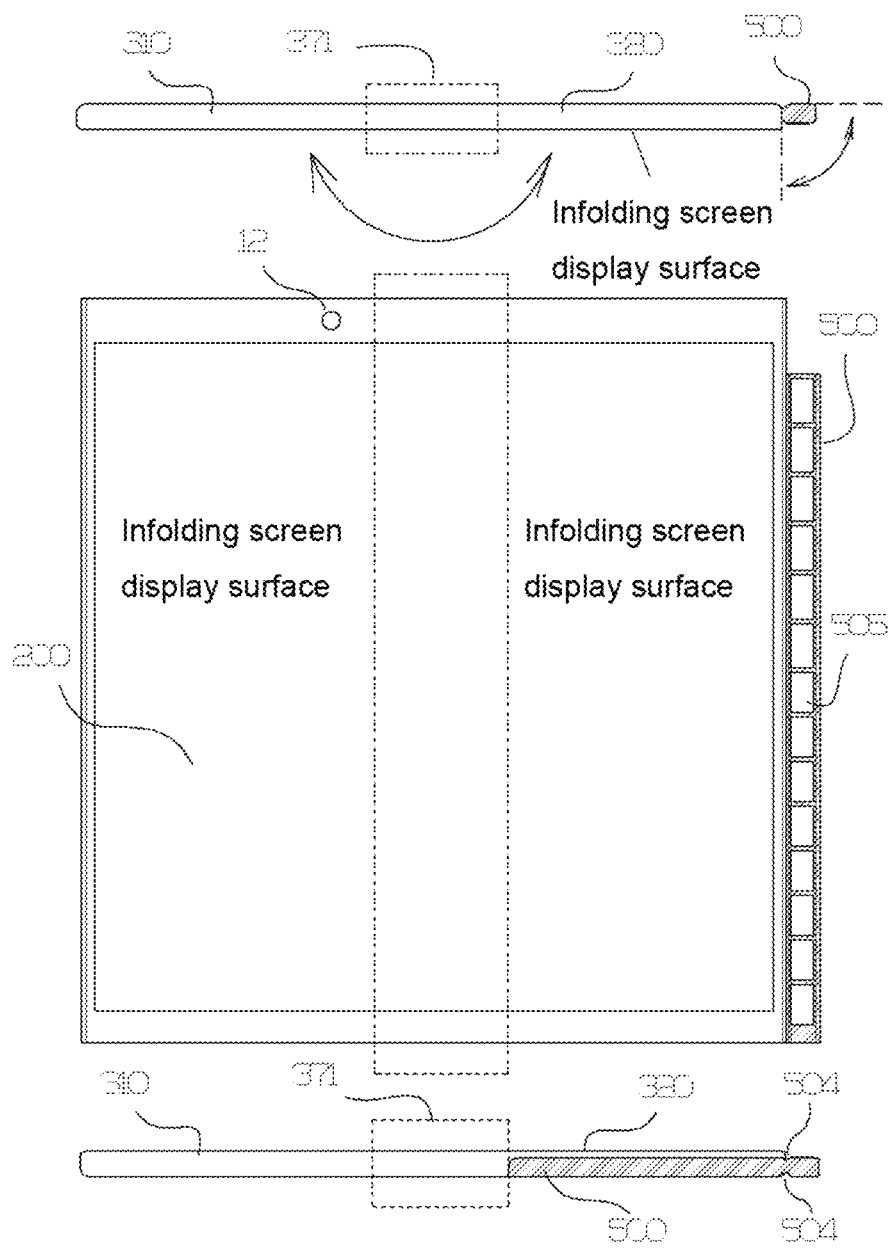
FIG. 5 is a front view, a bottom view and a top view showing an unfolded state of the first embodiment.
Figure 6:
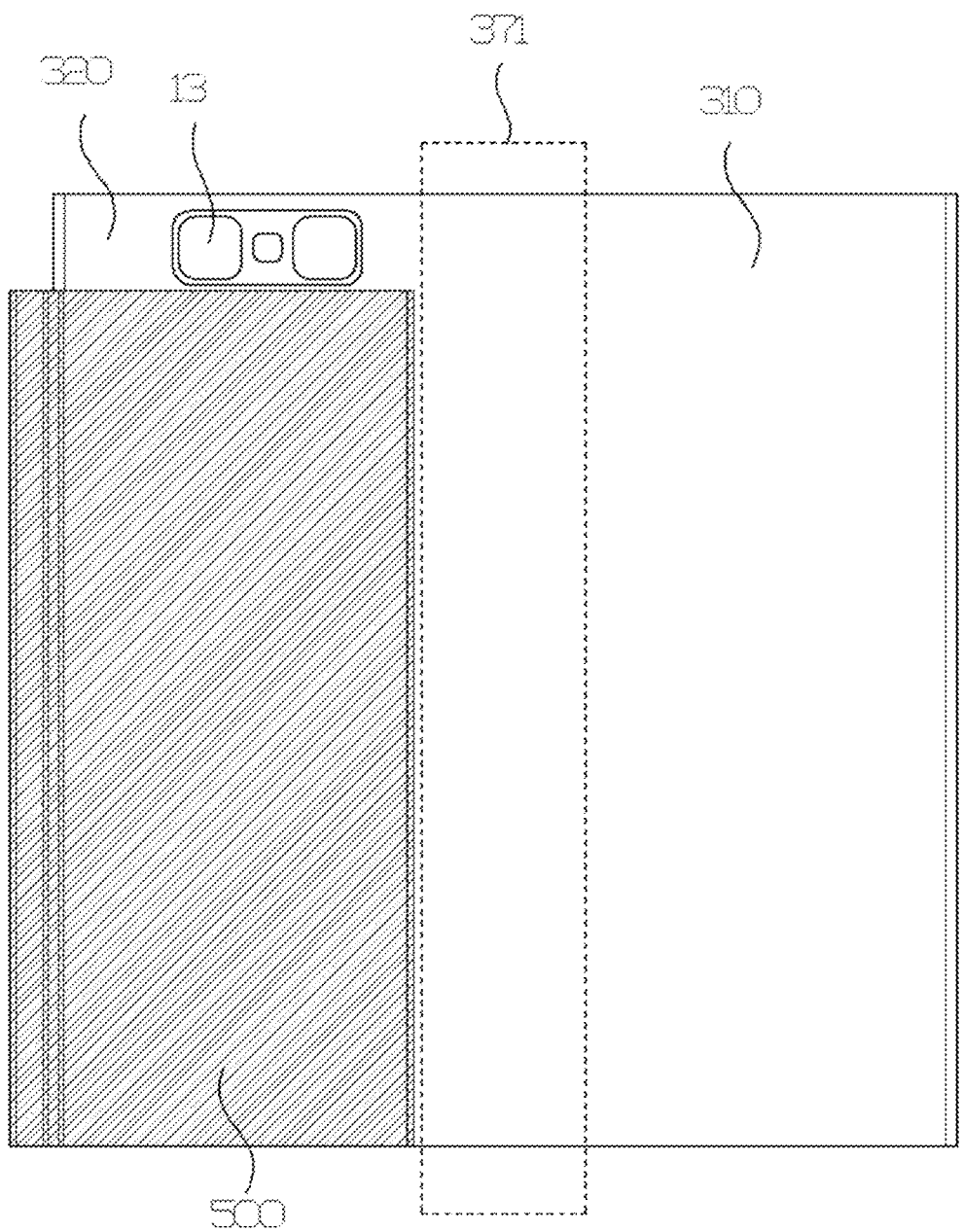
FIG. 6 is a rear view showing an unfolded state of the first embodiment.
Figure 7:
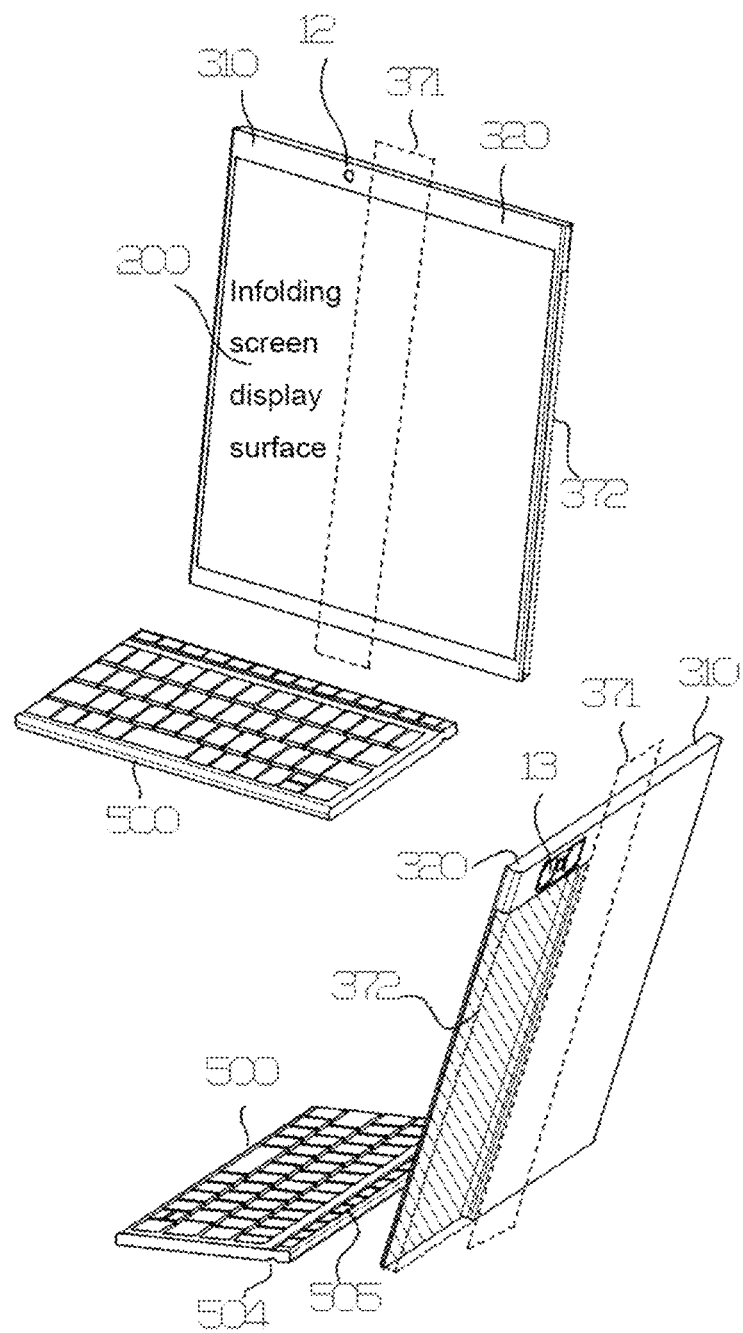
FIG. 7 is perspective views showing an example of separating the keyboard unit in the unfolded state of the first embodiment.
Figure 8:
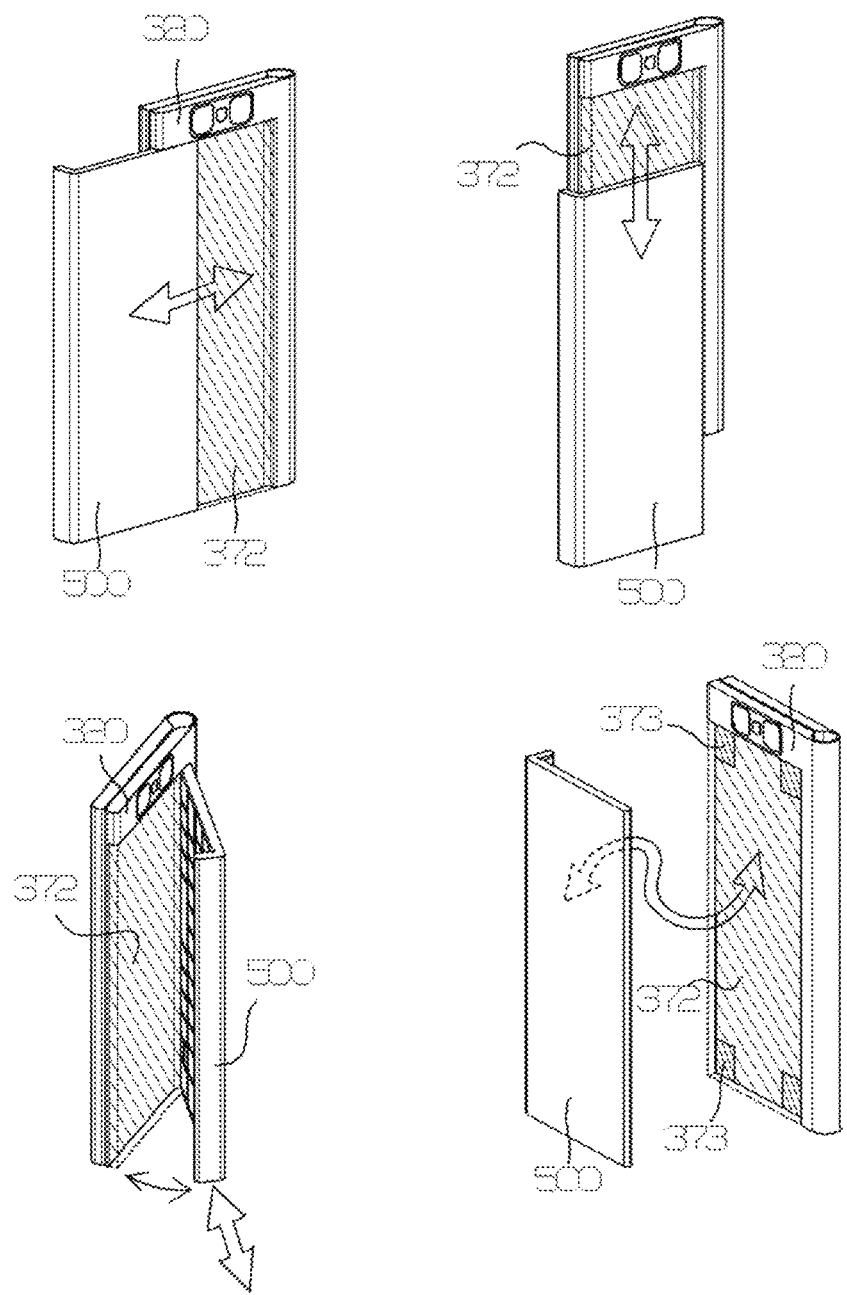
FIG. 8 is conceptual views showing examples of a method of attaching and detaching the keyboard unit applied to the first embodiment.

FIG. 4 is a front view, a rear view, a bottom view and a top view showing a folded state of a first embodiment applying a keyboard unit that can be attached, detached, stored and withdrawn to an infolding image display device, FIG. 5 is a front view, a bottom view and a top view showing an unfolded state of the first embodiment, FIG. 6 is a rear view showing an unfolded state of the first embodiment, FIG. 7 is perspective views showing an example of separating the keyboard unit in the unfolded state of the first embodiment, and FIG. 8 is conceptual views showing examples of a method of attaching and detaching the keyboard unit applied to the first embodiment.

As shown in FIGS. 4 to 8, the body 300 of the first embodiment includes an infolding body 1 310 for supporting one side portion of the flexible display device 200 on the front surface, and including a minimum curvature section 371 for securing a minimum curvature in case of an infolding state at one side where folding can be performed, and an infolding body 2 320 for supporting the opposite side portion of the flexible display device 200 on the front surface, sharing the minimum curvature section 371 with the infolding body 1 310 at one side where folding can be performed, and including a single or dual rear camera 13 for photographing rear subjects on the opposite side of the front surface.

The keyboard application space 372 is formed by removing an area on the opposite side of the front surface of the infolding body 2 320 where interference with the rear camera 13 does not occur, and outside the minimum curvature section 371.

Figure 9:
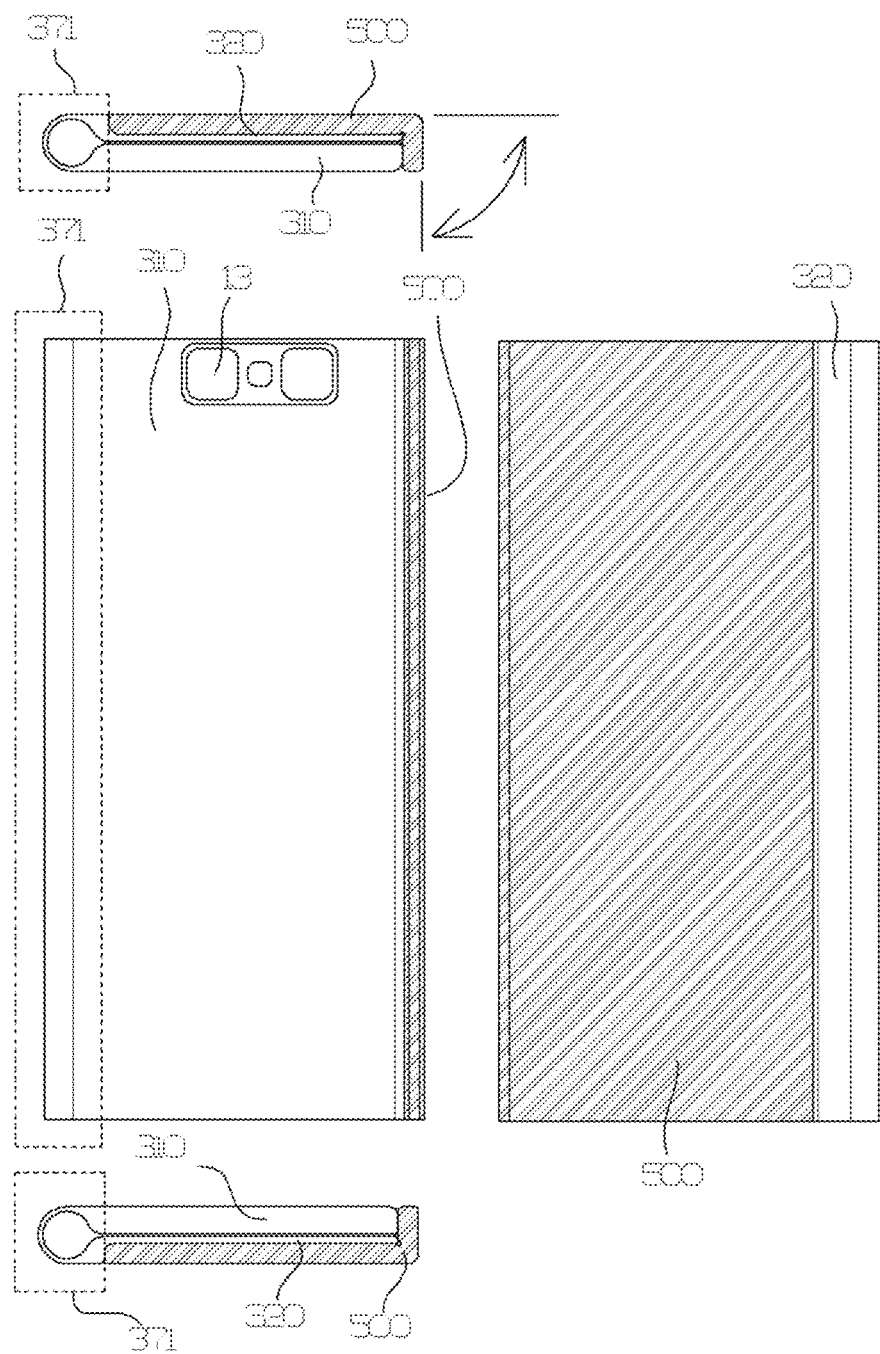
FIG. 9 is a front view, a rear view, a bottom view and a top view showing a folded state of a second embodiment applying a detachable keyboard unit to an infolding image display device.
Figure 10:
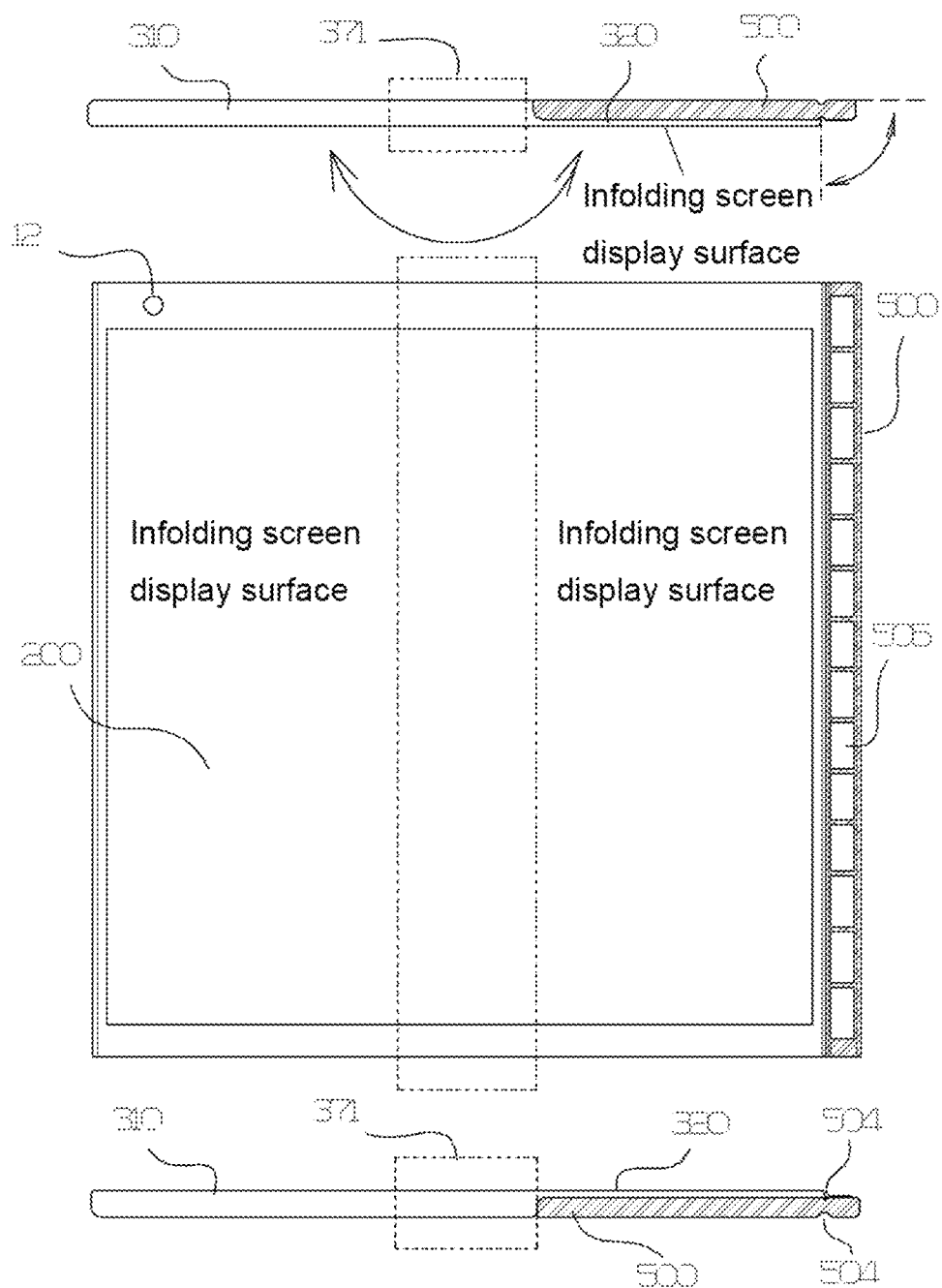
FIG. 10 is a front view, a bottom view and a top view showing an unfolded state of the second embodiment.
Figure 11:
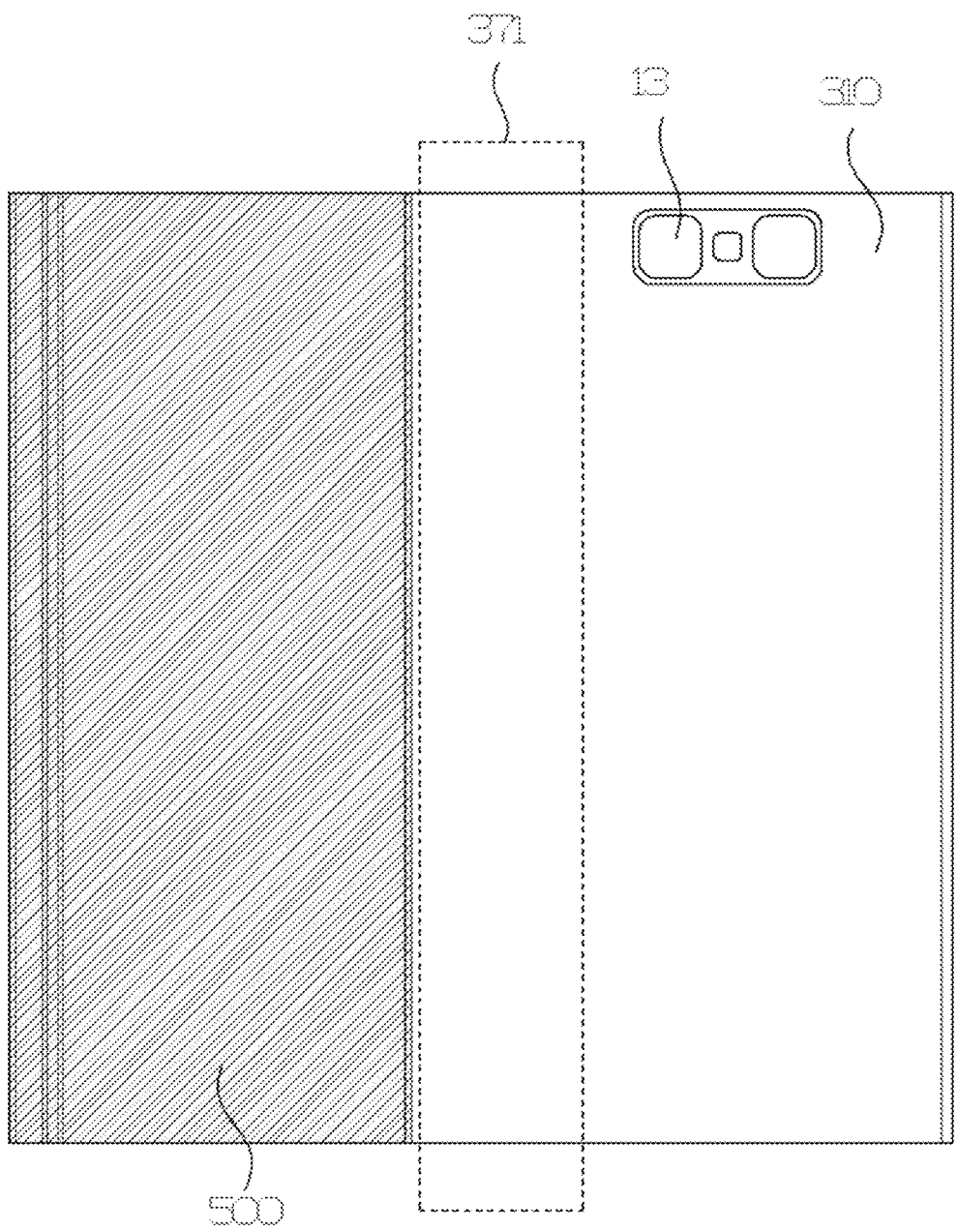
FIG. 11 is a rear view showing an unfolded state of the second embodiment.
Figure 12:
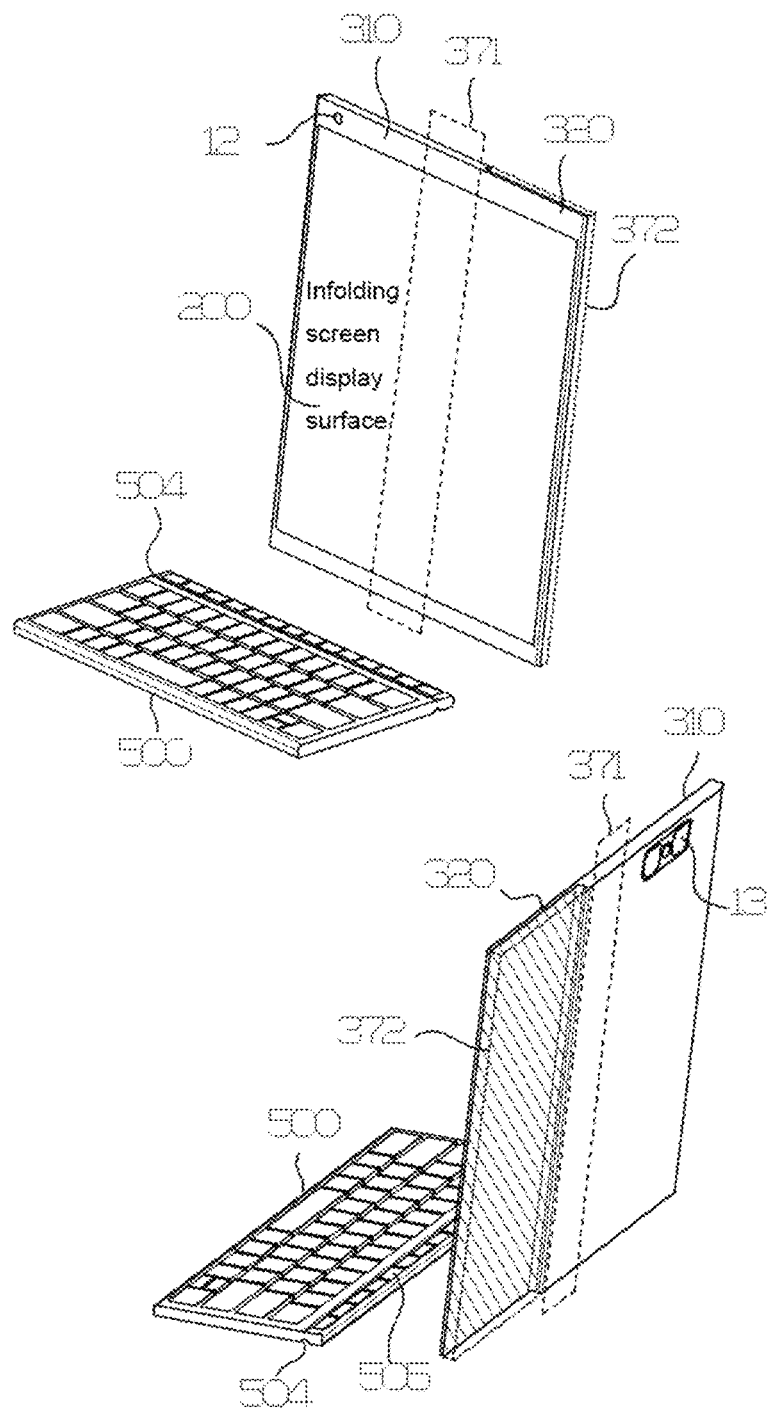
FIG. 12 is perspective views showing an example of separating the keyboard unit in the unfolded state of the second embodiment.

FIG. 9 is a front view, a rear view, a bottom view and a top view showing a folded state of a second embodiment applying a detachable keyboard unit to an infolding image display device, FIG. 10 is a front view, a bottom view and a top view showing an unfolded state of the second embodiment, FIG. 11 is a rear view showing an unfolded state of the second embodiment, and FIG. 12 is perspective views showing an example of separating the keyboard unit in the unfolded state of the second embodiment.

As shown in FIGS. 9 to 12, the body 300 of the second embodiment includes an infolding body 1 310 for supporting one side portion of the flexible display device 200 on the front surface, including a minimum curvature section 371 for securing a minimum curvature in case of an infolding state at one side where folding can be performed, and including a single or dual rear camera 13 for photographing rear subjects on the opposite side of the front surface, and an infolding body 2 320 for supporting the opposite side portion of the flexible display device 200 on the front surface, and sharing the minimum curvature section 371 with the infolding body 1 310 at one side where folding can be performed.

The keyboard application space 372 is formed by removing an area on the opposite side of the front surface of the infolding body 2 320, and outside the minimum curvature section 371.

Figure 13:
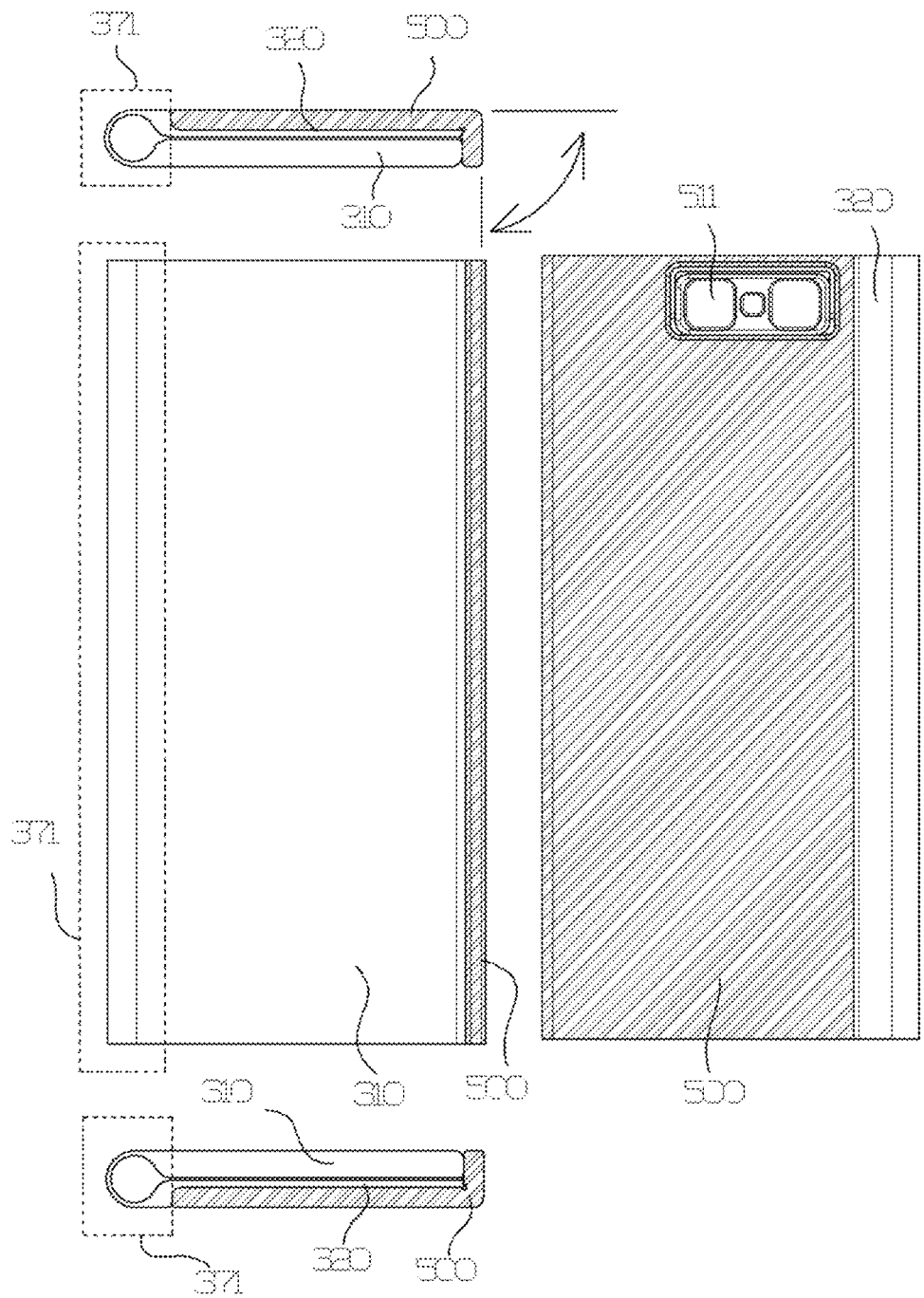
FIG. 13 is a front view, a rear view, a bottom view and a top view showing a folded state of a third embodiment applying a detachable keyboard unit to an infolding image display device.
Figure 14:
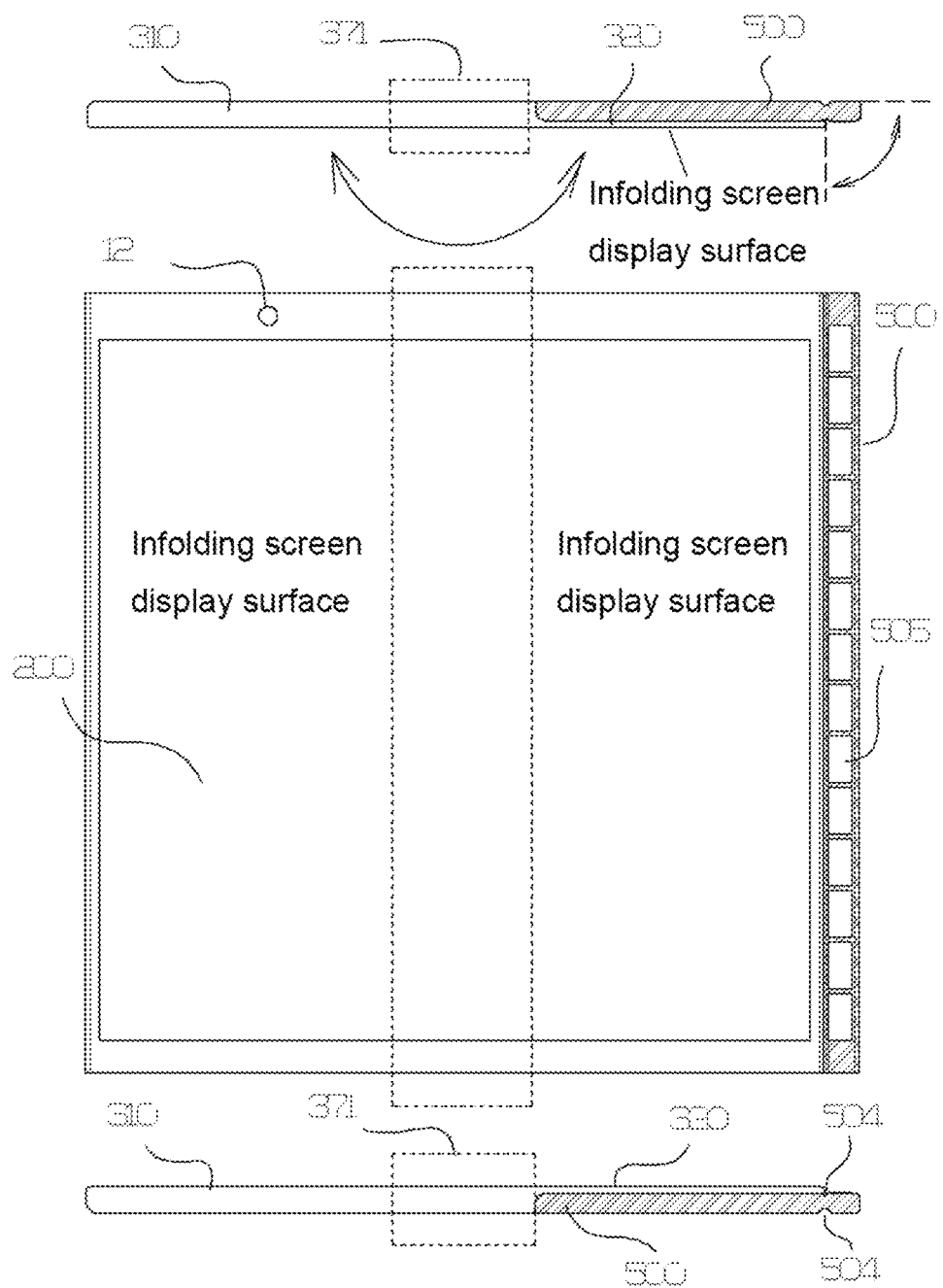
FIG. 14 is a front view, a bottom view and a top view showing an unfolded state of the third embodiment.
Figure 15:
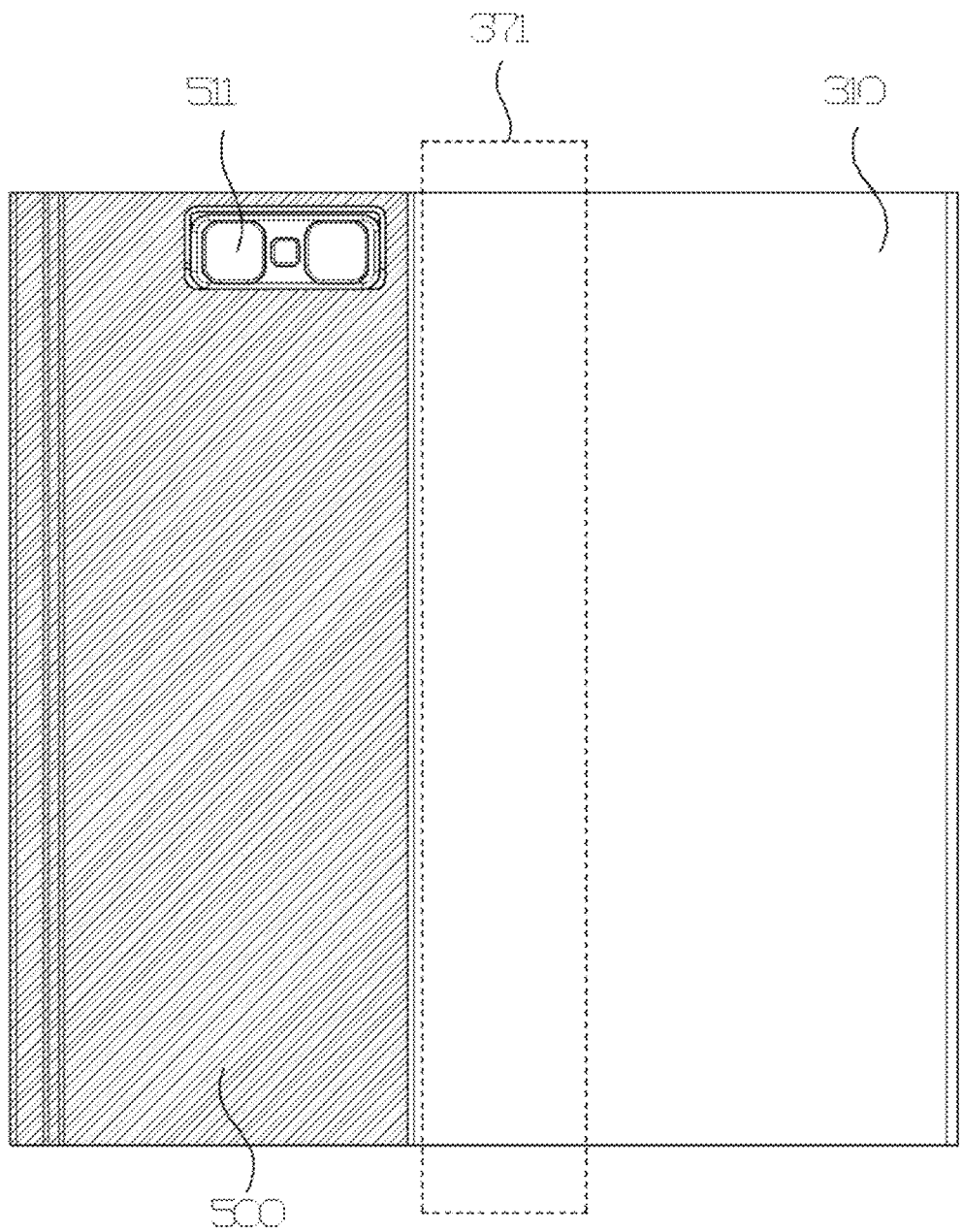
FIG. 15 is a rear view showing an unfolded state of the third embodiment.
Figure 16:
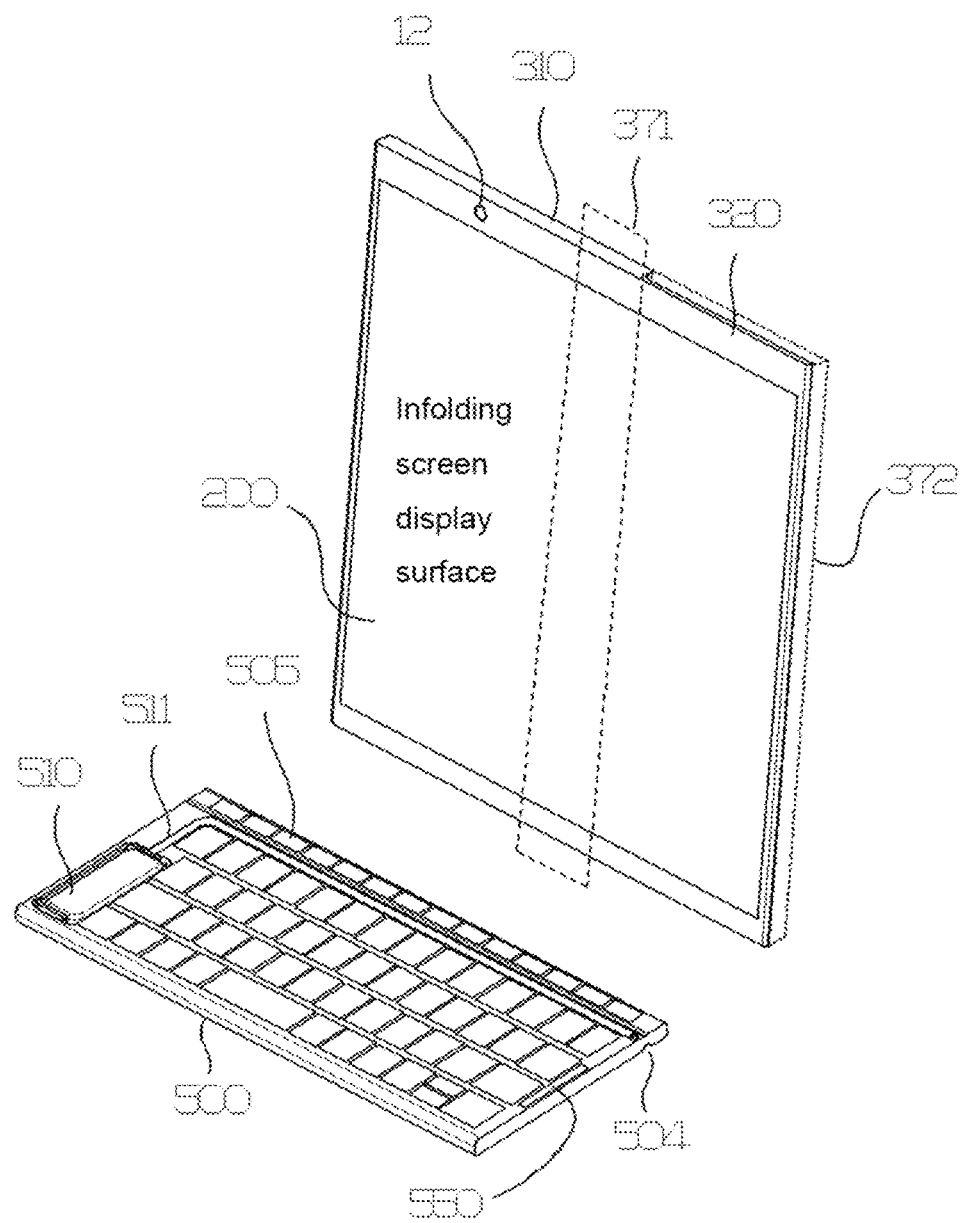
FIG. 16 is a perspective view showing an example of separating the keyboard unit of a state storing a camera unit in the unfolded state of the third embodiment.
Figure 17:
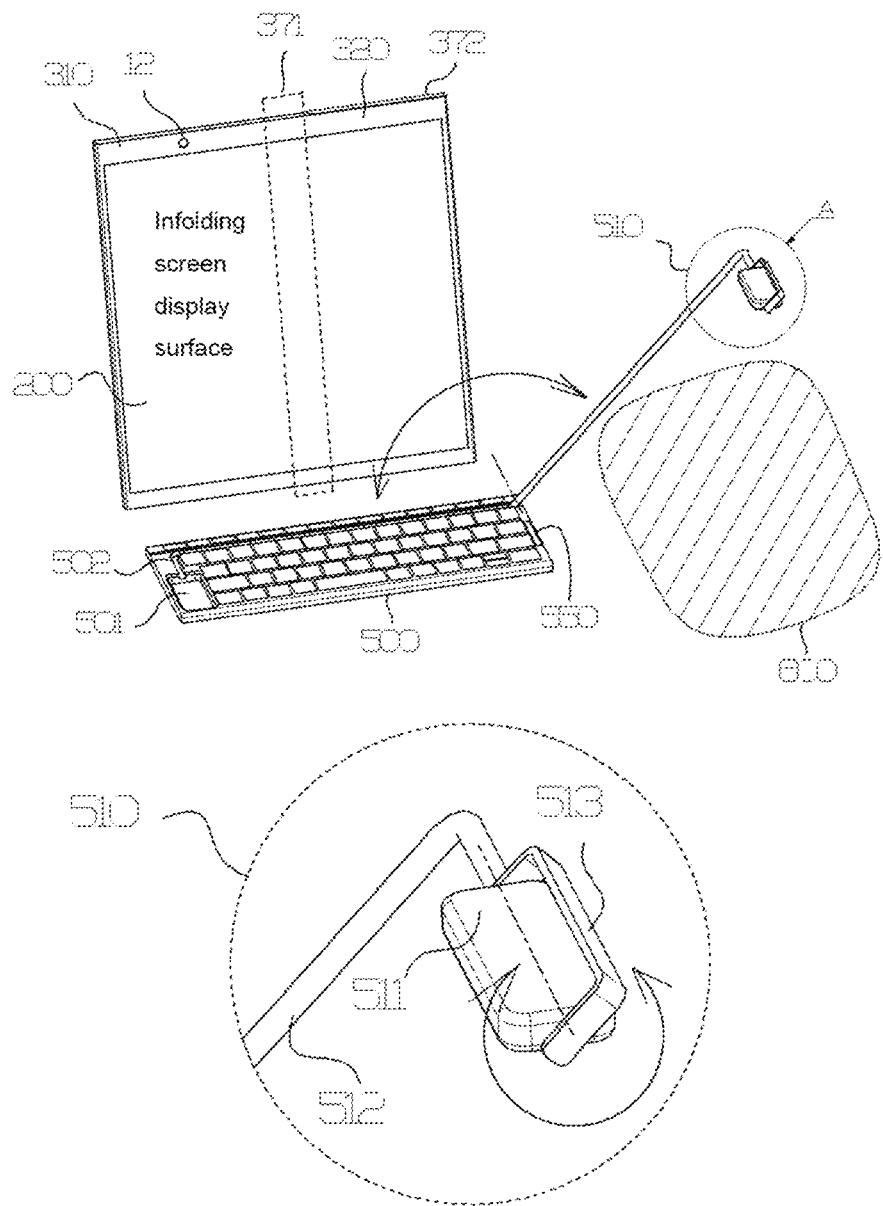
FIG. 17 is a perspective view and a detailed view showing an example of separating the keyboard unit having a camera unit of a protruding and unfolded state, in the unfolded state of the third embodiment.
Figure 18:
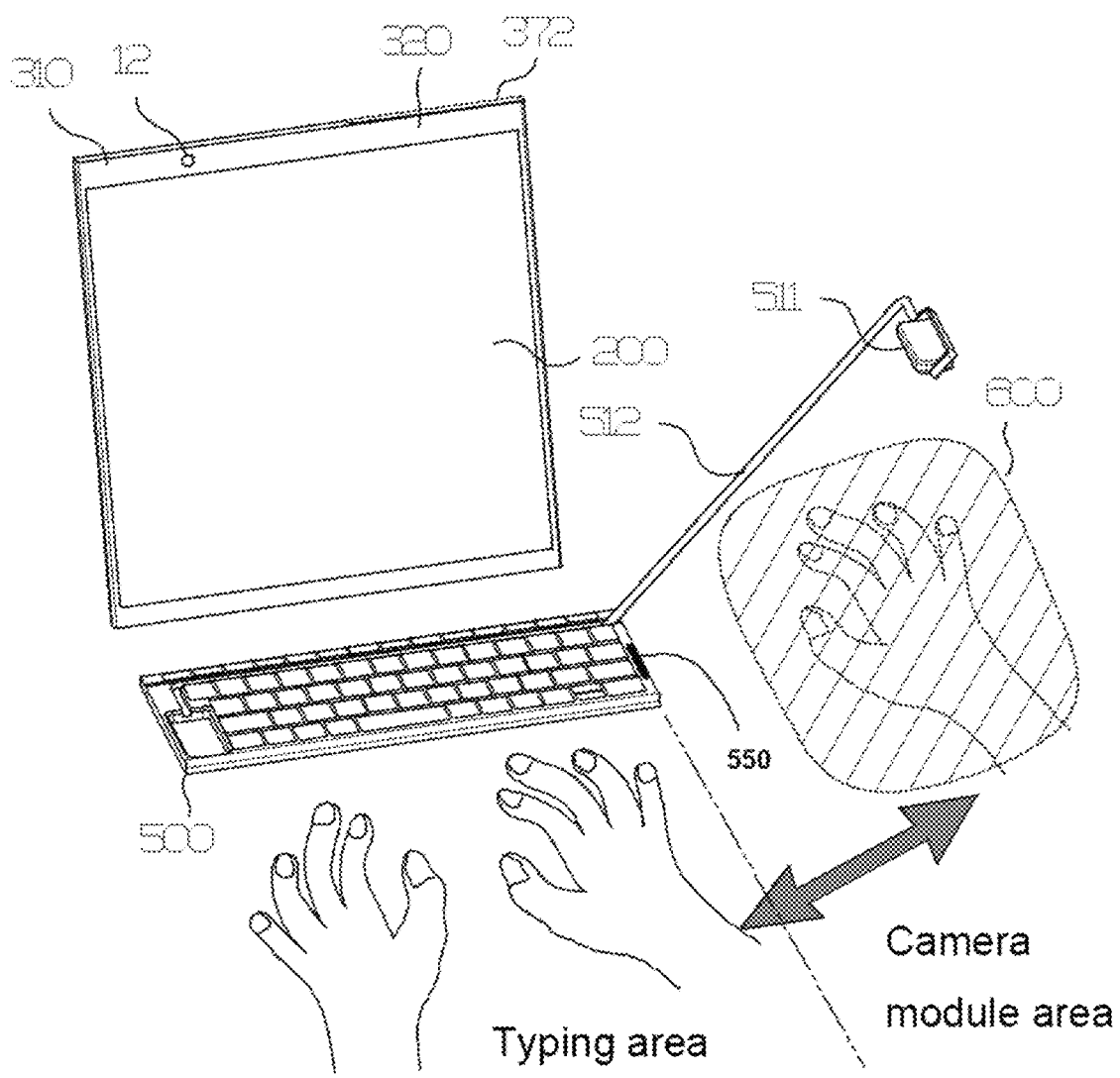
FIG. 18 is a conceptual view showing that the image display unit is switched to a document input mode state and a gesture recognition activation state of the camera unit according to the position of the right hand of a user, in the state of FIG. 17 of the third embodiment.
Figure 19:
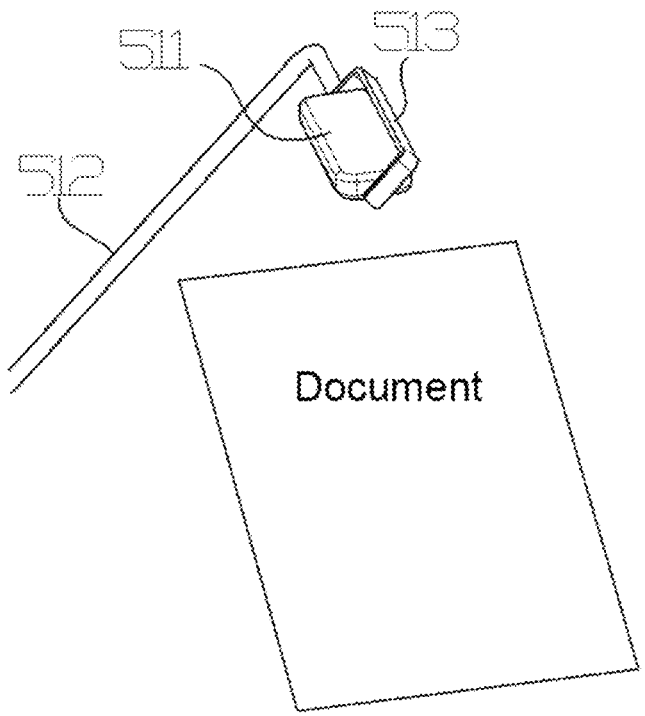
FIG. 19 is conceptual views showing that it may be divided into a simple photographing mode state and a gesture recognition activation state according to an object positioned under the photographing side of the camera module, in a state as shown FIG. 17 of the third embodiment.
Figure 19:
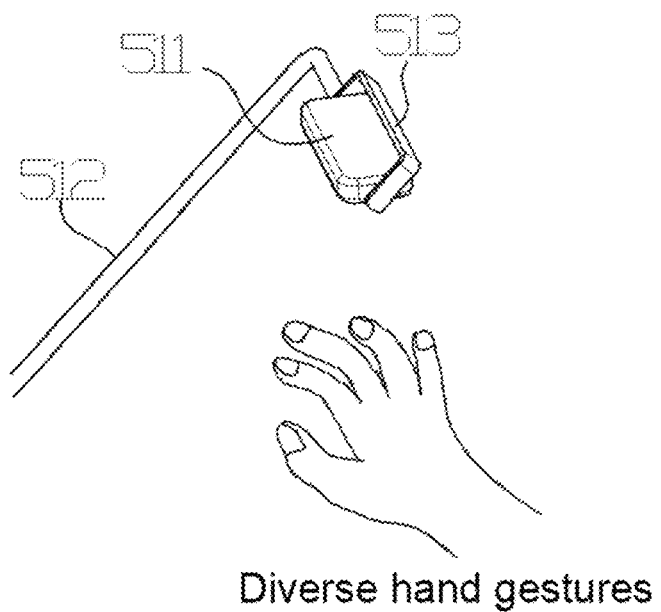
Figure 20:
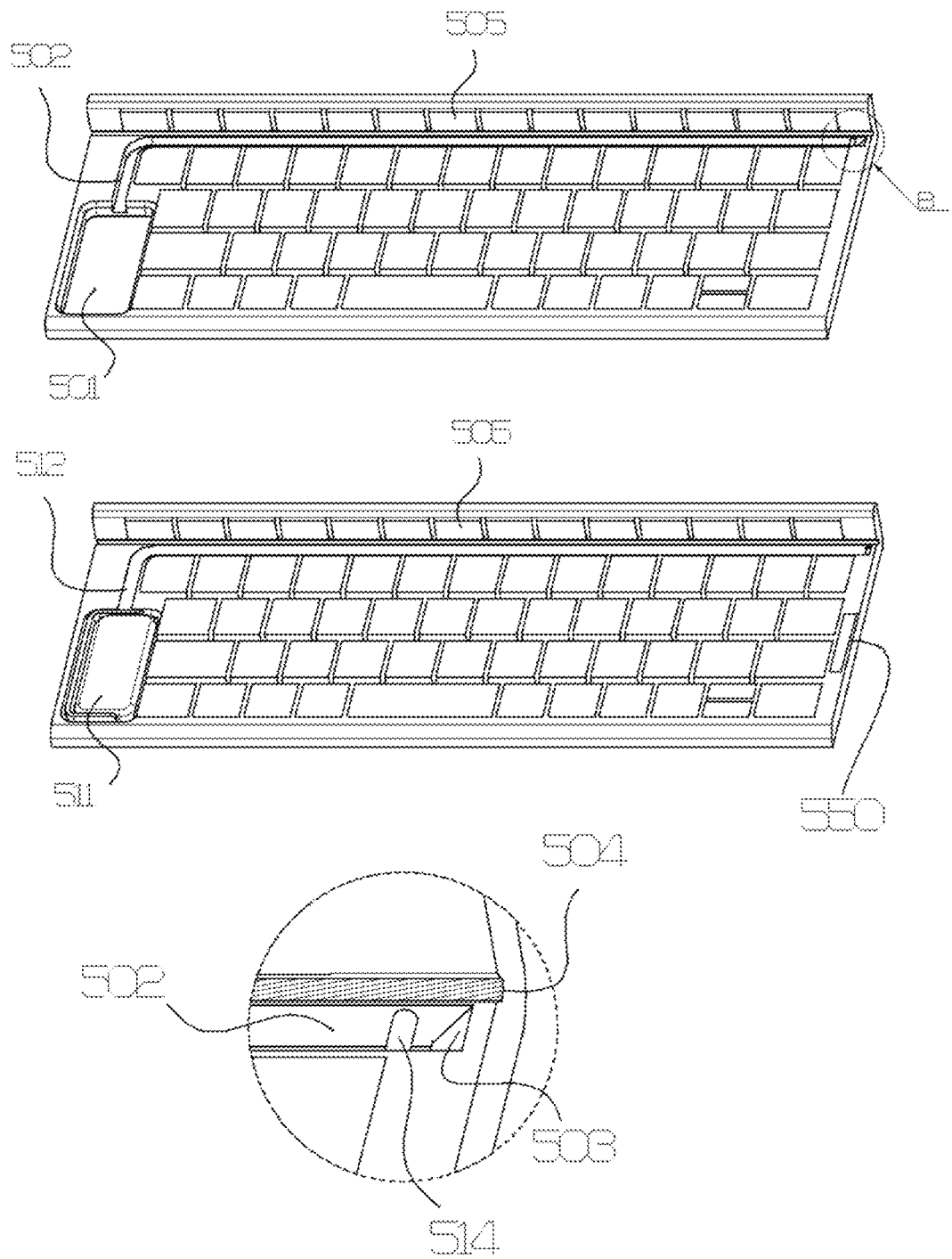
FIG. 20 is perspective views and a detailed view showing the keyboard unit of the third embodiment.
Figure 21:
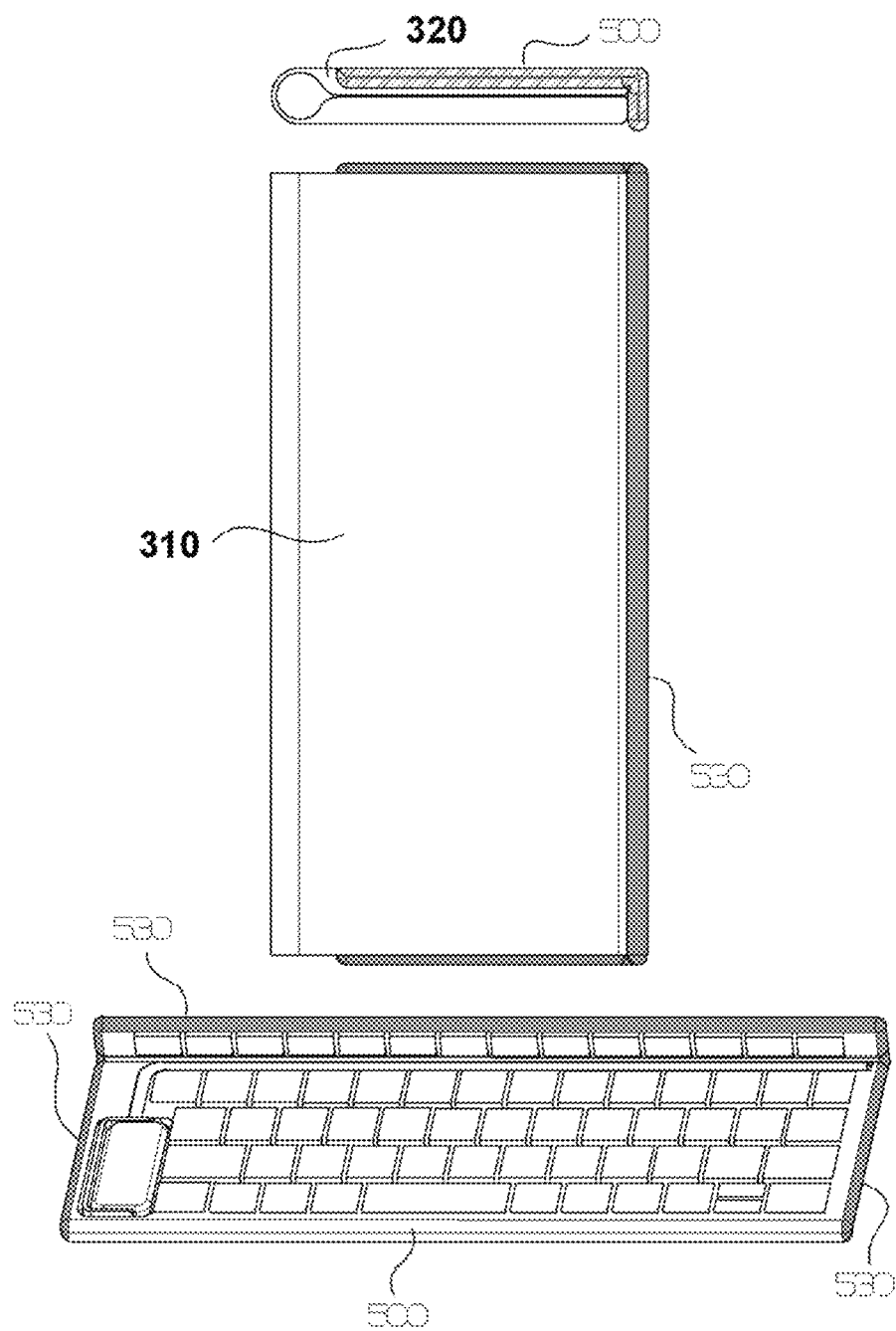
FIG. 21 is a front view, a top view and a perspective view showing an example of applying an outline bumper for absorbing drop shock around the keyboard unit shown in FIG. 17 of the third embodiment.

FIG. 13 is a front view, a rear view, a bottom view and a top view showing a folded state of a third embodiment applying a detachable keyboard unit to an infolding image display device, FIG. 14 is a front view, a bottom view and a top view showing an unfolded state of the third embodiment, FIG. 15 is a rear view showing an unfolded state of the third embodiment, FIG. 16 is a perspective view showing an example of separating the keyboard unit of a state storing a camera unit in the unfolded state of the third embodiment, FIG. 17 is a perspective view and a detailed view showing an example of separating the keyboard unit having a camera unit of a protruding and unfolded state, in the unfolded state of the third embodiment, FIG. 18 is a conceptual view showing that the image display unit is switched to a document input mode state and a gesture recognition activation state of the camera unit according to the position of the right hand of a user, in the state of FIG. 17 of the third embodiment, FIG. 19 is conceptual views showing that it may be divided into a simple photographing mode state and a gesture recognition activation state according to an object positioned under the photographing side of the camera module, in a state as shown in FIG. 17 of the third embodiment, FIG. 20 is perspective views and a detailed view showing the keyboard unit of the third embodiment, and FIG. 21 is a front view, a top view and a perspective view showing an example of applying an outline bumper for absorbing drop shock around the keyboard unit shown in FIG. 17 of the third embodiment.

As shown in FIGS. 13 to 17, the body 300 of the third embodiment includes an infolding body 1 310 for supporting one side portion of the flexible display device 200 on the front surface, and including a minimum curvature section 371 for securing a minimum curvature in case of an infolding state at one side where folding can be performed, and an infolding body 2 320 for supporting the opposite side portion of the flexible display device 200 on the front surface, and sharing the minimum curvature section 371 with the infolding body 1 310 at one side where folding can be performed.

The keyboard application space 372 is formed by removing an area on the opposite side of the front surface of the infolding body 2 320, and outside the minimum curvature section 371.

Among the embodiments of the image display device 100 provided with a keyboard, the fourth, fifth and eleventh embodiments described below are targeting a dual-folding image display device implementing both infolding and outfolding, and the bodies 300 of the fourth embodiment and the fifth embodiment are the same, and unlike the fourth embodiment, an embodiment applying the keyboard unit 500 additionally applied with the display device cover 520 and the edge cover 523 is the fifth embodiment.

Figure 22:
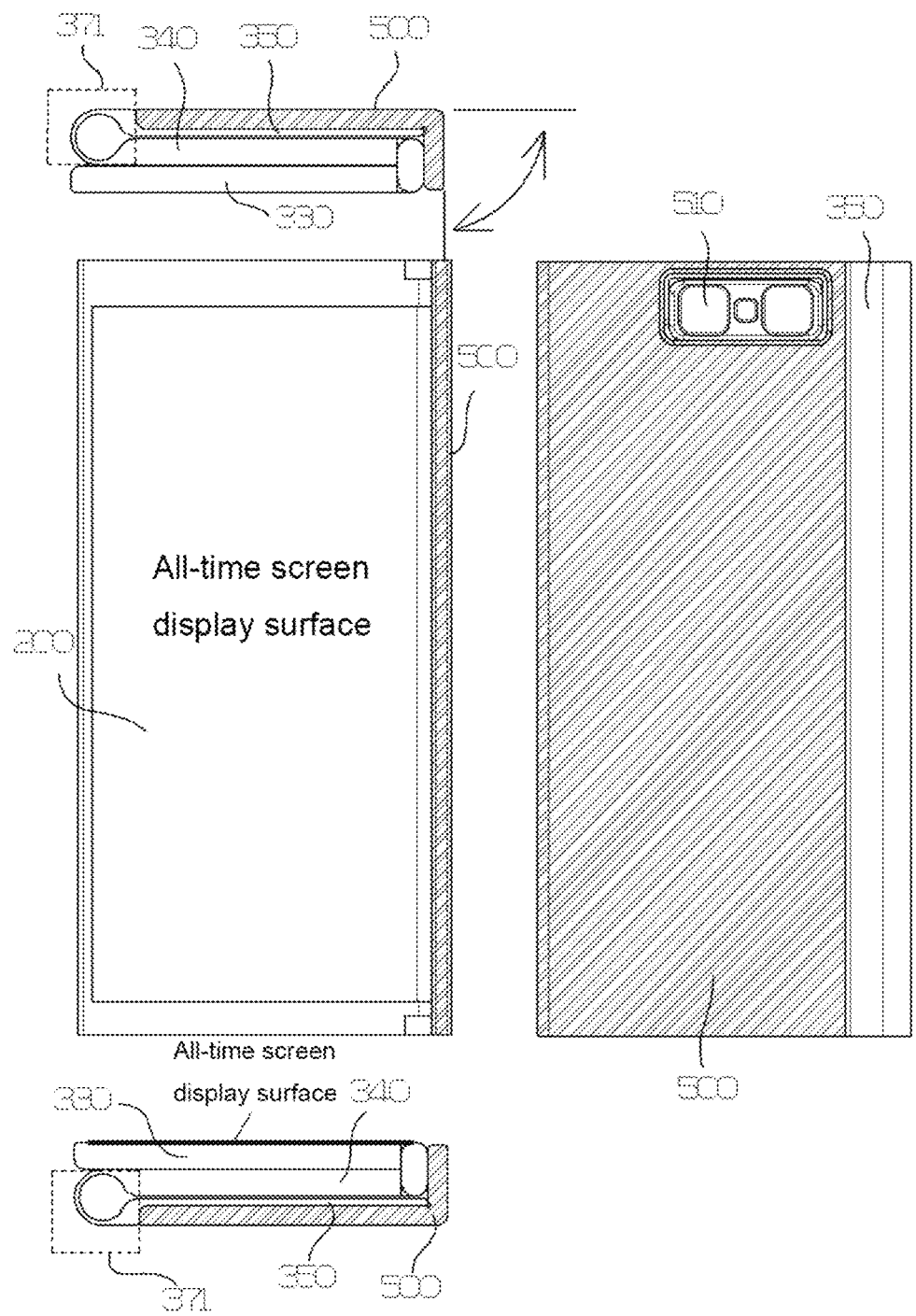
FIG. 22 is a front view, a rear view, a bottom view and a top view showing a folded state of a fourth embodiment applying a detachable keyboard unit to a dual-folding image display device implementing both infolding and outfolding.
Figure 23:
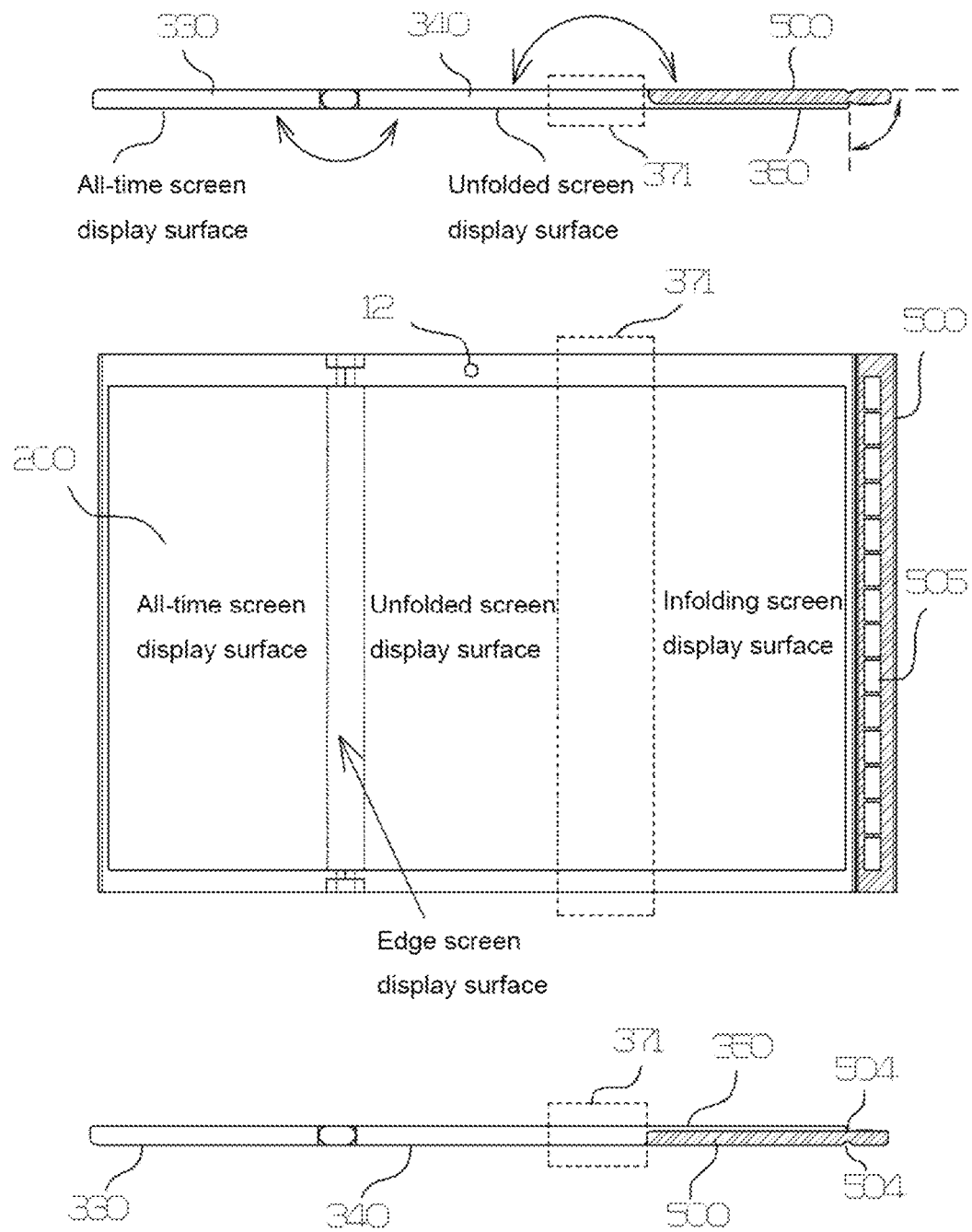
FIG. 23 is a front view, a bottom view and a top view showing a fully unfolded state of the fourth embodiment.
Figure 24:
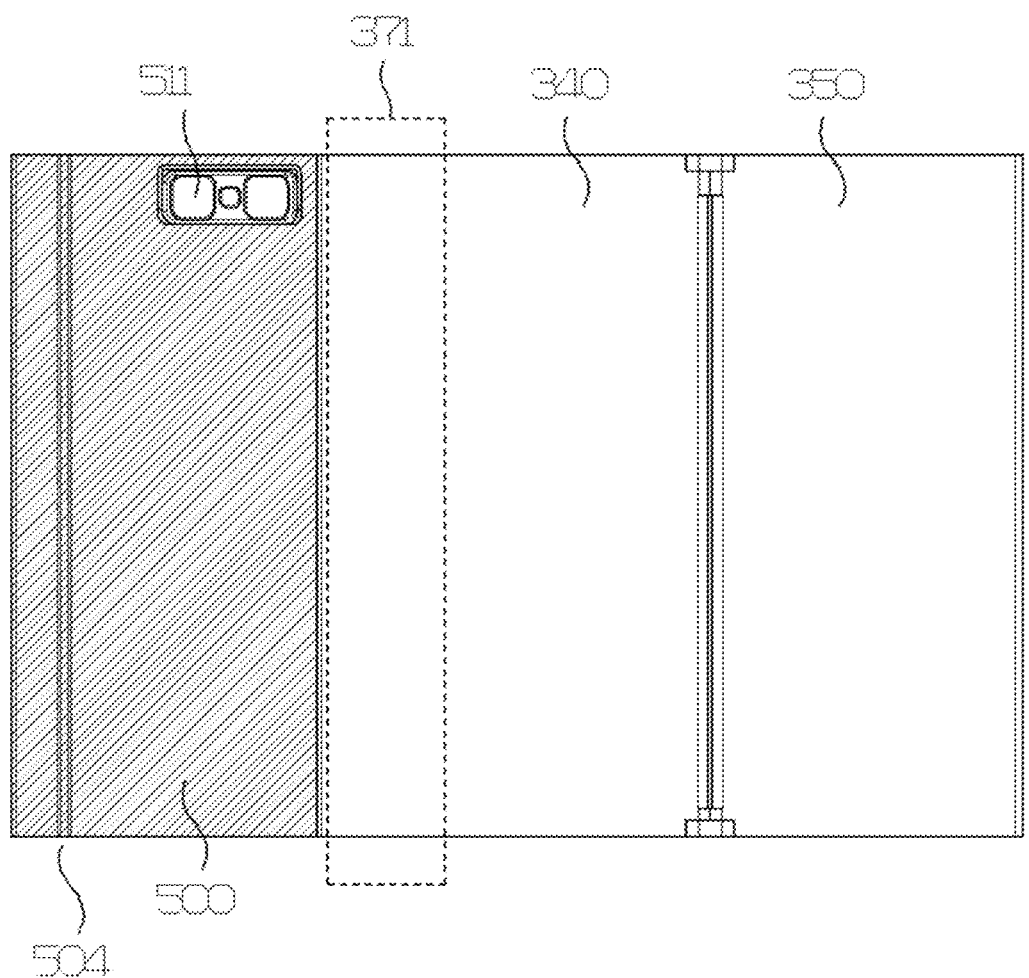
FIG. 24 is a rear view showing a fully unfolded state of the fourth embodiment.
Figure 25:
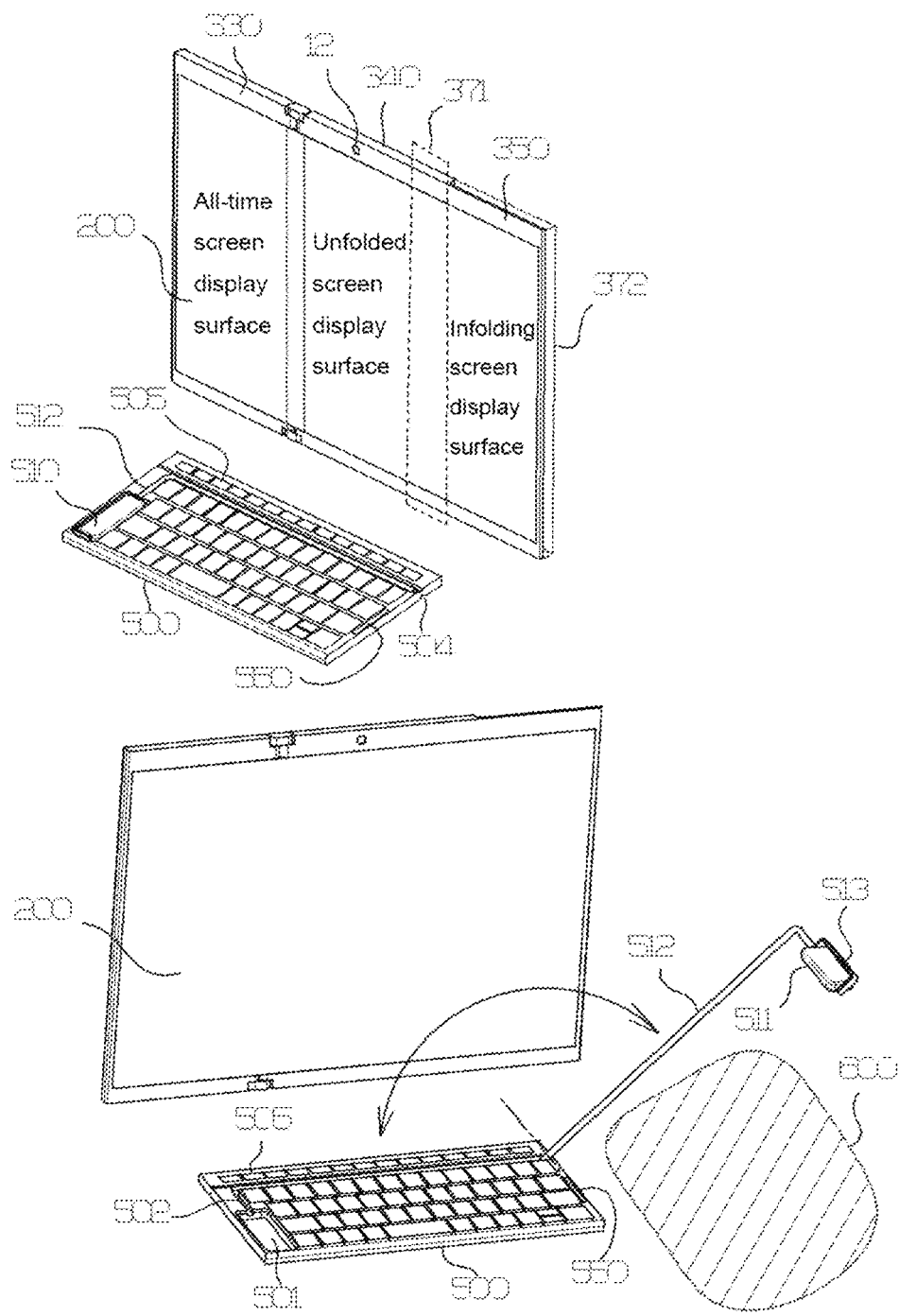
FIG. 25 is perspective views showing an example of separating the keyboard unit having a camera unit of a protruding and unfolded state, in the fully unfolded state of the fourth embodiment.

FIG. 22 is a front view, a rear view, a bottom view and a top view showing a folded state of a fourth embodiment applying a detachable keyboard unit to a dual-folding image display device implementing both infolding and outfolding, FIG. 23 is a front view, a bottom view and a top view showing a fully unfolded state of the fourth embodiment, FIG. 24 is a rear view showing a fully unfolded state of the fourth embodiment, and FIG. 25 is perspective views showing an example of separating the keyboard unit having a camera unit of a protruding and unfolded state, in the fully unfolded state of the fourth embodiment.

Figure 26:
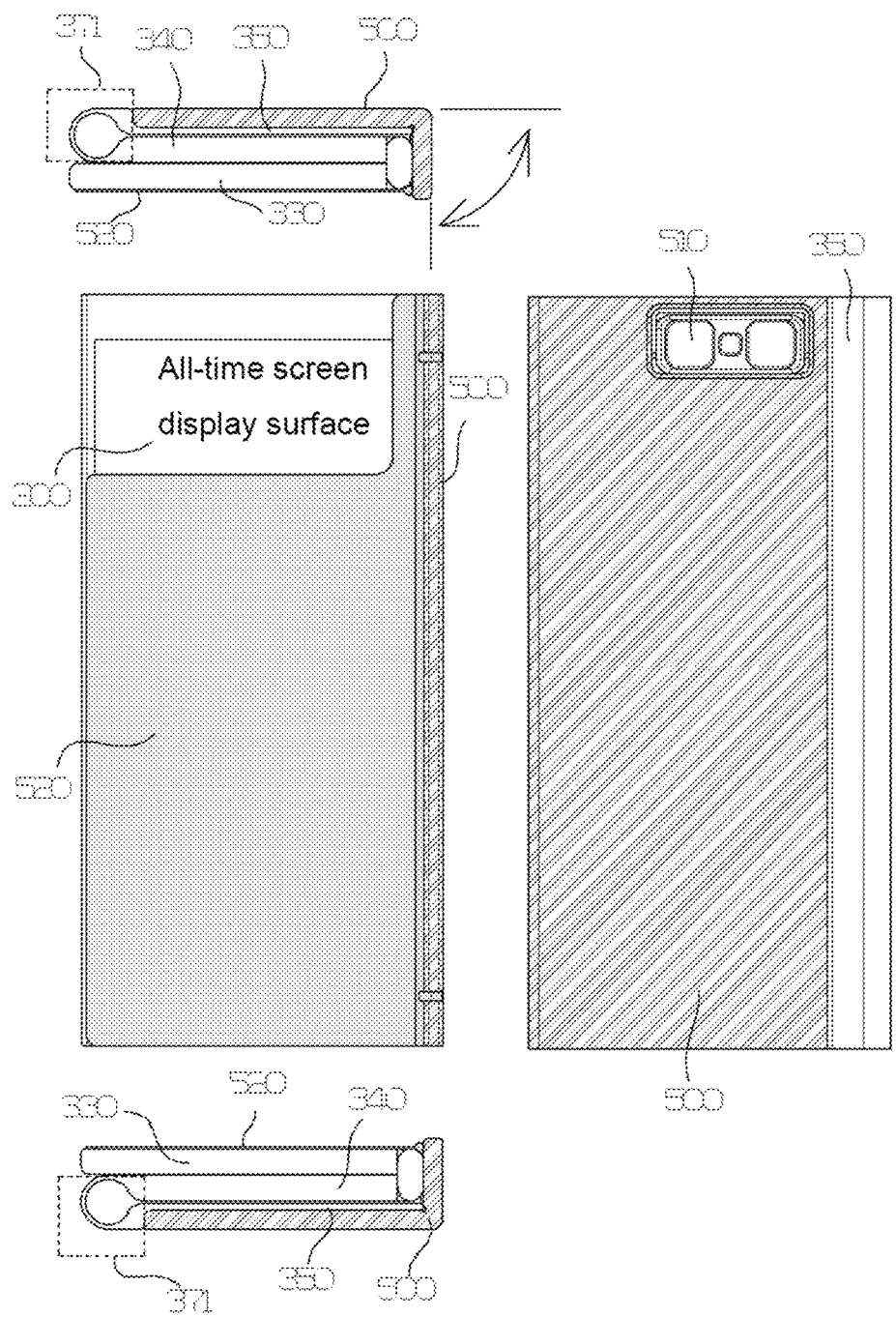
FIG. 26 is a front view, a rear view, a bottom view and a top view showing a folded state of a fifth embodiment additionally applying a display device cover which covers an all-time display screen of a two-stage folding image display device to the keyboard unit of the fourth embodiment.
Figure 27:
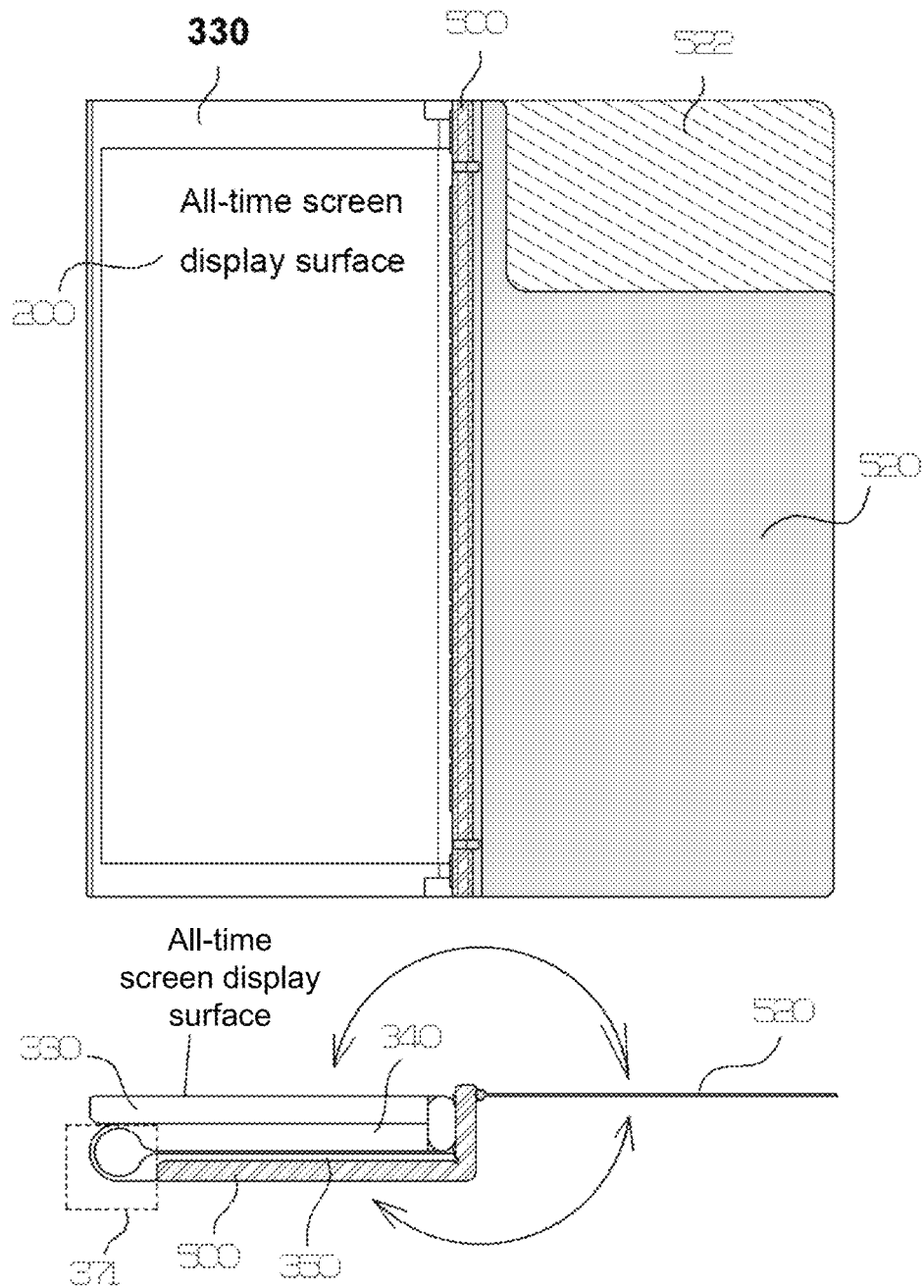
FIG. 27 is a front view, a rear view, a bottom view and a top view showing a rotated and unfolded state of the display device cover in a state as shown in FIG. 26 of the fifth embodiment.
Figure 28:
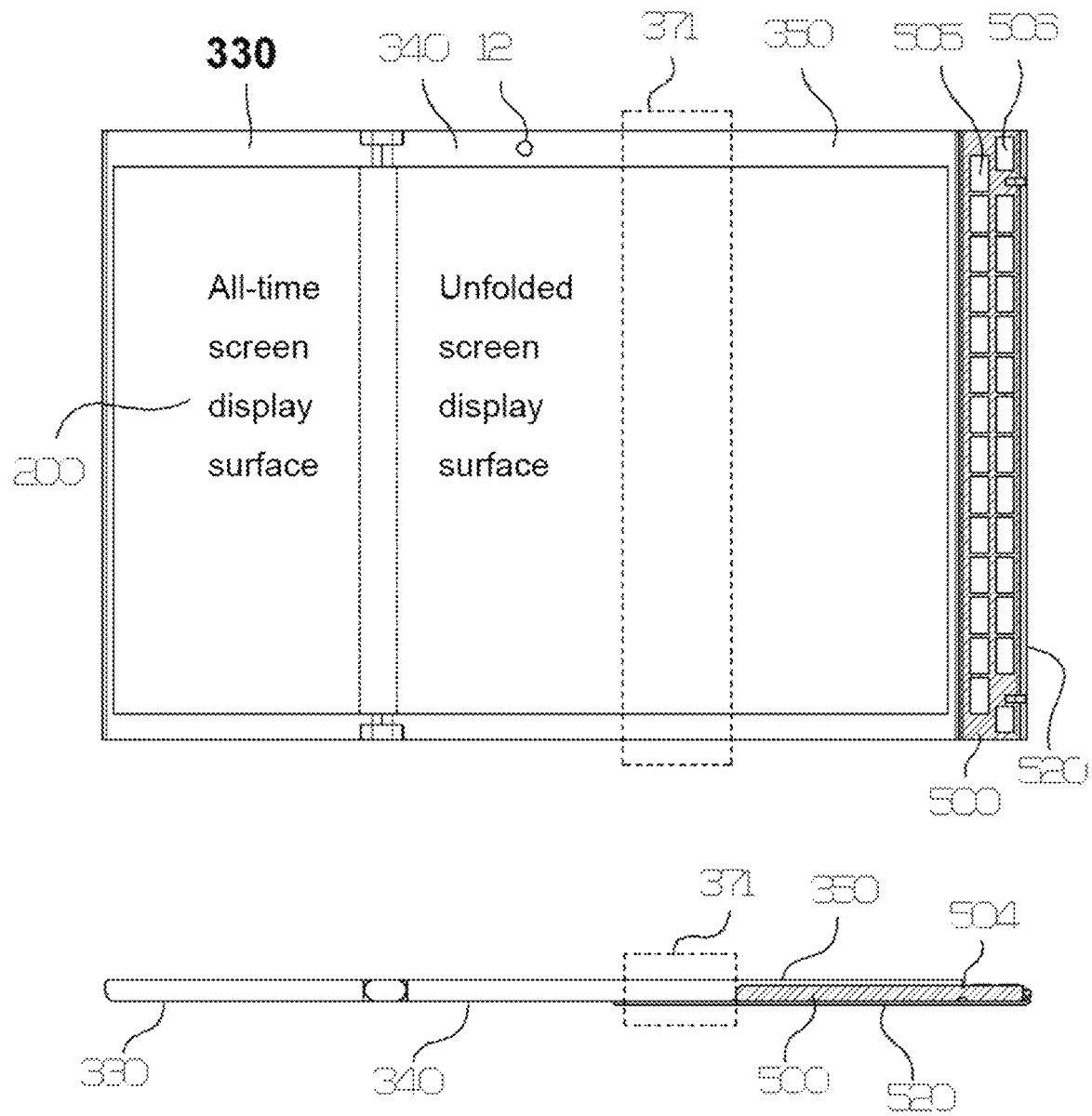
FIG. 28 is a front view and a bottom view showing a rotated and unfolded state of the display device cover, in the fully unfolded state of the fifth embodiment.
Figure 29:
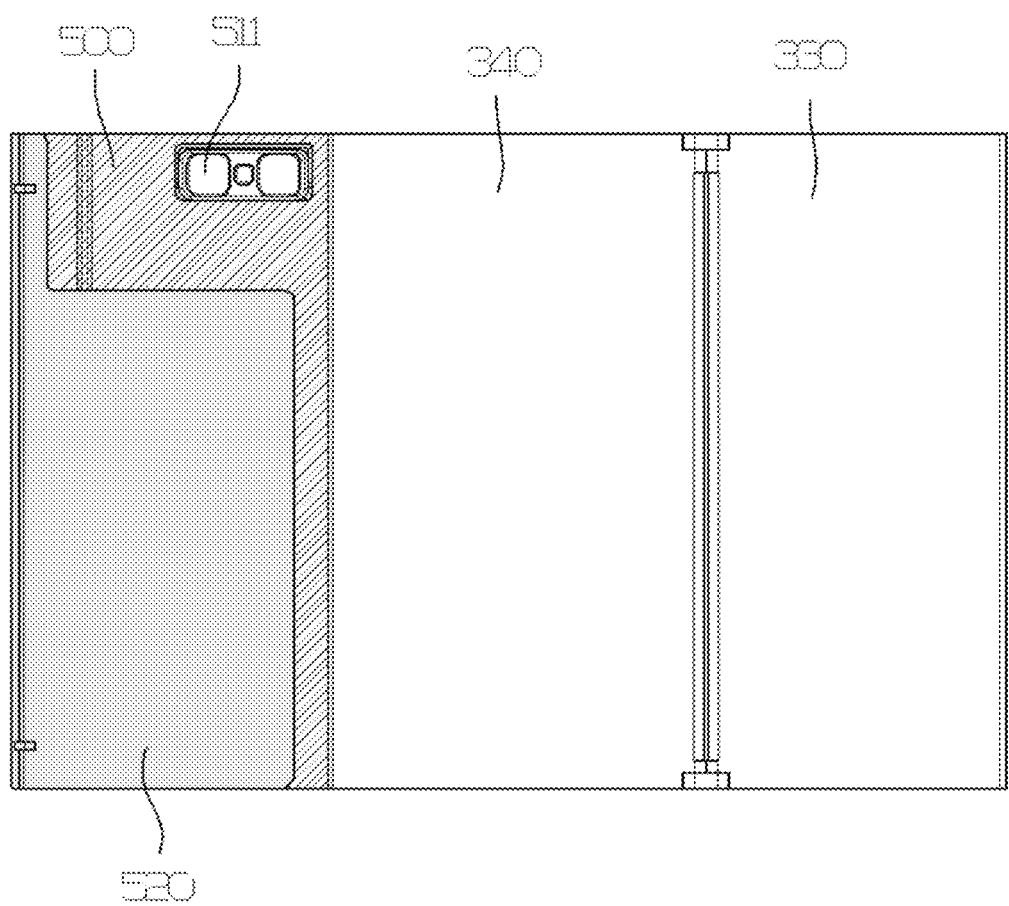
FIG. 29 is a rear view of FIG. 28 of the fifth embodiment.
Figure 30:
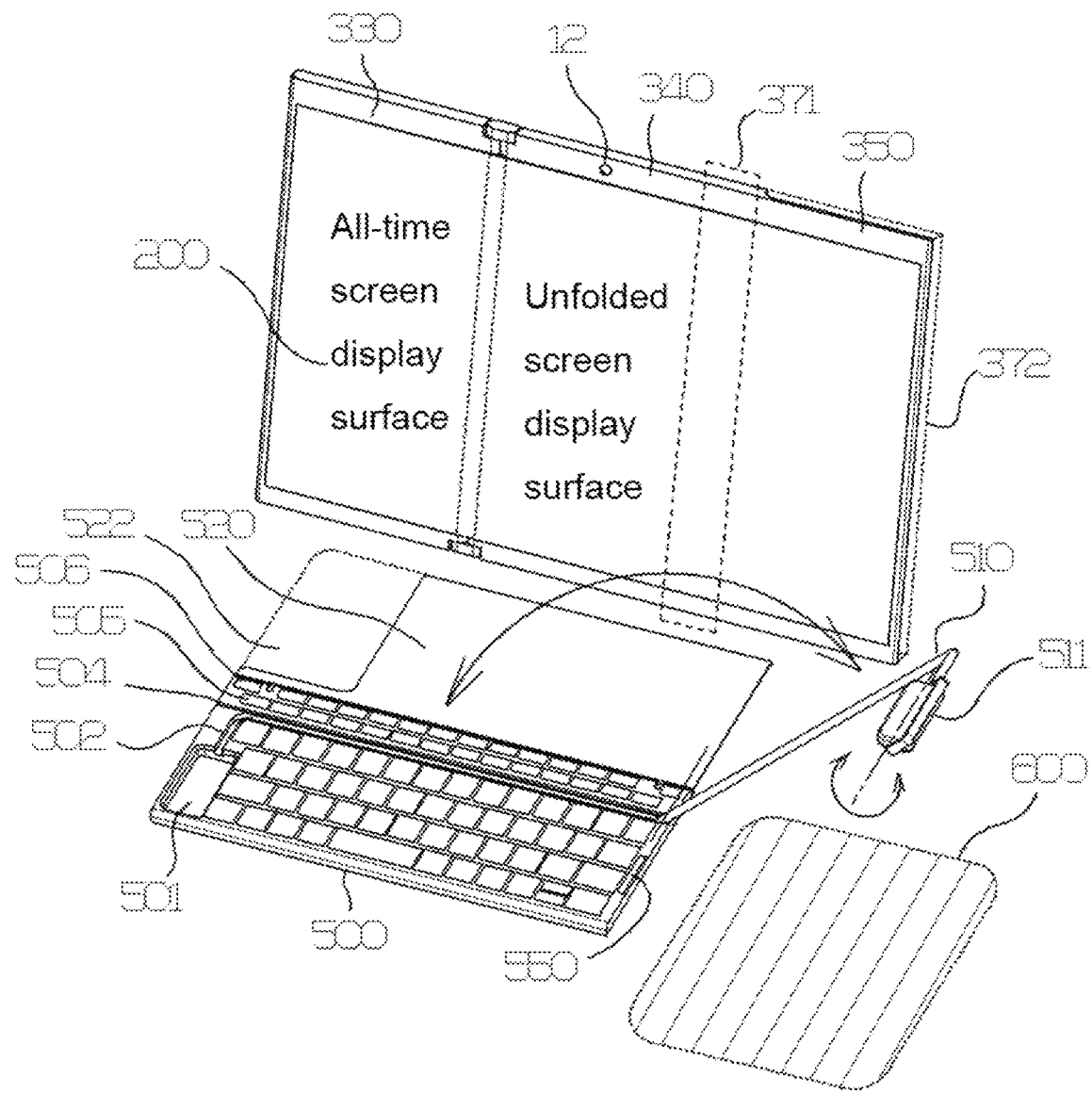
FIG. 30 is a perspective view showing an example of separating the keyboard unit having a camera unit of a protruding and unfolded state, in the fully unfolded state of the fifth embodiment.
Figure 31:
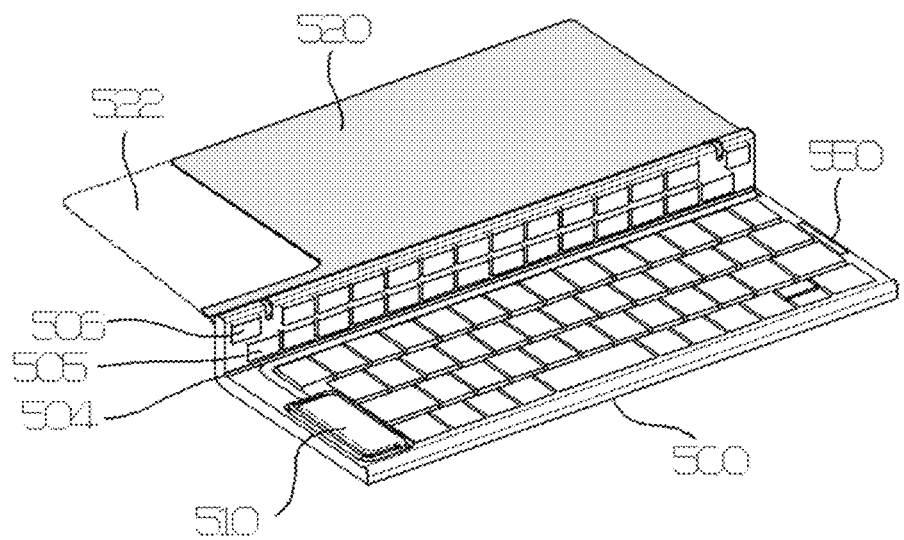
FIG. 31 is a perspective view showing the keyboard unit and an assembly view showing the display device cover of the fifth embodiment.
Figure 31:
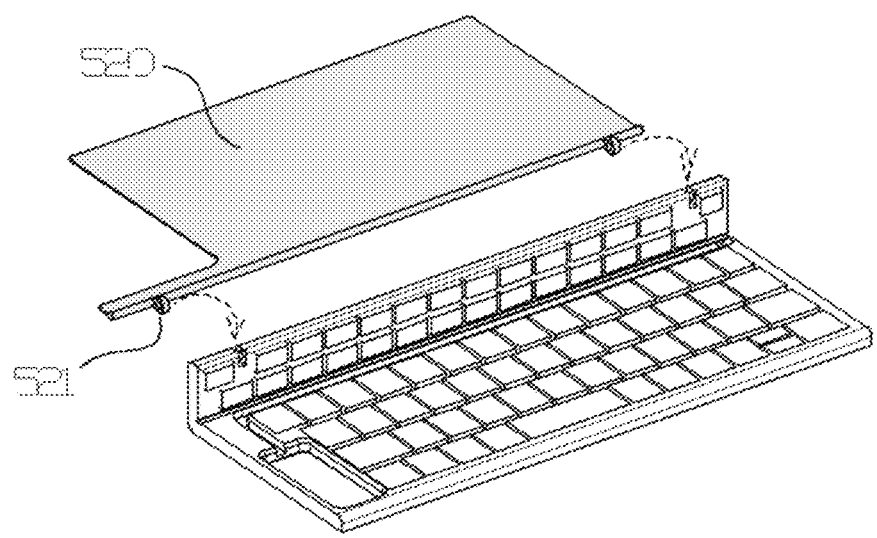

In addition, FIG. 26 is a front view, a rear view, a bottom view and a top view showing a folded state of a fifth embodiment additionally applying a display device cover which covers an all-time display screen of a two-stage folding image display device to the keyboard unit of the fourth embodiment, FIG. 27 is a front view, a rear view, a bottom view and a top view showing a rotated and unfolded state of the display device cover in a state as shown in FIG. 26 of the fifth embodiment, FIG. 28 is a front view and a bottom view showing a rotated and unfolded state of the display device cover, in the fully unfolded state of the fifth embodiment, FIG. 29 is a rear view of FIG. 28 of the fifth embodiment, FIG. 30 is a perspective view showing an example of separating the keyboard unit having a camera unit of a protruding and unfolded state, in the fully unfolded state of the fifth embodiment, and FIG. 31 is a perspective view showing the keyboard unit and an assembly view showing the display device cover of the fifth embodiment.

As shown in FIGS. 22 to 25, the bodies 300 of the fourth embodiment and the fifth embodiment include a center body 340 for supporting the center portion of the flexible display device 200 on the front surface, including a component for performing outfolding at one side where folding can be performed, and including a minimum curvature section 371 for securing a minimum curvature in case of an infolding state at the opposite side where folding can be performed; an upper body 330 including a component for performing outfolding on one side and connected to the center body 340 to perform outfolding at an end portion of the flexible display device 200 together with the center body 340, configuring a free end at the opposite end portion, and supporting an end portion of the flexible display device 200 on the front surface; and a lower body 350 sharing the minimum curvature section 371 with the center body 340 at one side connected to the center body 340 and capable of performing infolding, configuring a free end at the opposite end portion, and supporting the opposite end portion of the flexible display device 200 on the front surface.

The keyboard application space 372 is formed by removing an area on the opposite side of the front surface of the lower body 350, and outside the minimum curvature section 371.

Figure 59:
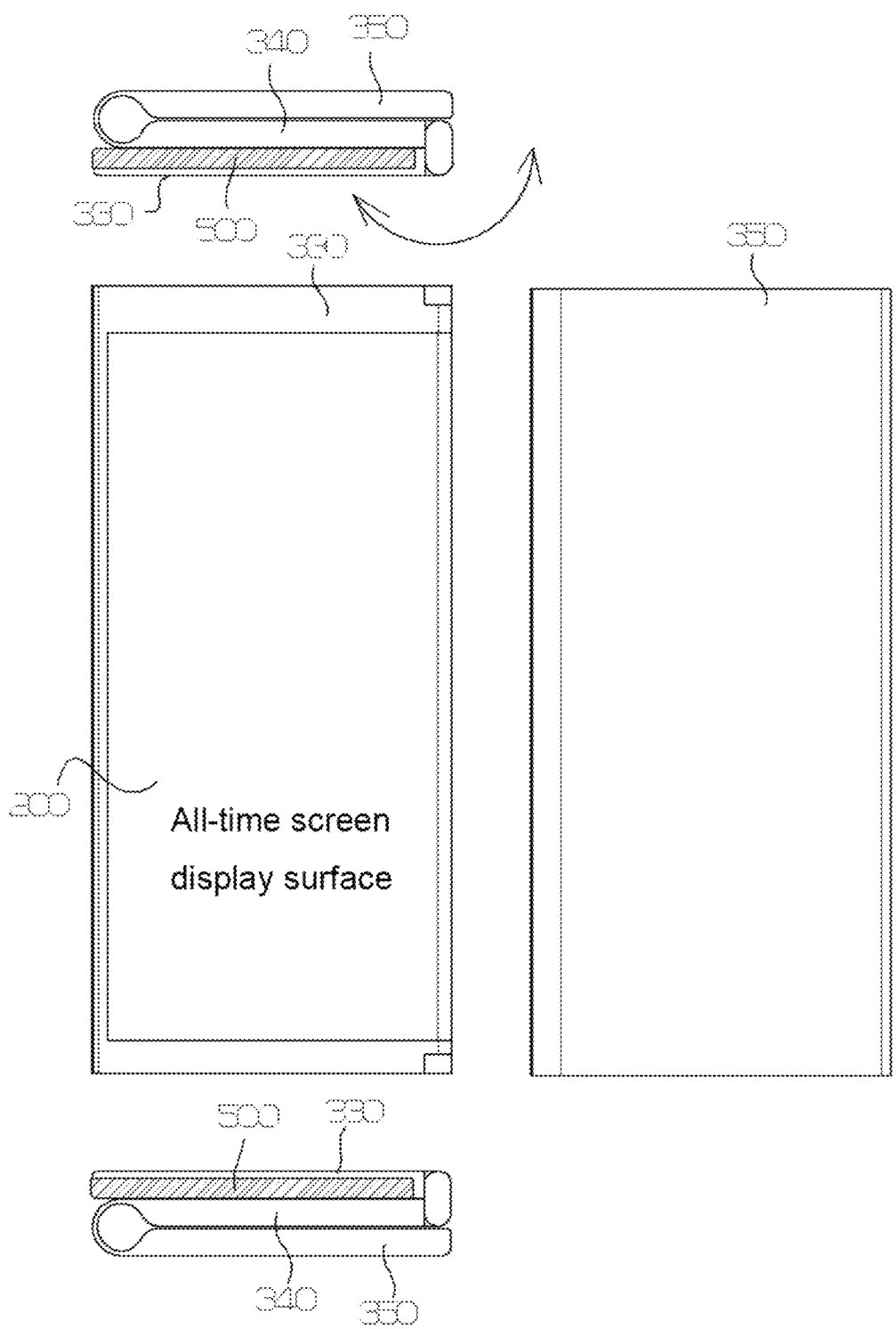
FIG. 59 is a front view, a rear view, a bottom view and a top view showing a folded state of an eleventh embodiment applying a detachable keyboard unit to the upper body of a dual-folding image display device implementing both infolding and outfolding.
Figure 60:
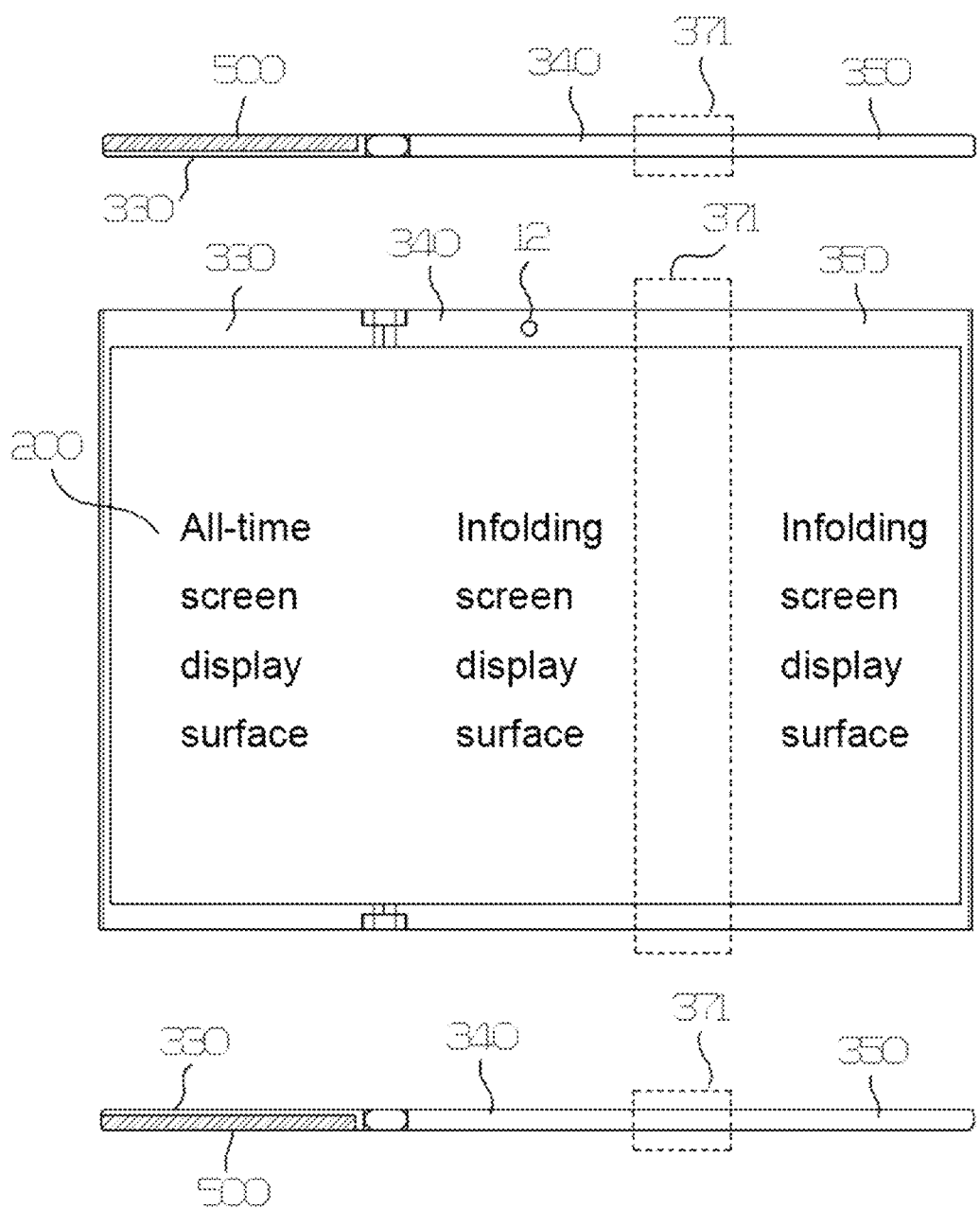
FIG. 60 is a front view, a bottom view and a top view showing a fully unfolded state of the eleventh embodiment.
Figure 61:
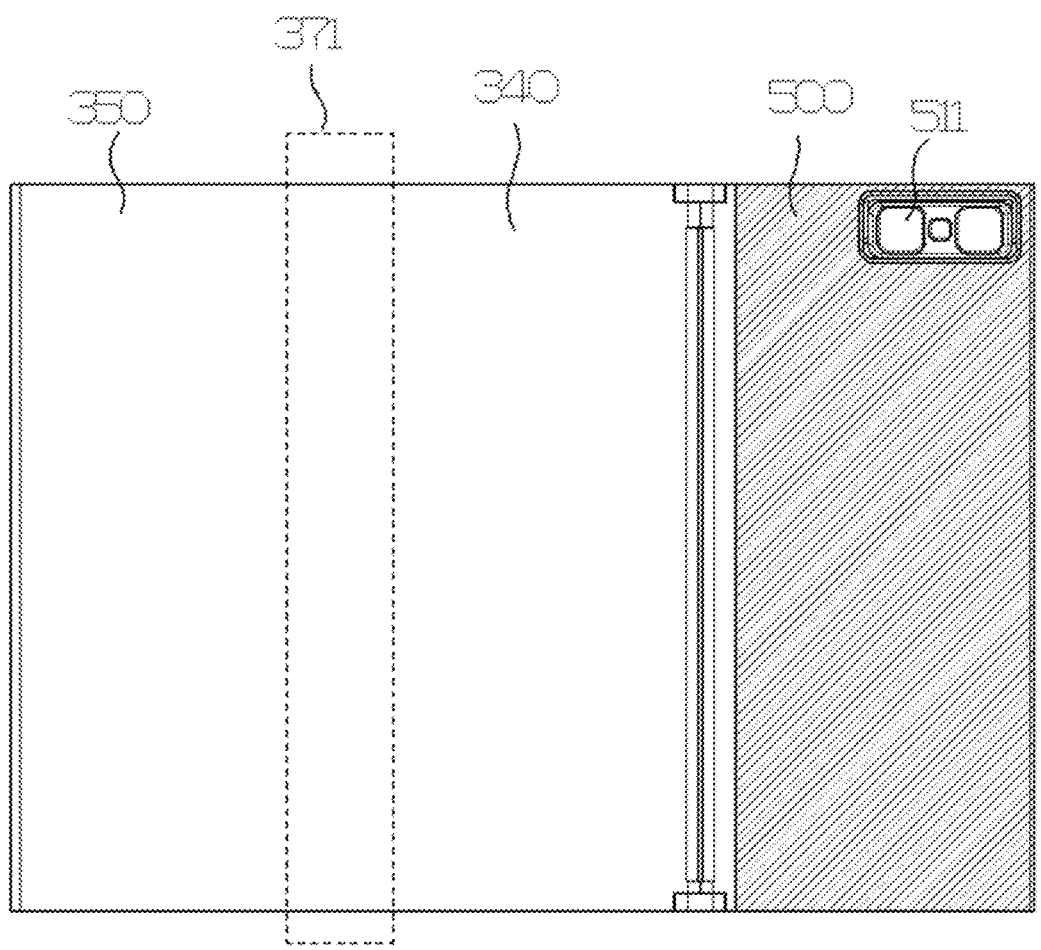
FIG. 61 is a rear view showing a fully unfolded state of the eleventh embodiment.
Figure 62:
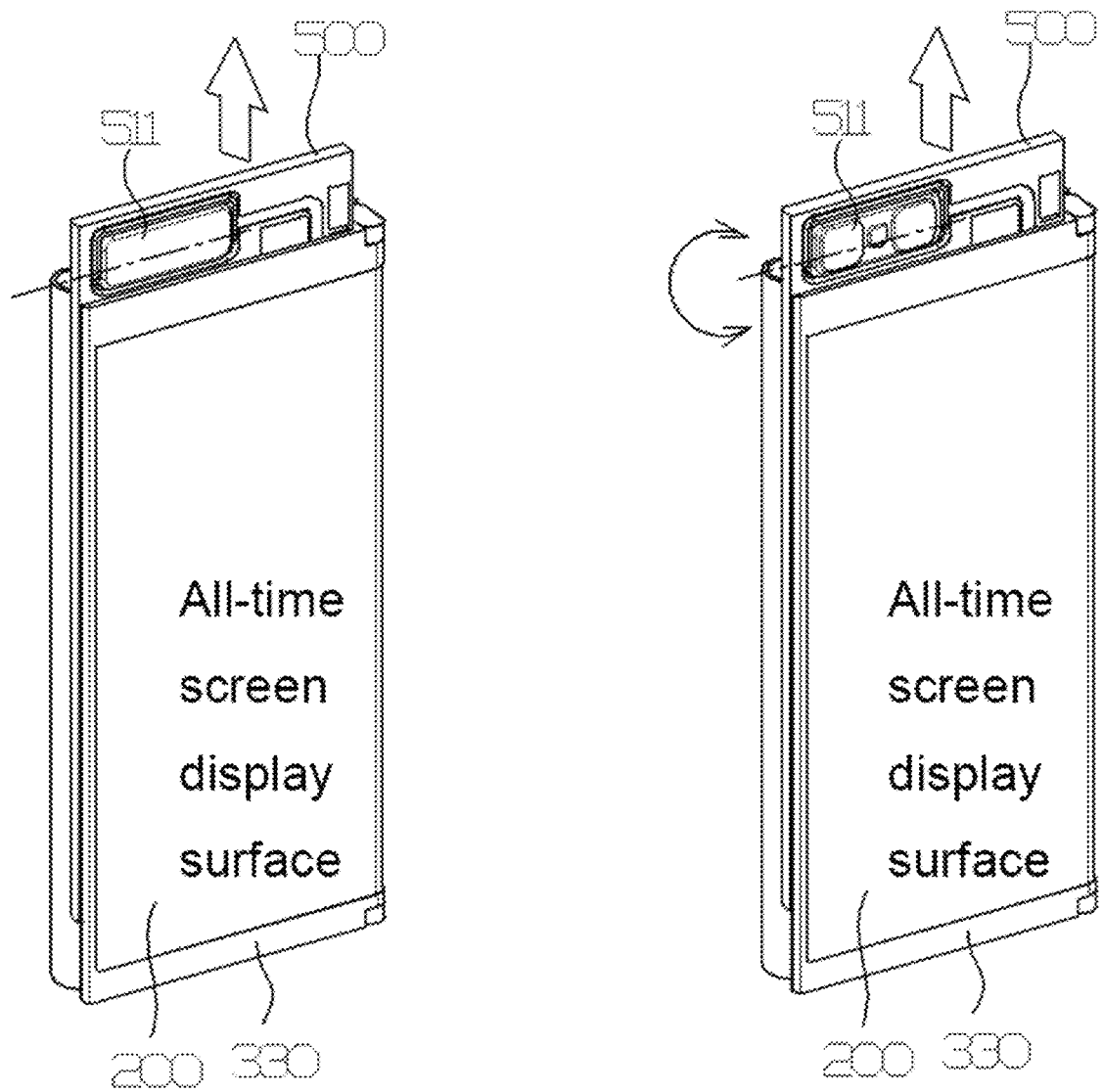
FIG. 62 is conceptual views showing that the keyboard unit partially protrudes and is able to photograph the rear side using a camera module, in the folded state of FIG. 59 of the eleventh embodiment.

FIG. 59 is a front view, a rear view, a bottom view and a top view showing a folded state of an eleventh embodiment applying a detachable keyboard unit to the upper body of a dual-folding image display device implementing both infolding and outfolding, FIG. 60 is a front view, a bottom view and a top view showing a fully unfolded state of the eleventh embodiment, FIG. 61 is a rear view showing a fully unfolded state of the eleventh embodiment, FIG. 62 is conceptual views showing that the keyboard unit partially protrudes and is able to photograph the rear side using a camera module, in the folded state of FIG. 59 of the eleventh embodiment, and FIG. 63 is perspective views showing examples of a process of withdrawing the keyboard unit in the folded state of FIG. 59 of the eleventh embodiment and a perspective view showing an example of using the same.

As shown in FIGS. 59 to 63, the body 300 of the eleventh embodiment includes a center body 340 for supporting the center portion of the flexible display device 200 on the front surface, including a component for performing outfolding at one side where folding can be performed, and including a minimum curvature section 371 for securing a minimum curvature in case of an infolding state at the opposite side where folding can be performed; an upper body 330 including a component for performing outfolding on one side and connected to the center body 340 to perform outfolding at an end portion of the flexible display device 200 together with the center body 340, configuring a free end at the opposite end portion, and supporting an end portion of the flexible display device 200 on the front surface; and a lower body 350 sharing the minimum curvature section 371 with the center body 340 at one side connected to the center body 340 and capable of performing infolding, configuring a free end at the opposite end portion, and supporting the opposite end portion of the flexible display device 200 on the front surface.

The keyboard application space 372 is formed by removing a predetermined area on the opposite side of the front surface of the upper body 330.

Among the embodiments of the image display device 100 provided with a keyboard, the sixth embodiment described below is targeting an infolding rollable image display device performing infolding at one side and performing rollable unfolding at the opposite side.

Figure 32:
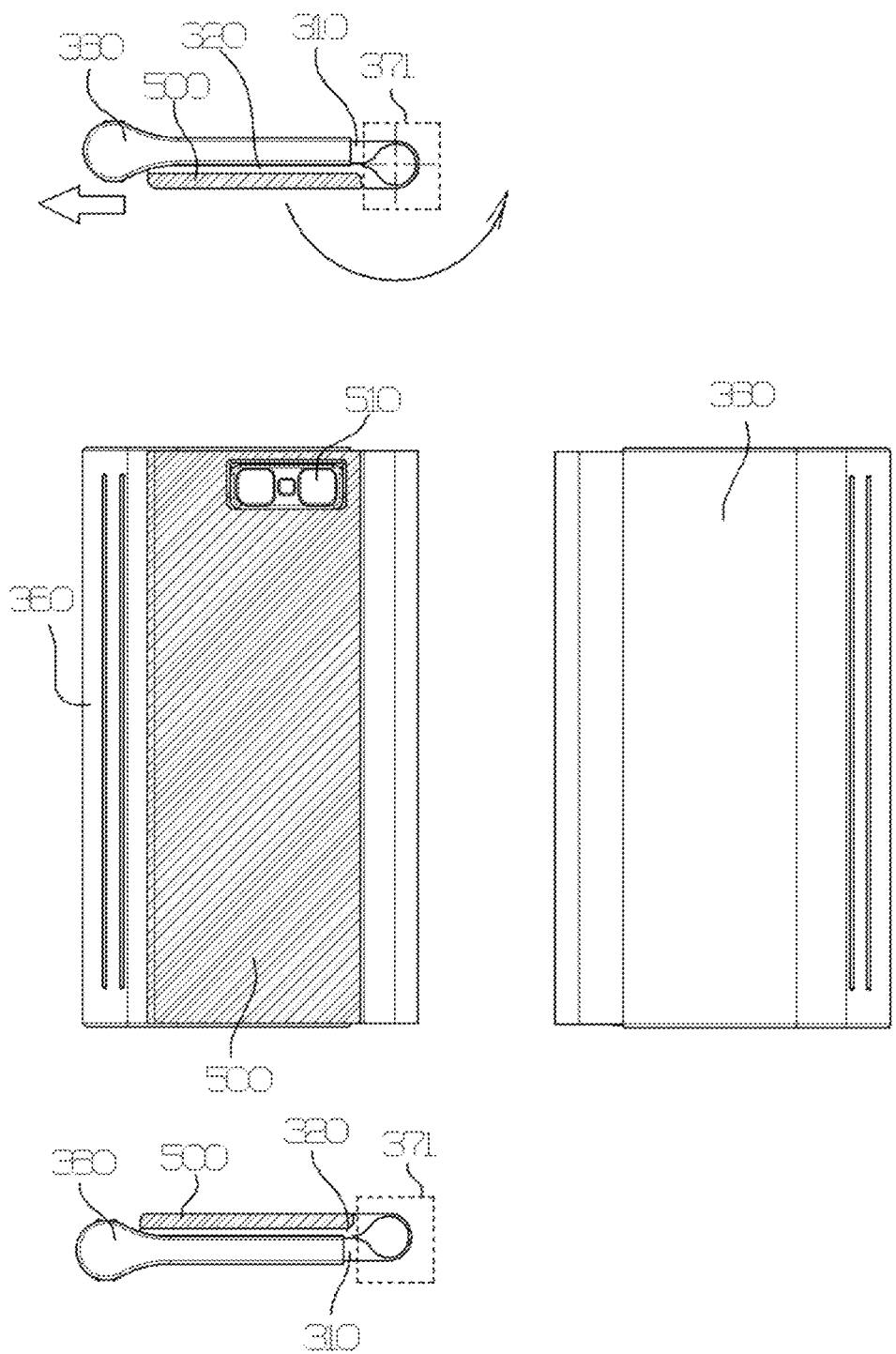
FIG. 32 is a front view, a rear view, a bottom view and a top view showing a folded state of a sixth embodiment applying a detachable keyboard unit to an infolding rollable image display device, in which infolding is performed at one side and rollable unfolding is performed at the opposite side.
Figure 33:
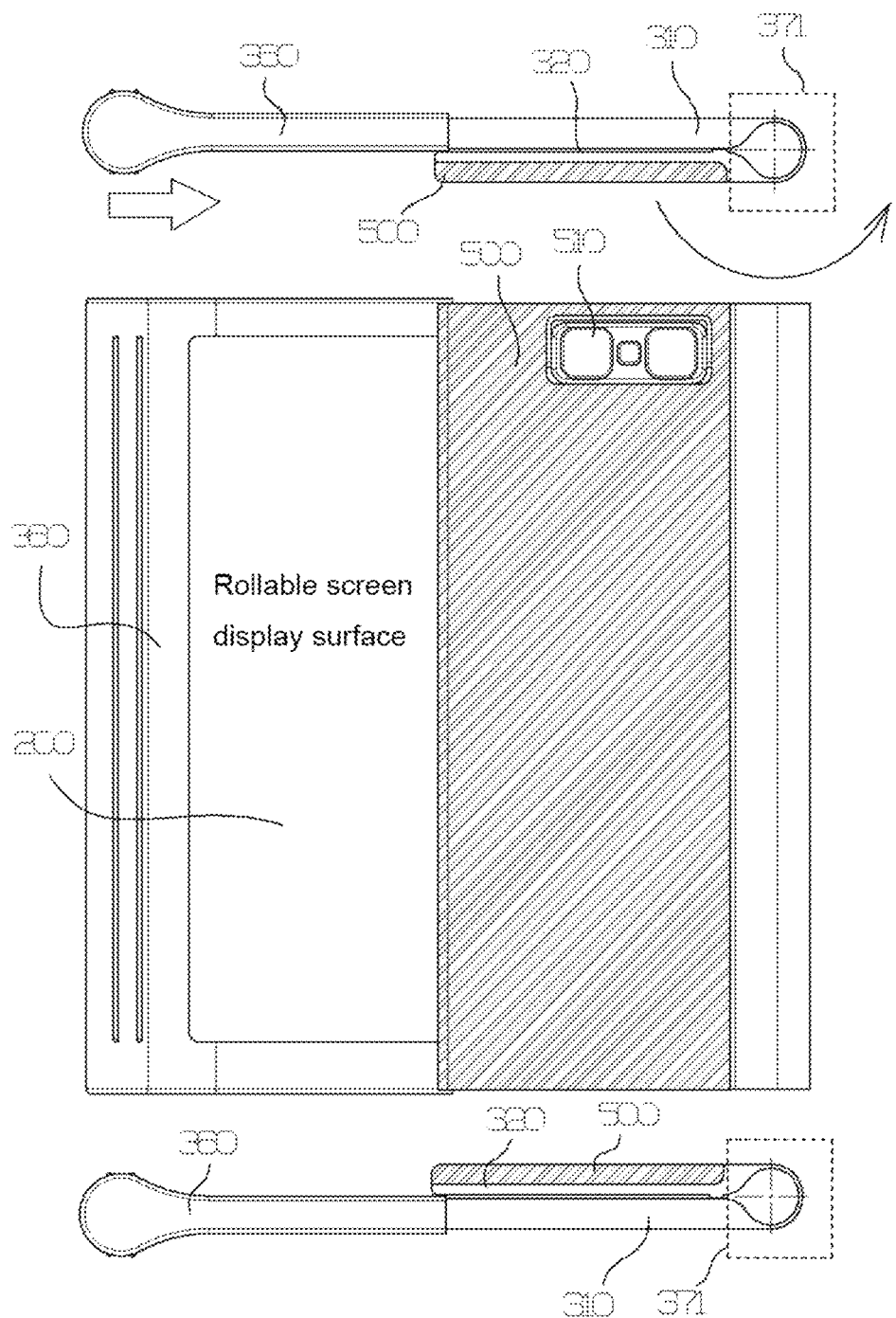
FIG. 33 is a front view, a bottom view and a top view showing an infolding rollable image display device, in which only rollable unfolding is performed in the state of FIG. 32 of the sixth embodiment.
Figure 34:
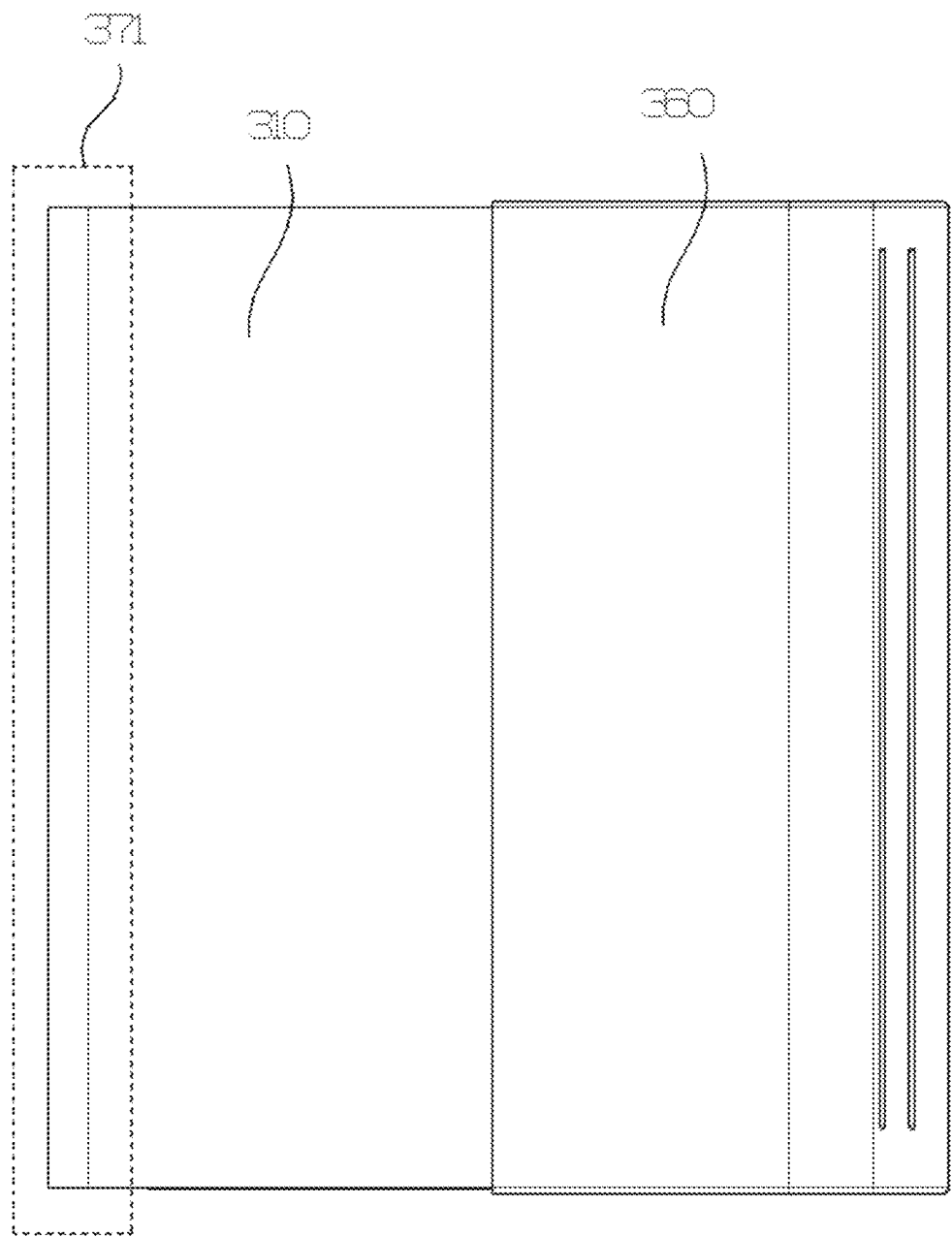
FIG. 34 is a rear view showing an infolding rollable image display device, in which only rollable unfolding is performed in the state of FIG. 32 of the sixth embodiment.
Figure 35:
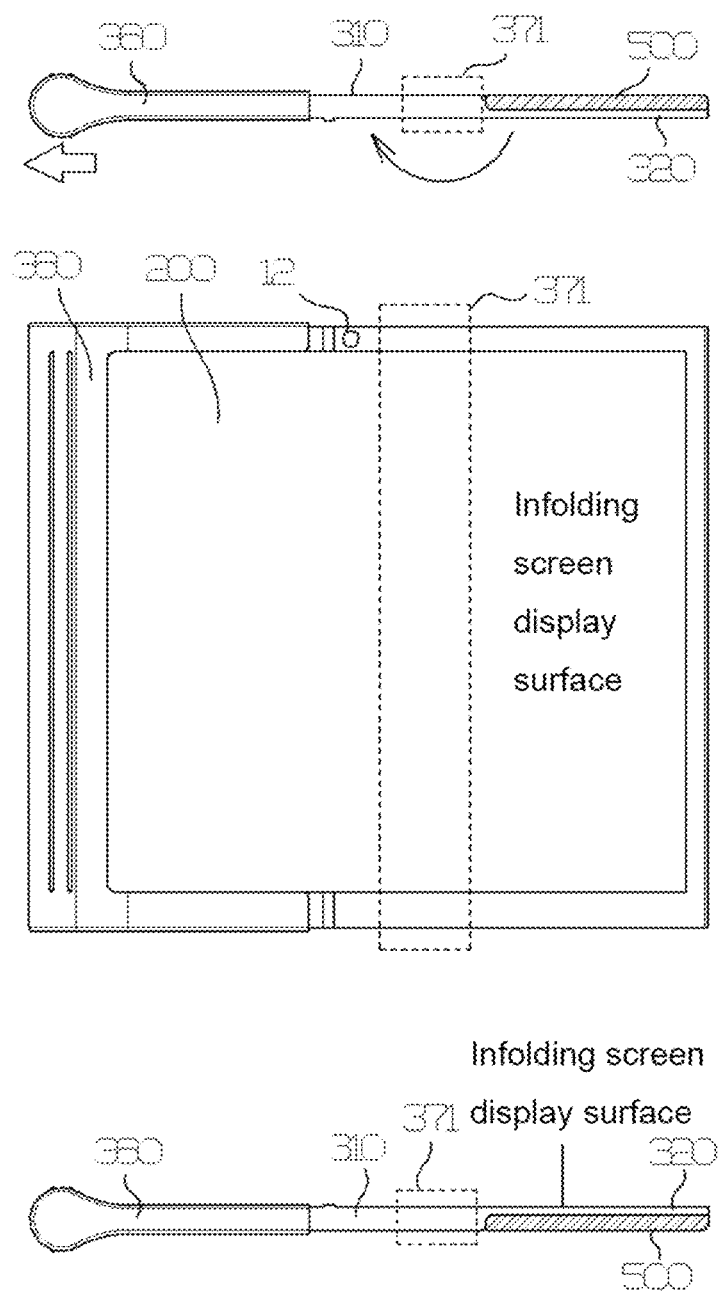
FIG. 35 is a front view, a bottom view and a top view showing an infolding rollable image display device, in which only infolding unfolding is performed in the state of FIG. 32 of the sixth embodiment.
Figure 36:
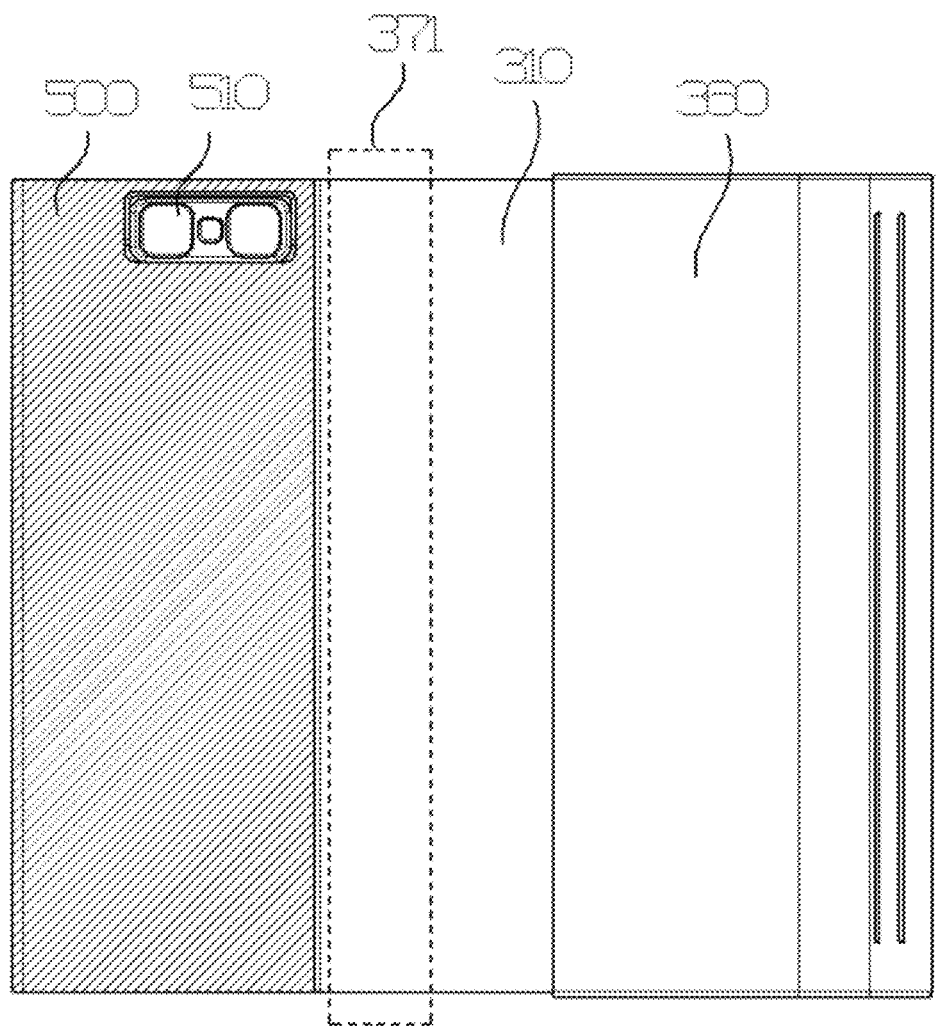
FIG. 36 is a rear view showing an infolding rollable image display device, in which only infolding unfolding is performed in the state of FIG. 32 of the sixth embodiment.
Figure 37:
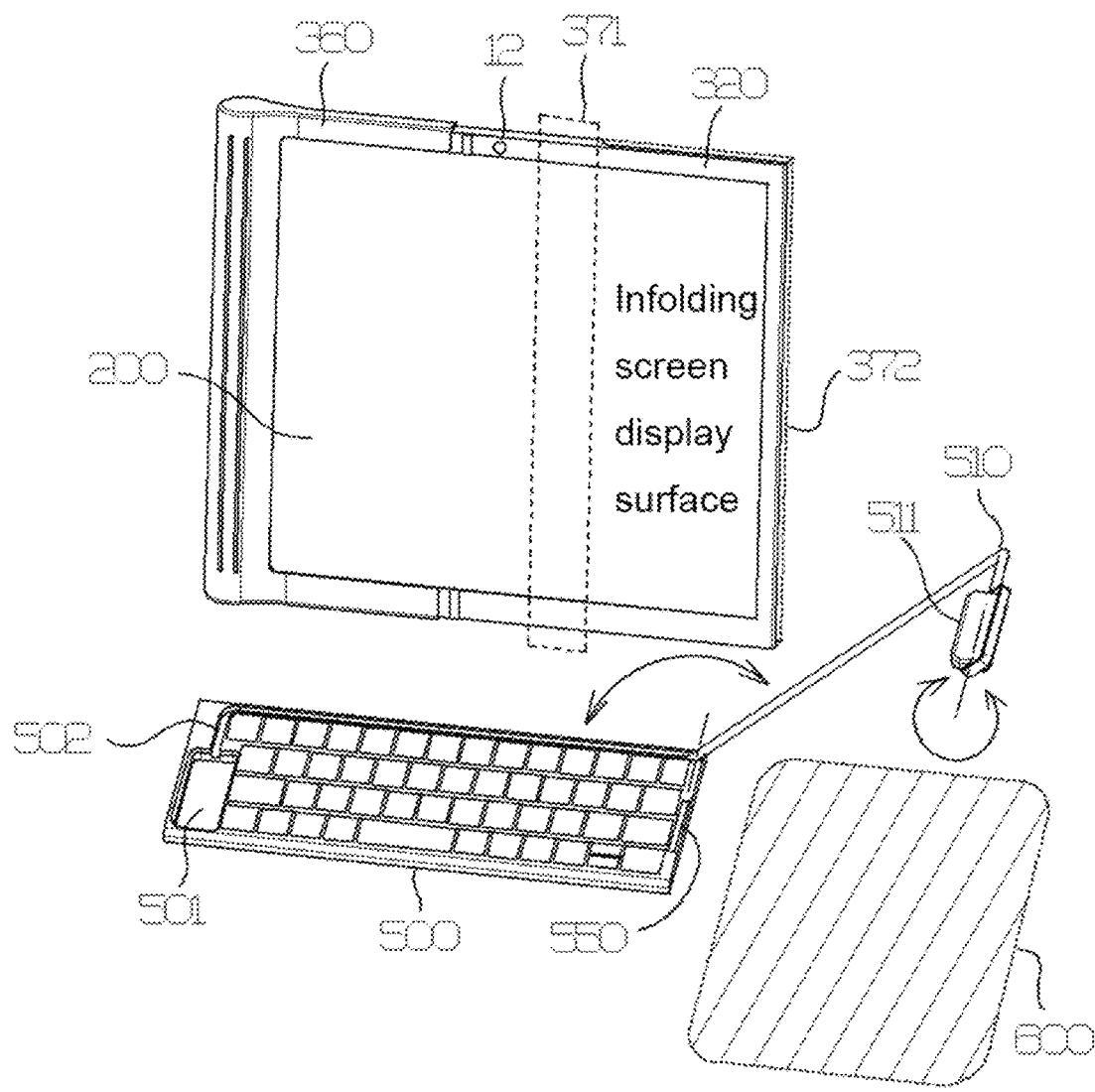
FIG. 37 is a perspective view showing an example of separating the keyboard unit having a camera unit of a protruding and unfolded state, in the state of FIG. 35 of the sixth embodiment.
Figure 38:
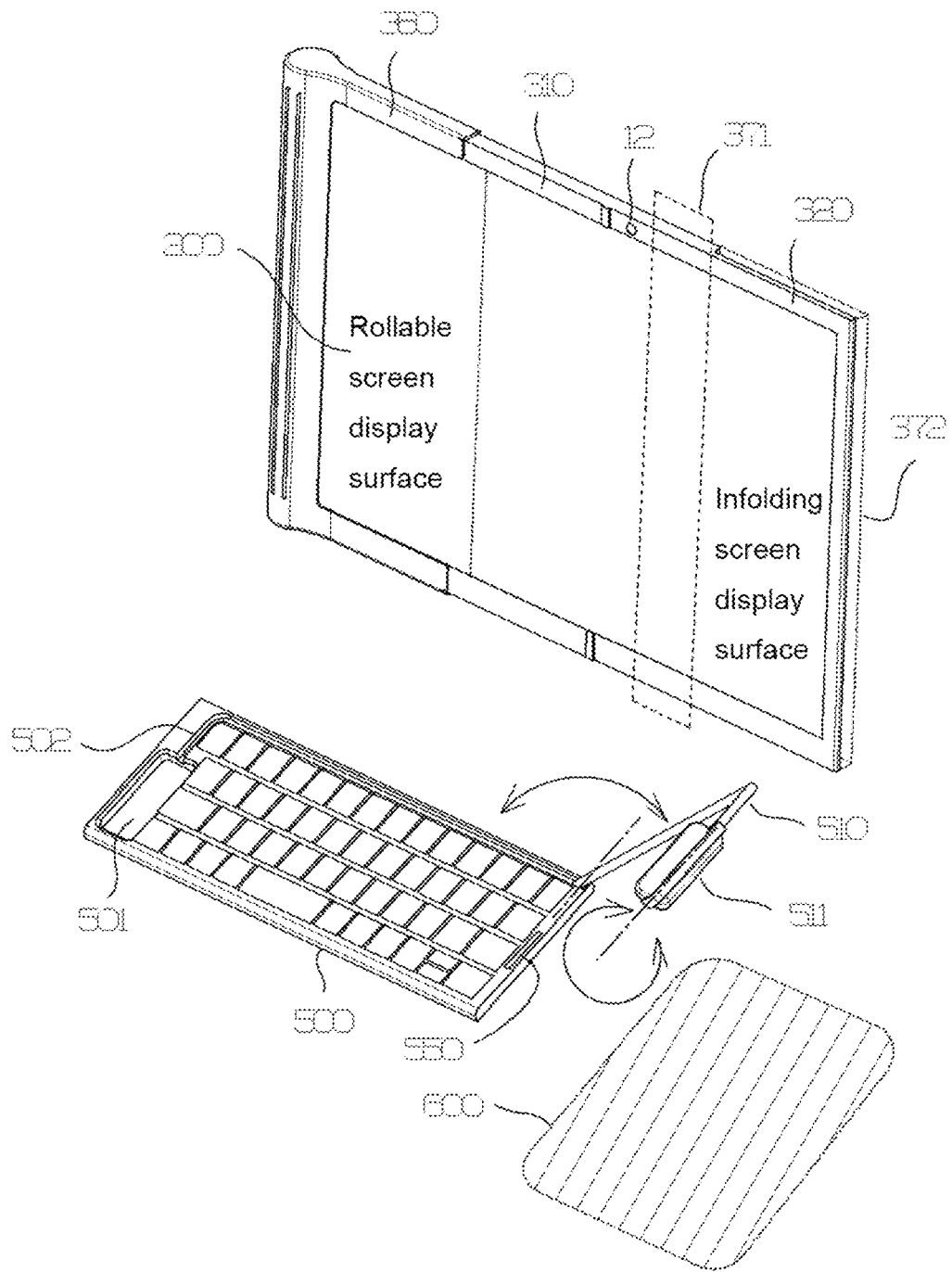
FIG. 38 is a perspective view showing an example of separating the keyboard unit having a camera unit of a protruding and unfolded state, in the fully unfolded state of the sixth embodiment.

FIG. 32 is a front view, a rear view, a bottom view and a top view showing a folded state of a sixth embodiment applying a detachable keyboard unit to an infolding rollable image display device, in which infolding is performed at one side and rollable unfolding is performed at the opposite side, FIG. 33 is a front view, a bottom view and a top view showing an infolding rollable image display device, in which only rollable unfolding is performed in the state of FIG. 32 of the sixth embodiment, FIG. 34 is a rear view showing an infolding rollable image display device, in which only rollable unfolding is performed in the state of FIG. 32 of the sixth embodiment, FIG. 35 is a front view, a bottom view and a top view showing an infolding rollable image display device, in which only infolding unfolding is performed in the state of FIG. 32 of the sixth embodiment, FIG. 36 is a rear view showing an infolding rollable image display device, in which only infolding unfolding is performed in the state of FIG. 32 of the sixth embodiment, FIG. 37 is a perspective view showing an example of separating the keyboard unit having a camera unit of a protruding and unfolded state, in the state of FIG. 35 of the sixth embodiment, and FIG. 38 is a perspective view showing an example of separating the keyboard unit having a camera unit of a protruding and unfolded state, in the fully unfolded state of the sixth embodiment.

As shown in FIGS. 32 to 38, the body 300 of the eleventh embodiment includes an infolding body 1 310 for supporting the center portion of the flexible display device 200 on the front surface, including a minimum curvature section 371 for securing a minimum curvature in case of an infolding state at one side where infolding can be performed, and applying a configuration and a component related to performing rolling on one end portion of the flexible display device 200 at one side opposite to the one side where infolding can be performed; a rollable cover 360 provided with a configuration and a component related to performing rolling on one end portion of the flexible display device 200, and connected to one side of the infolding body 1 310; and an infolding body 2 320 connected to one side where infolding of the infolding body 1 310 can be performed, sharing the minimum curvature section 371 with the infolding body 1 310 at the one side where infolding can be performed, and supporting the opposite end portion of the flexible display device 200 on the front surface.

The keyboard application space 372 is formed by removing an area on the opposite side of the front surface of the infolding body 2 320, and outside the minimum curvature section 371.

Among the embodiments of the image display device 100 provided with a keyboard, the seventh and eighth embodiments described below are targeting an outfolding image display device, and the bodies of the seventh and eighth embodiments are the same, and unlike the seventh embodiment, an embodiment applying the keyboard unit 500 additionally applied with the display device cover 520 and the edge cover 523 is the eighth embodiment.

Figure 39:
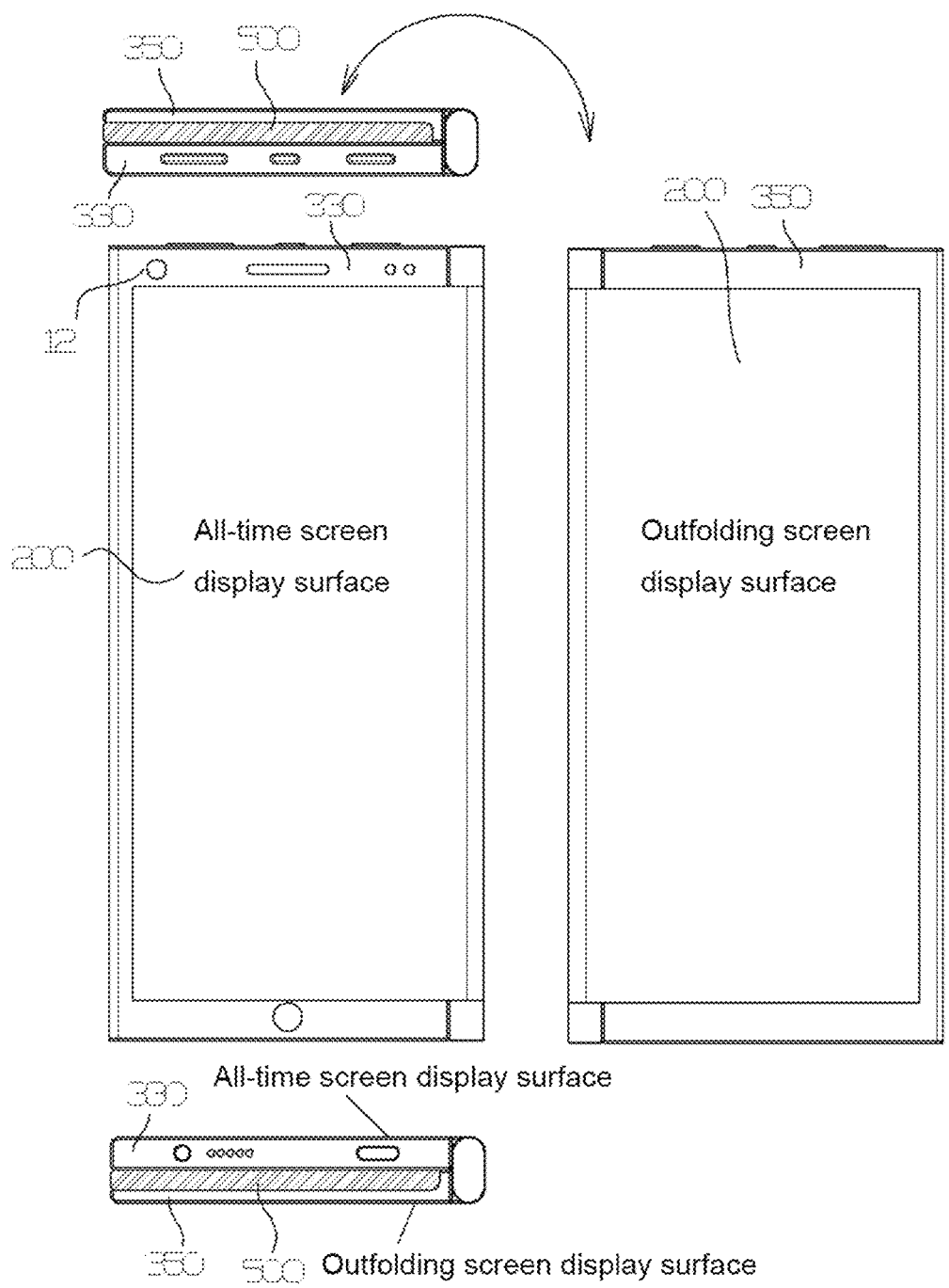
FIG. 39 is a front view, a rear view, a bottom view and a top view showing a folded state of a seventh embodiment applying a detachable keyboard unit to an outfolding image display device.
Figure 40:
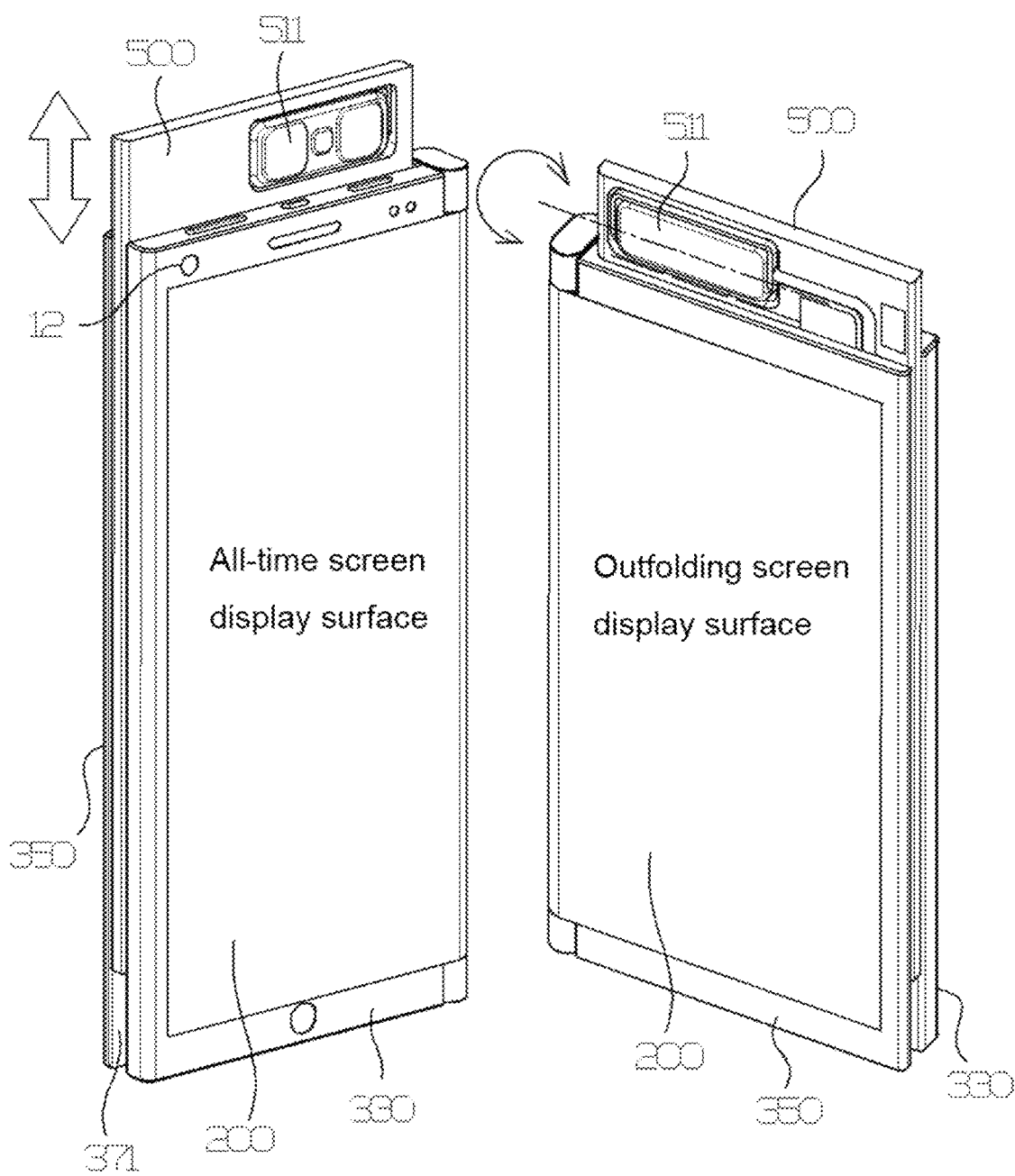
FIG. 40 is conceptual views showing that the keyboard unit partially protrudes and is able to photograph the rear side using a camera module, in the folded state of FIG. 39 of the seventh embodiment.
Figure 41:
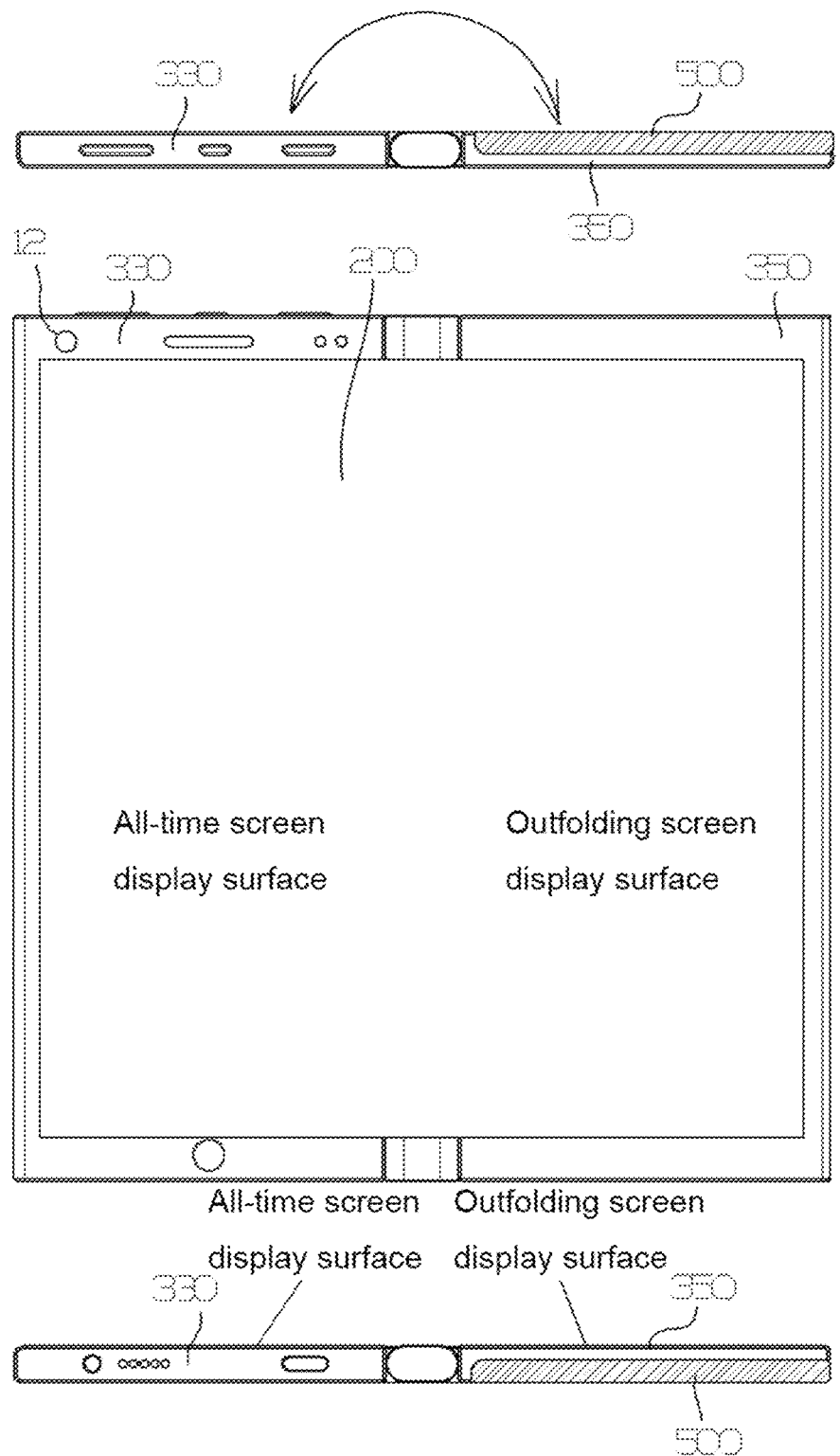
FIG. 41 is a front view, a bottom view and a top view showing an outfolding unfolded state of the seventh embodiment.
Figure 42:
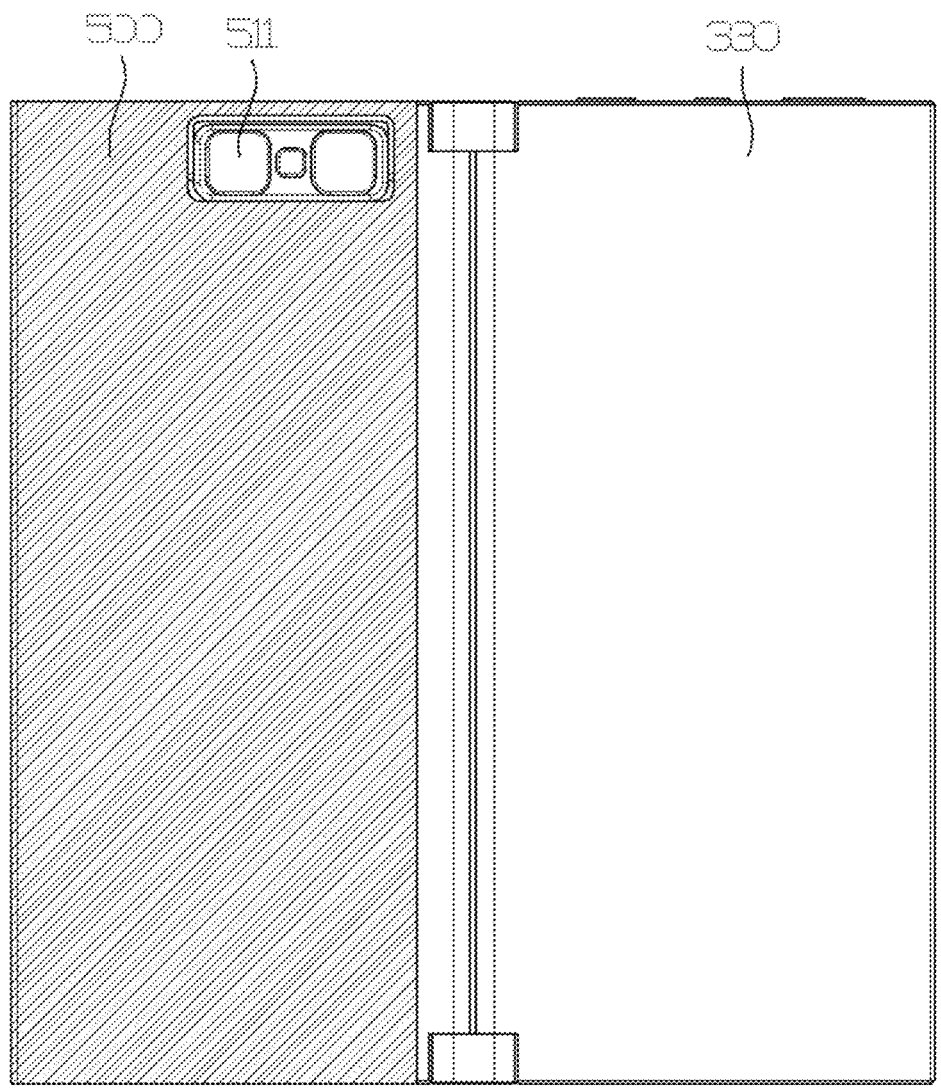
FIG. 42 is a rear view of FIG. 41 of the seventh embodiment.
Figure 43:
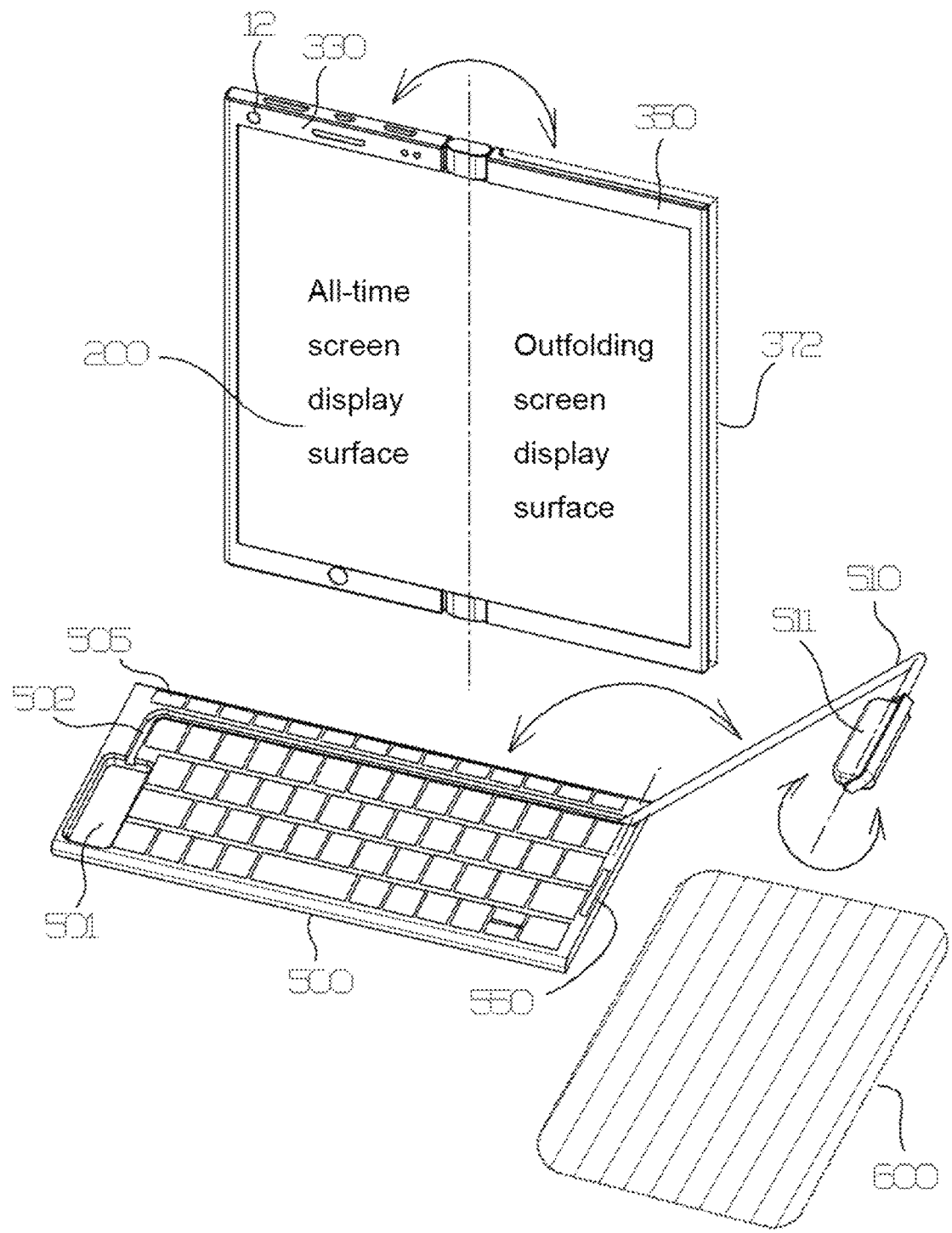
FIG. 43 is a perspective view showing an example of separating the keyboard unit having a camera unit of a protruding and unfolded state, in the outfolding unfolded state of the seventh embodiment.
Figure 44:
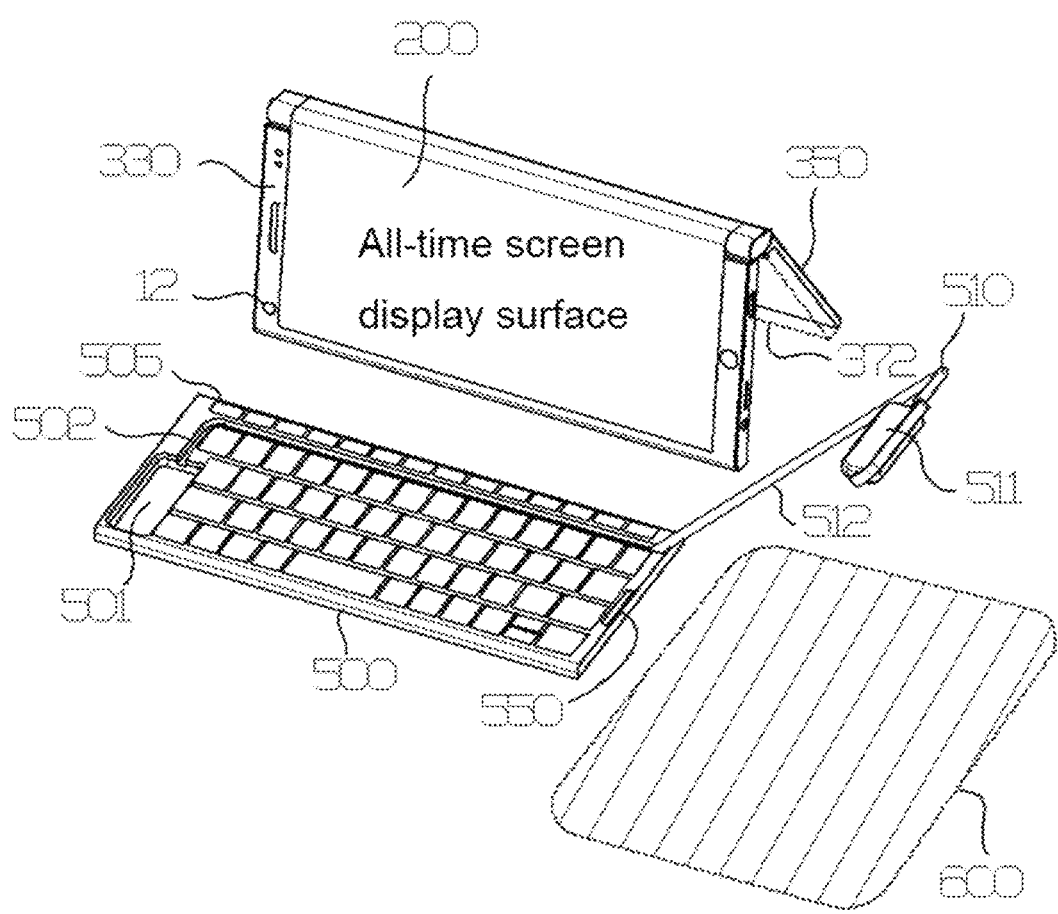
FIG. 44 is a perspective view showing an example of separating the keyboard unit having a camera unit of a protruding and unfolded state, in an acute-angle outfolding unfolded state of the seventh embodiment.

FIG. 39 is a front view, a rear view, a bottom view and a top view showing a folded state of a seventh embodiment applying a detachable keyboard unit to an outfolding image display device, FIG. 40 is conceptual views showing that the keyboard unit partially protrudes and is able to photograph the rear side using a camera module, in the folded state of FIG. 39 of the seventh embodiment, FIG. 41 is a front view, a bottom view and a top view showing an outfolding unfolded state of the seventh embodiment, FIG. 42 is a rear view of FIG. 41 of the seventh embodiment, FIG. is a perspective view showing an example of separating the keyboard unit having a camera unit of a protruding and unfolded state, in the outfolding unfolded state of the seventh embodiment, and FIG. 44 is a perspective view showing an example of separating the keyboard unit having a camera unit of a protruding and unfolded state, in an acute-angle outfolding unfolded state of the seventh embodiment.

Figure 45:
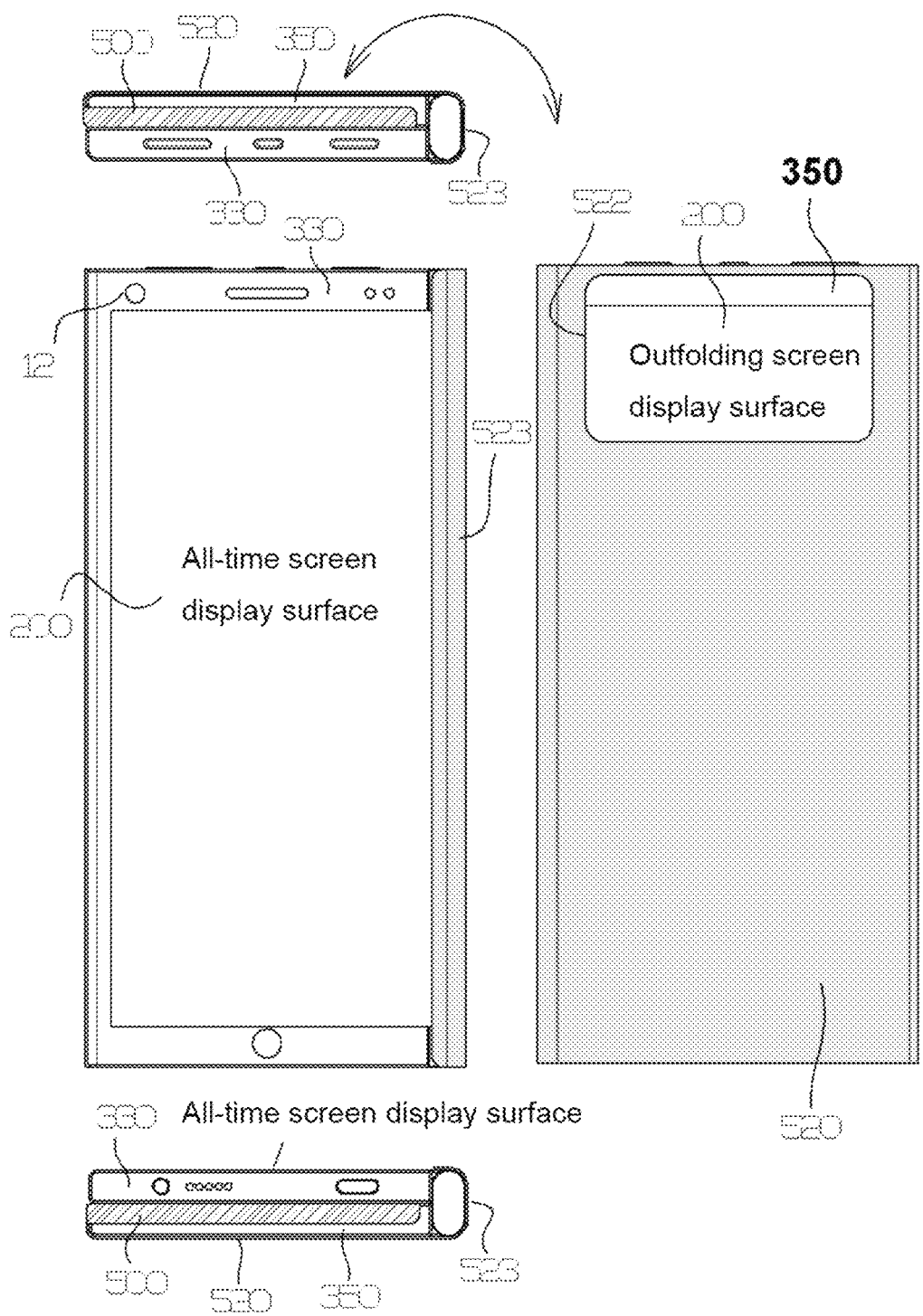
FIG. 45 is a front view, a rear view, a bottom view and a top view showing a folded state of an eighth embodiment additionally applying a display device cover which covers an all-time display screen of an outfolding image display device to the keyboard unit of the seventh embodiment.
Figure 46:
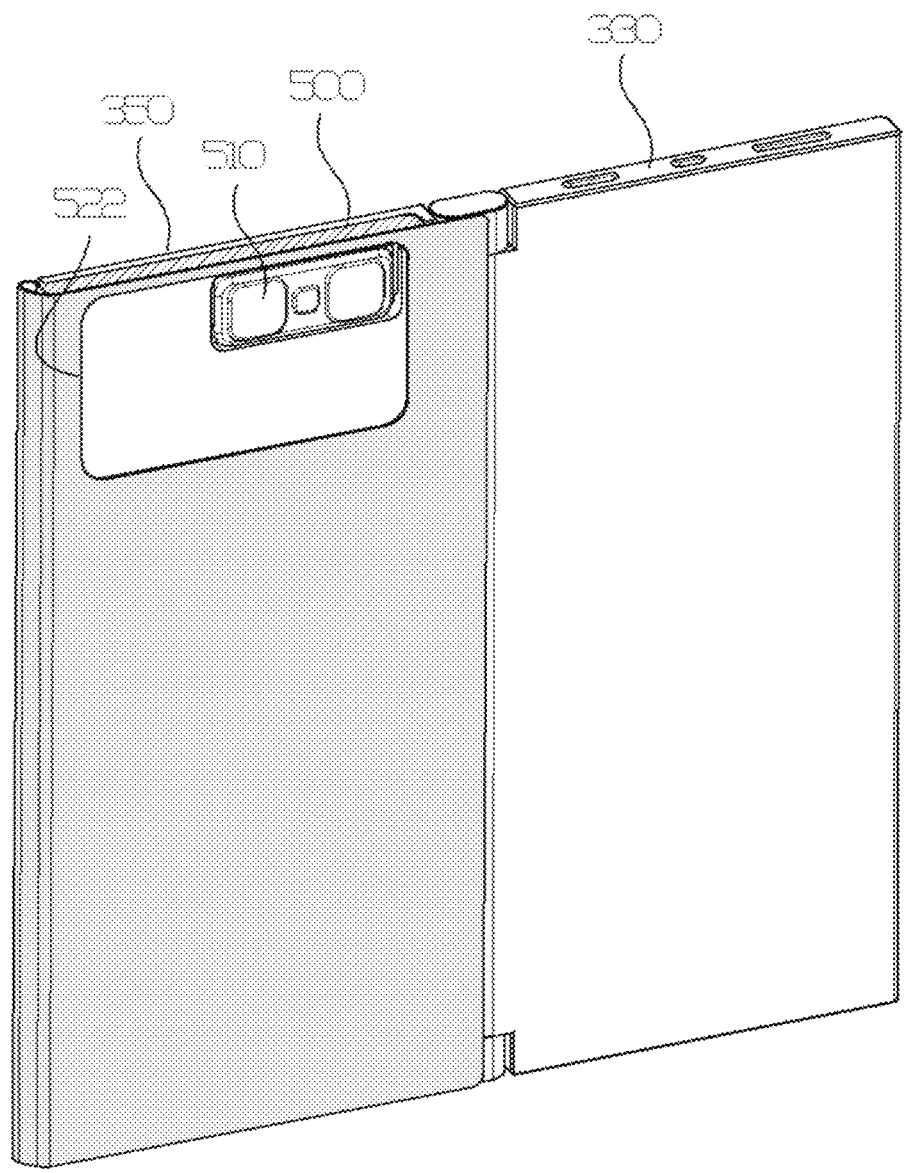
FIG. 46 is a perspective view showing a state of the display device cover rotated, unfolded and stored on the rear side, in the unfolded state of the eighth embodiment.

In addition, FIG. 45 is a front view, a rear view, a bottom view and a top view showing a folded state of an eighth embodiment additionally applying a display device cover which covers an all-time display screen of an outfolding image display device to the keyboard unit of the seventh embodiment, and FIG. 46 is a perspective view showing a state of the display device cover rotated, unfolded and stored on the rear side, in the unfolded state of the eighth embodiment.

As shown in FIGS. 39 to 44, the bodies 300 of the seventh embodiment and the eighth embodiment include an upper body 330 for supporting one side portion of the flexible display device 200 on the front surface, and applying a configuration or a component for performing outfolding at one side where folding can be performed; and a lower body 350 for supporting the opposite side portion of the flexible display device 200 on the front surface, applying a configuration or a component for performing outfolding at one side where folding can be performed, and connected to the upper body 330.

The keyboard application space 372 is formed by removing an area on the opposite side of the front surface of the lower body 350.

Among the embodiments of the image display device 100 provided with a keyboard, the ninth and tenth embodiments described below are targeting a rollable outfolding image display device, and the bodies of the ninth and tenth embodiments are the same, and unlike the ninth embodiment, an embodiment applying the keyboard unit 500 additionally applied with the display device cover 520 and the edge cover 523 is the tenth embodiment.

Figure 47:
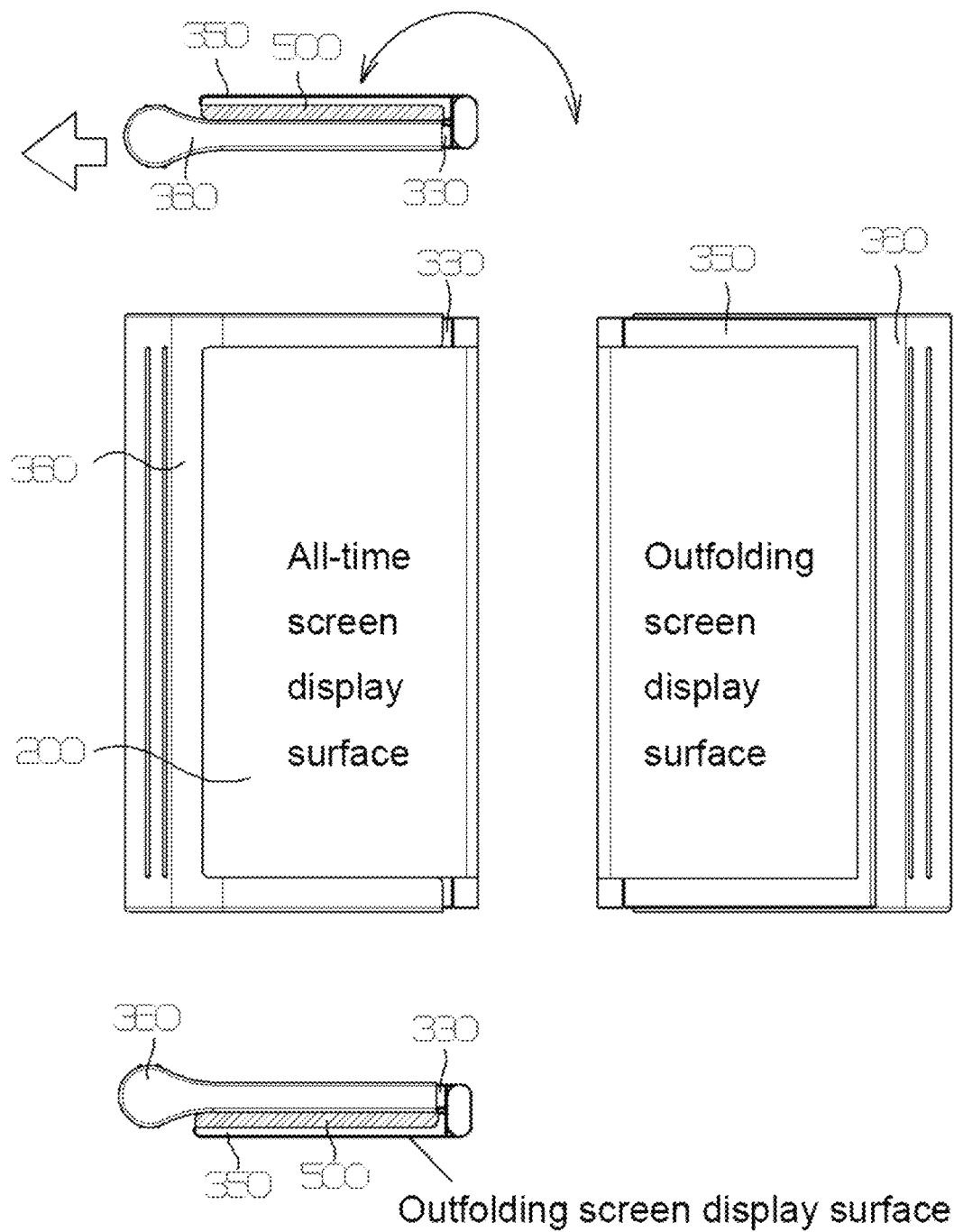
FIG. 47 is a front view, a rear view, a bottom view and a top view showing a folded state of a ninth embodiment applying a detachable keyboard unit to a rollable outfolding image display device.
Figure 48:
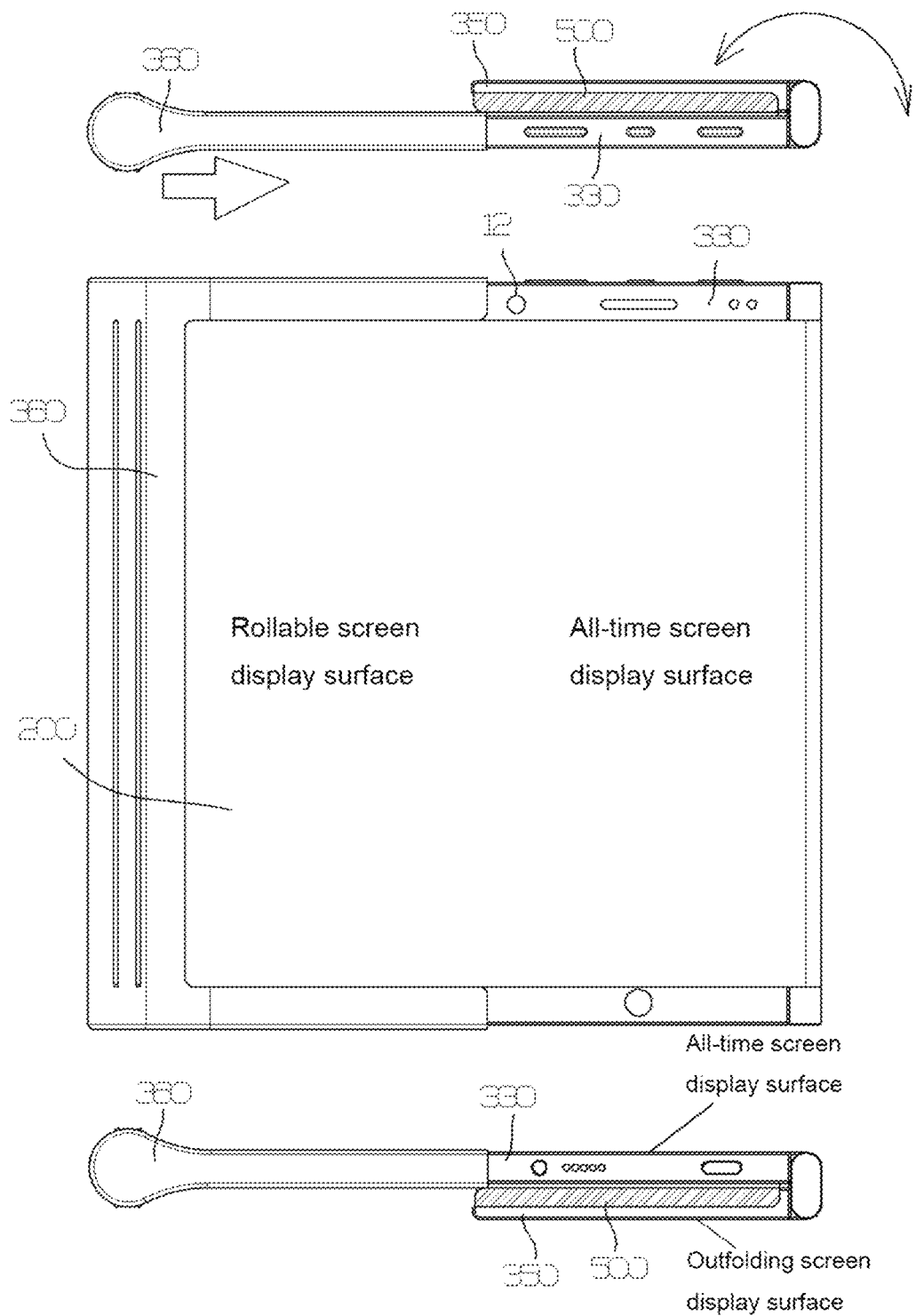
FIG. 48 is a front view, a bottom view and a top view showing an outfolding rollable image display device, in which only rollable unfolding is performed in the state of FIG. 47 of the ninth embodiment.
Figure 49:
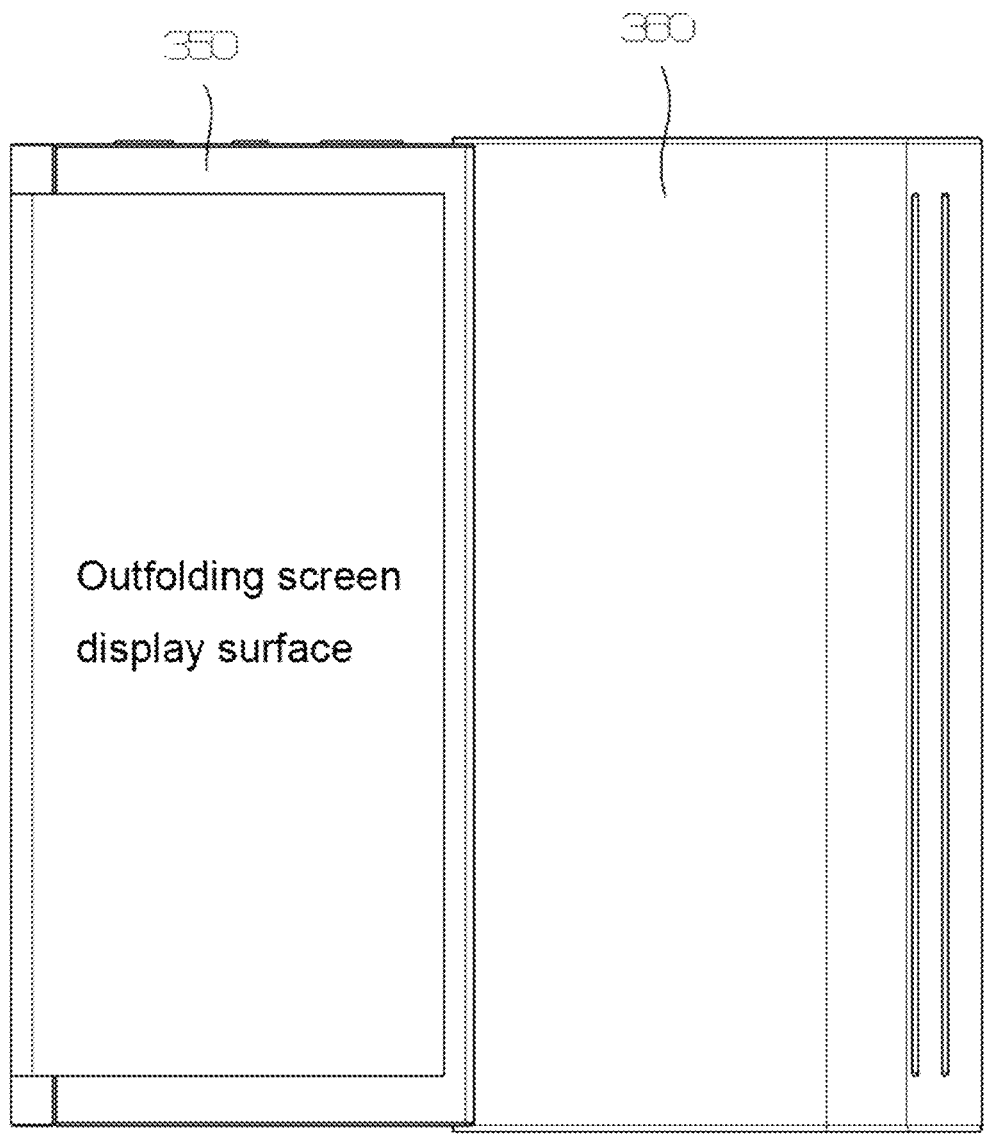
FIG. 49 is a rear view showing an outfolding rollable image display device, in which only rollable unfolding is performed in the state of FIG. 47 of the ninth embodiment.
Figure 50:
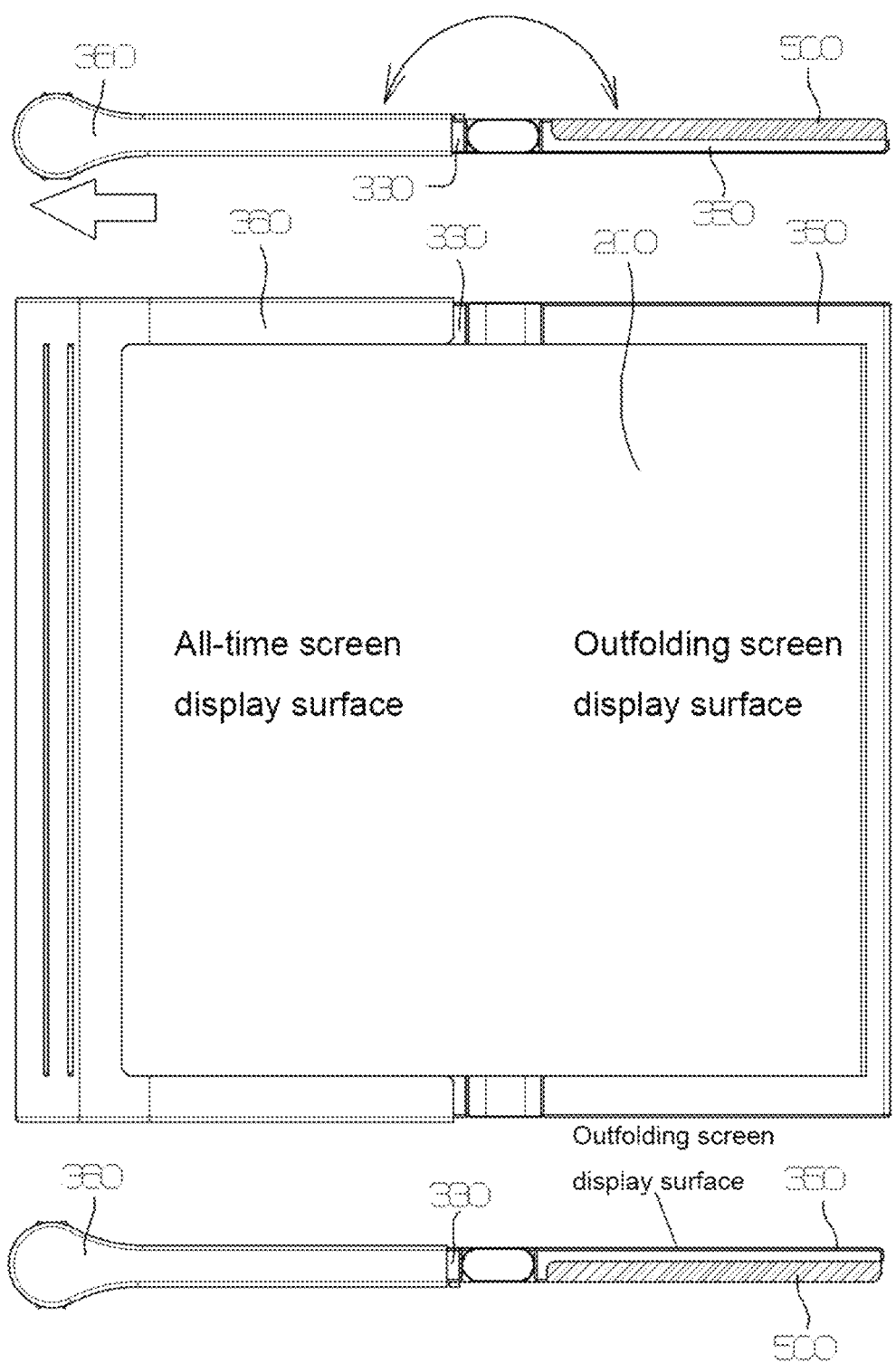
FIG. 50 is a front view, a bottom view and a top view showing an outfolding rollable image display device, in which only outfolding unfolding is performed in the state of FIG. 47 of the ninth embodiment.
Figure 51:
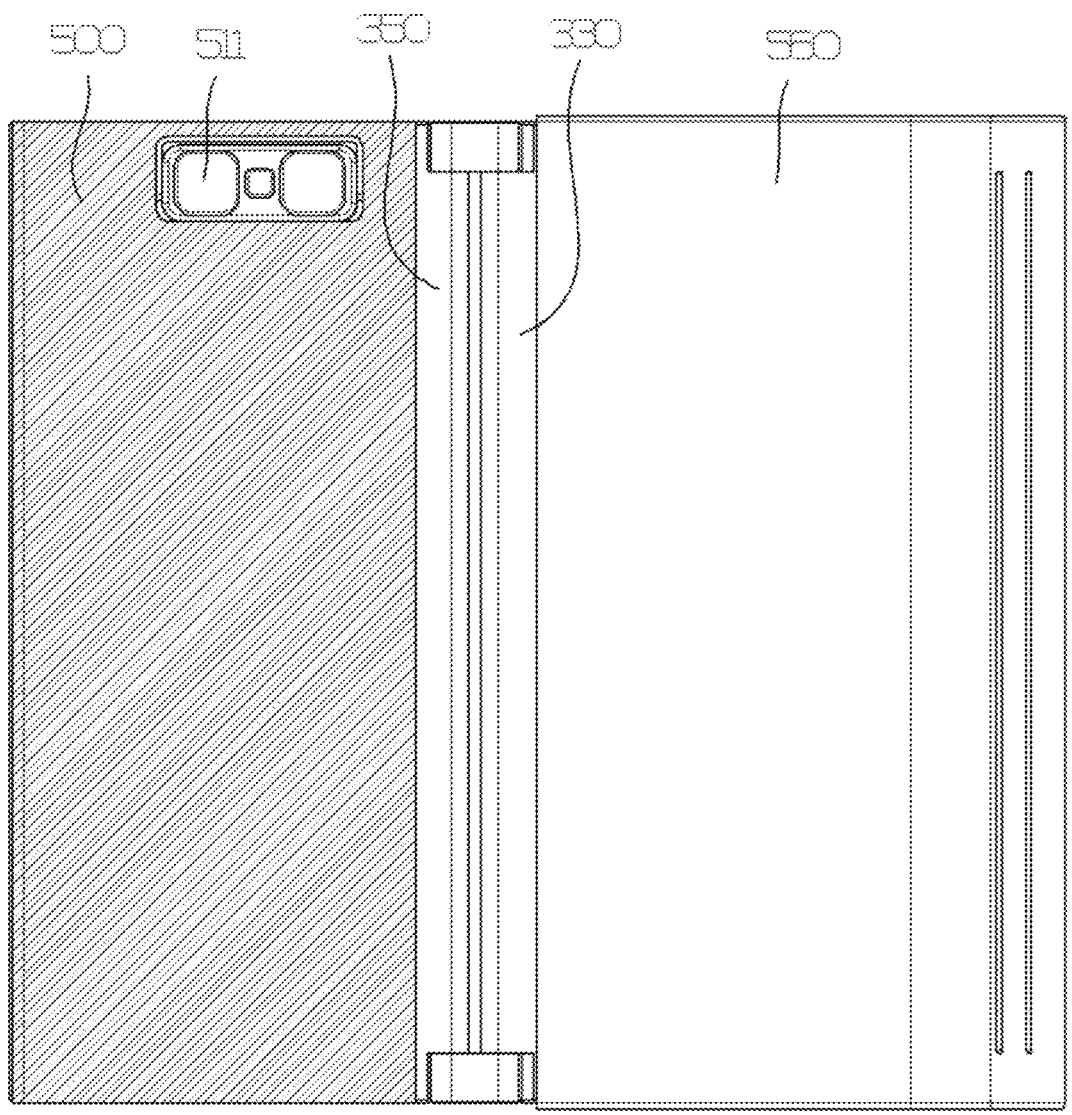
FIG. 51 is a rear view showing an outfolding rollable image display device, in which only outfolding unfolding is performed in the state of FIG. 47 of the ninth embodiment.
Figure 52:
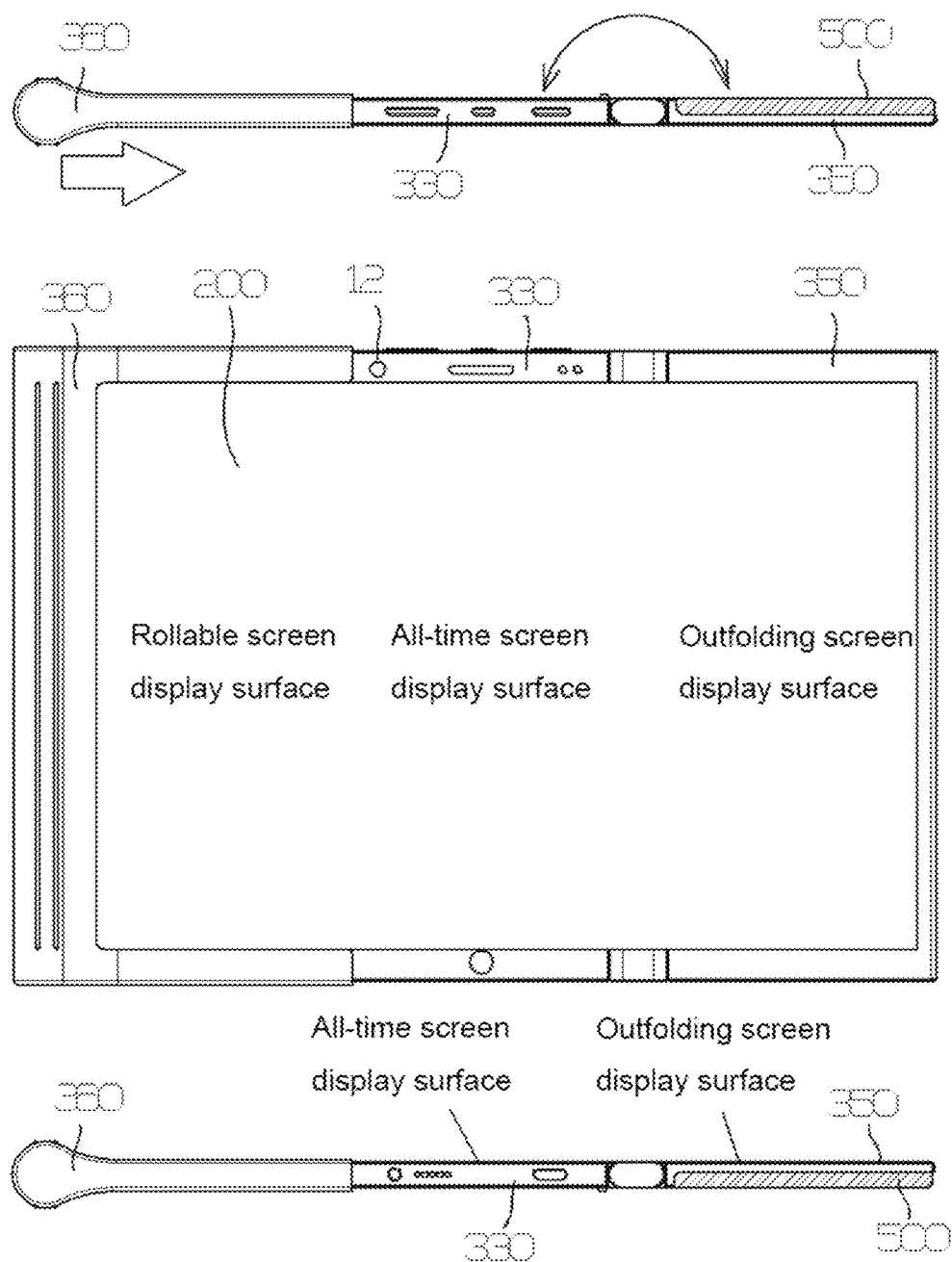
FIG. 52 is a front view, a bottom view and a top view showing a fully unfolded state of the ninth embodiment.
Figure 53:
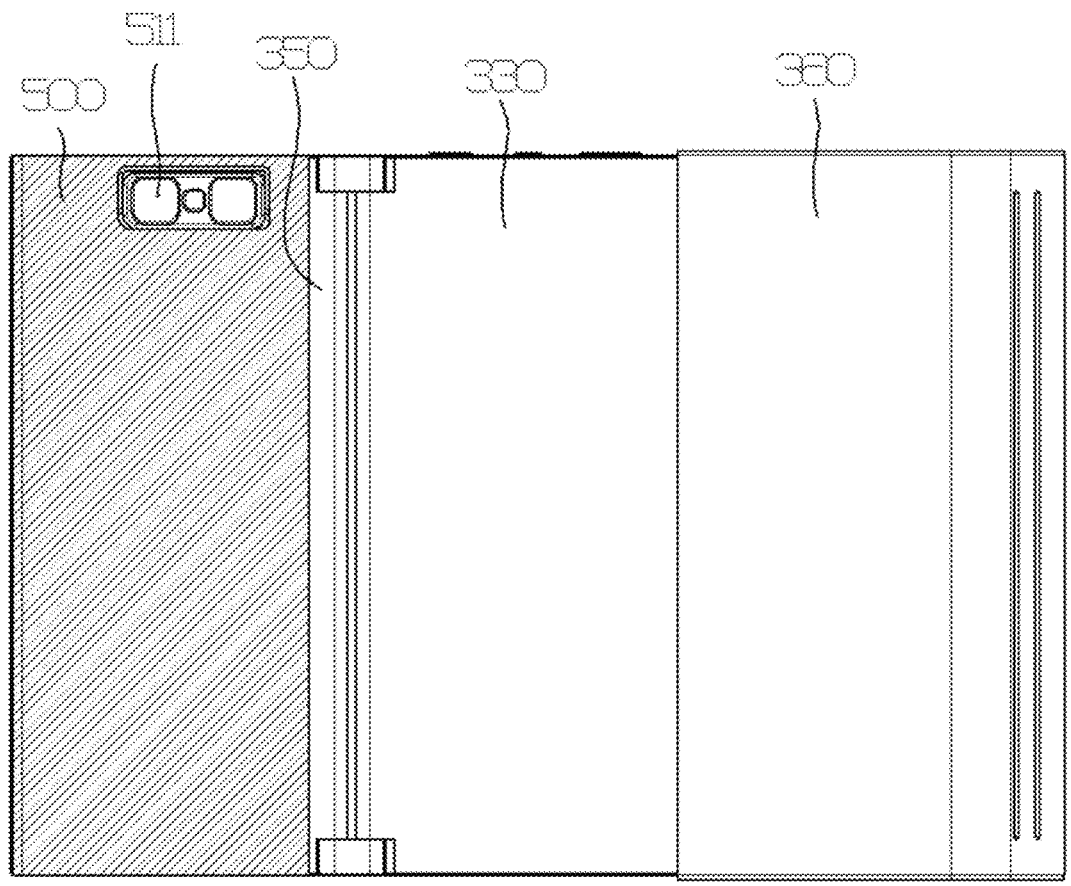
FIG. 53 is a rear view showing a fully unfolded state of the ninth embodiment.
Figure 54:
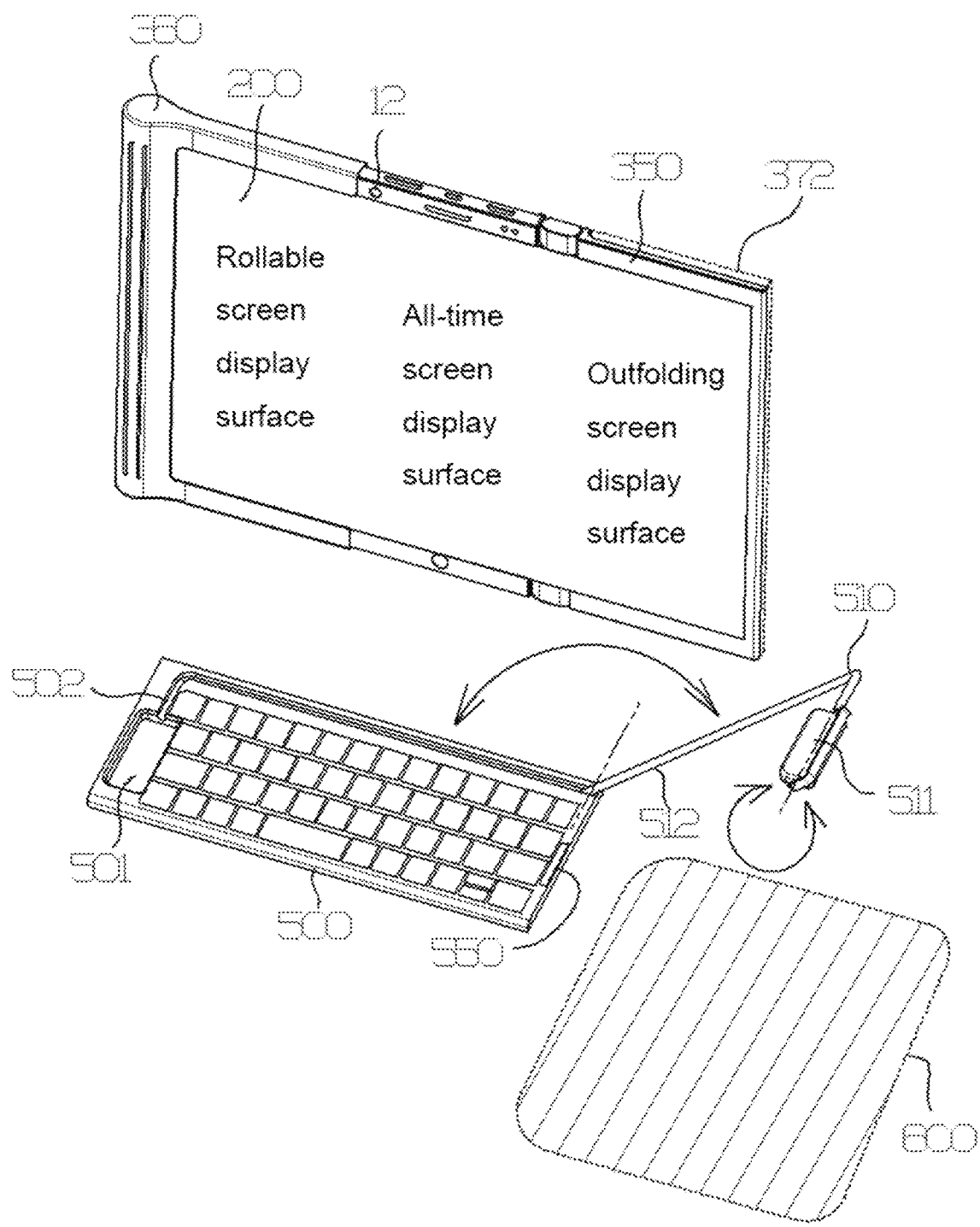
FIG. 54 is a perspective view showing an example of separating the keyboard unit having a camera unit of a protruding and unfolded state, in the fully unfolded state of the ninth embodiment.
Figure 55:
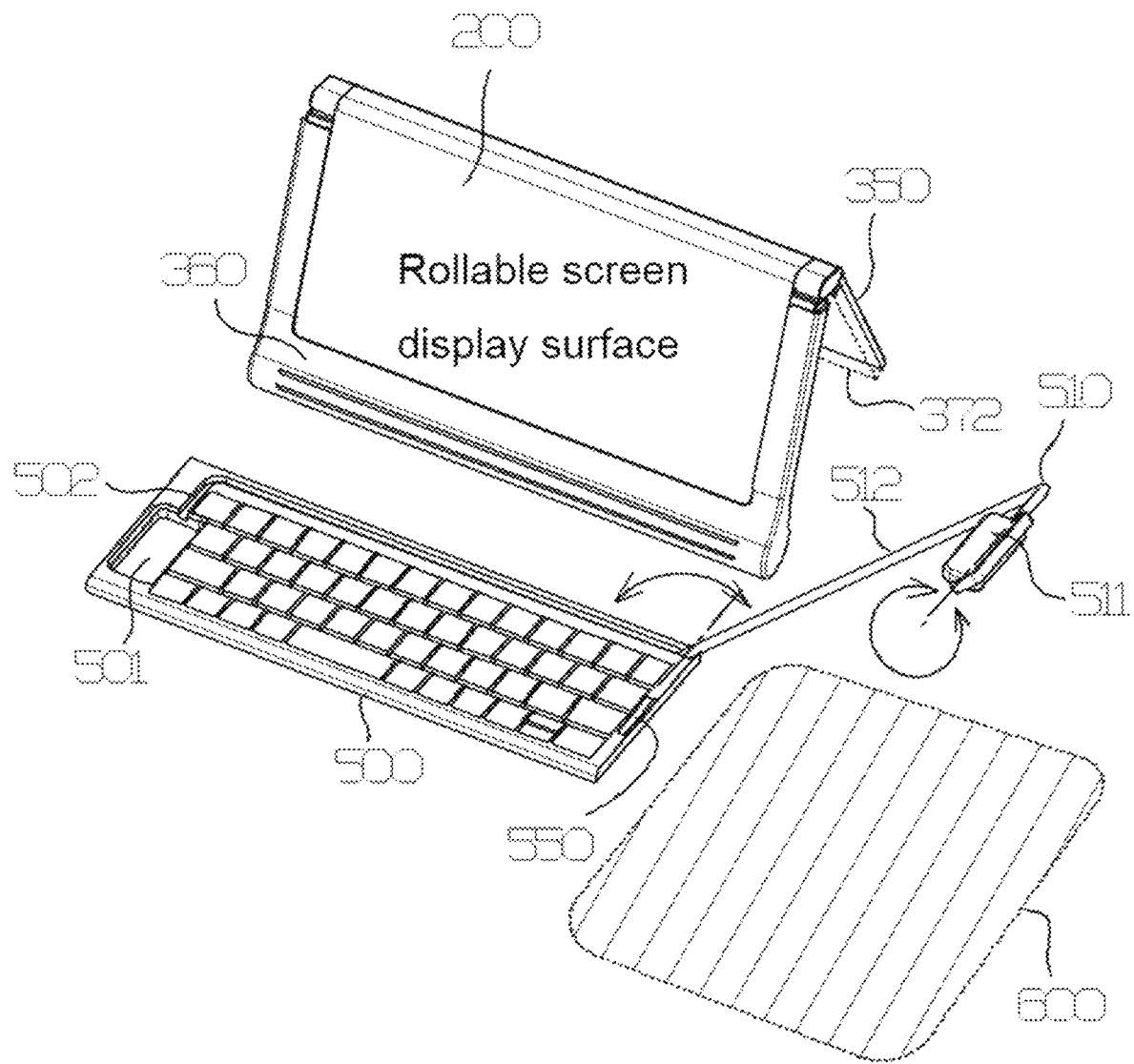
FIG. 55 is a perspective view showing an example of separating the keyboard unit in a state of accomplishing outfolding of an acute angle and having a camera unit of a protruding and unfolded state, in the state of FIG. 47 of the ninth embodiment.
Figure 56:
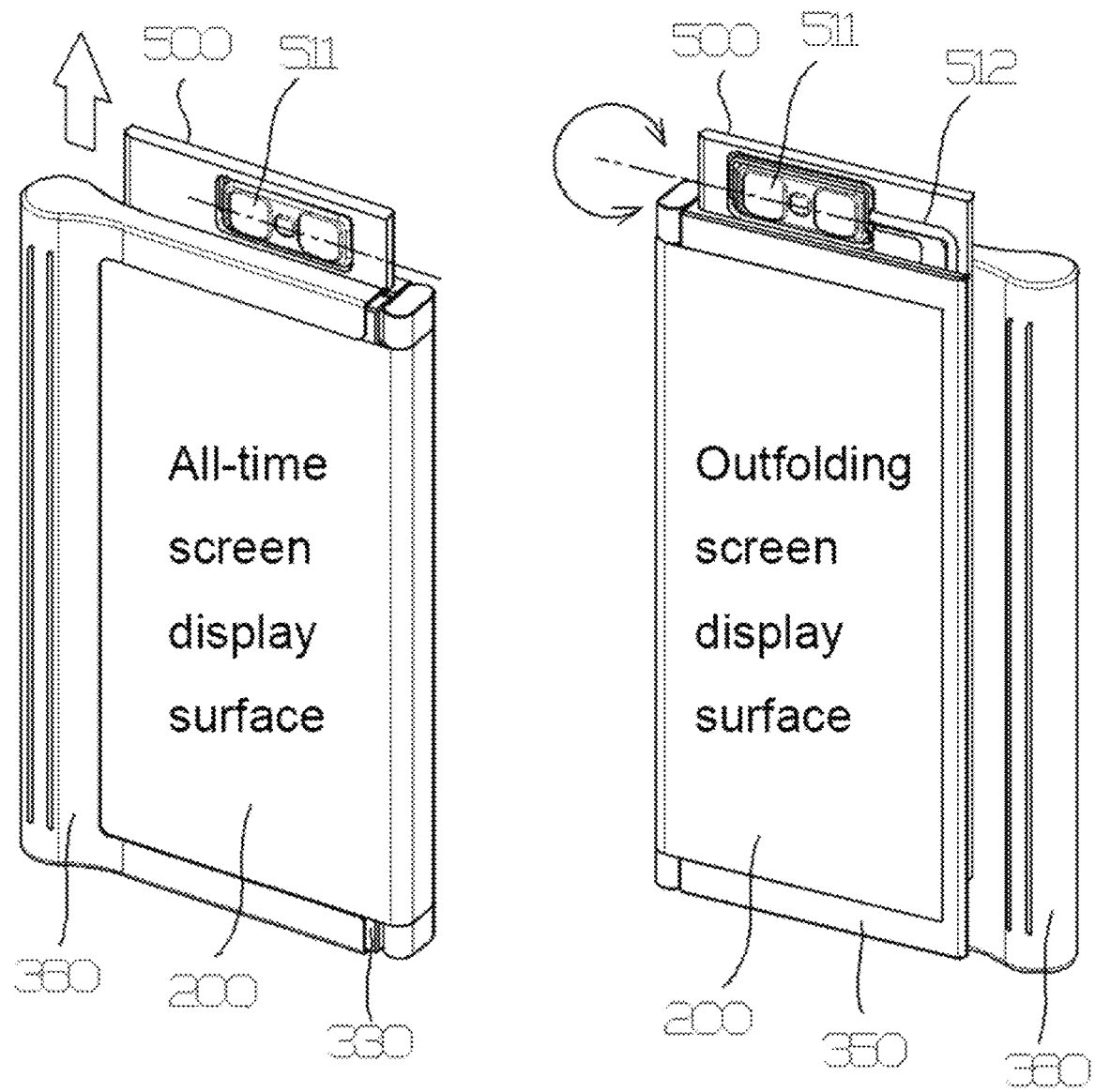
FIG. 56 is conceptual views showing that the keyboard unit partially protrudes and is able to photograph the rear side using a camera module, in the folded state of FIG. 47 of the ninth embodiment.

FIG. 47 is a front view, a rear view, a bottom view and a top view showing a folded state of a ninth embodiment applying a detachable keyboard unit to a rollable outfolding image display device, FIG. 48 is a front view, a bottom view and a top view showing an outfolding rollable image display device, in which only rollable unfolding is performed in the state of FIG. 47 of the ninth embodiment, FIG. 49 is a rear view showing an outfolding rollable image display device, in which only rollable unfolding is performed in the state of FIG. 47 of the ninth embodiment, FIG. 50 is a front view, a bottom view and a top view showing an outfolding rollable image display device, in which only outfolding unfolding is performed in the state of FIG. 47 of the ninth embodiment, FIG. 51 is a rear view showing an outfolding rollable image display device, in which only outfolding unfolding is performed in the state of FIG. 47 of the ninth embodiment, FIG. 52 is a front view, a bottom view and a top view showing a fully unfolded state of the ninth embodiment, FIG. 53 is a rear view showing a fully unfolded state of the ninth embodiment, FIG. 54 is a perspective view showing an example of separating the keyboard unit having a camera unit of a protruding and unfolded state, in the fully unfolded state of the ninth embodiment, FIG. 55 is a perspective view showing an example of separating the keyboard unit in a state of accomplishing outfolding of an acute angle and having a camera unit of a protruding and unfolded state, in the state of FIG. 47 of the ninth embodiment, and FIG. 56 is conceptual views showing that the keyboard unit partially protrudes and is able to photograph the rear side using a camera module, in the folded state of FIG. 47 of the ninth embodiment.

Figure 57:
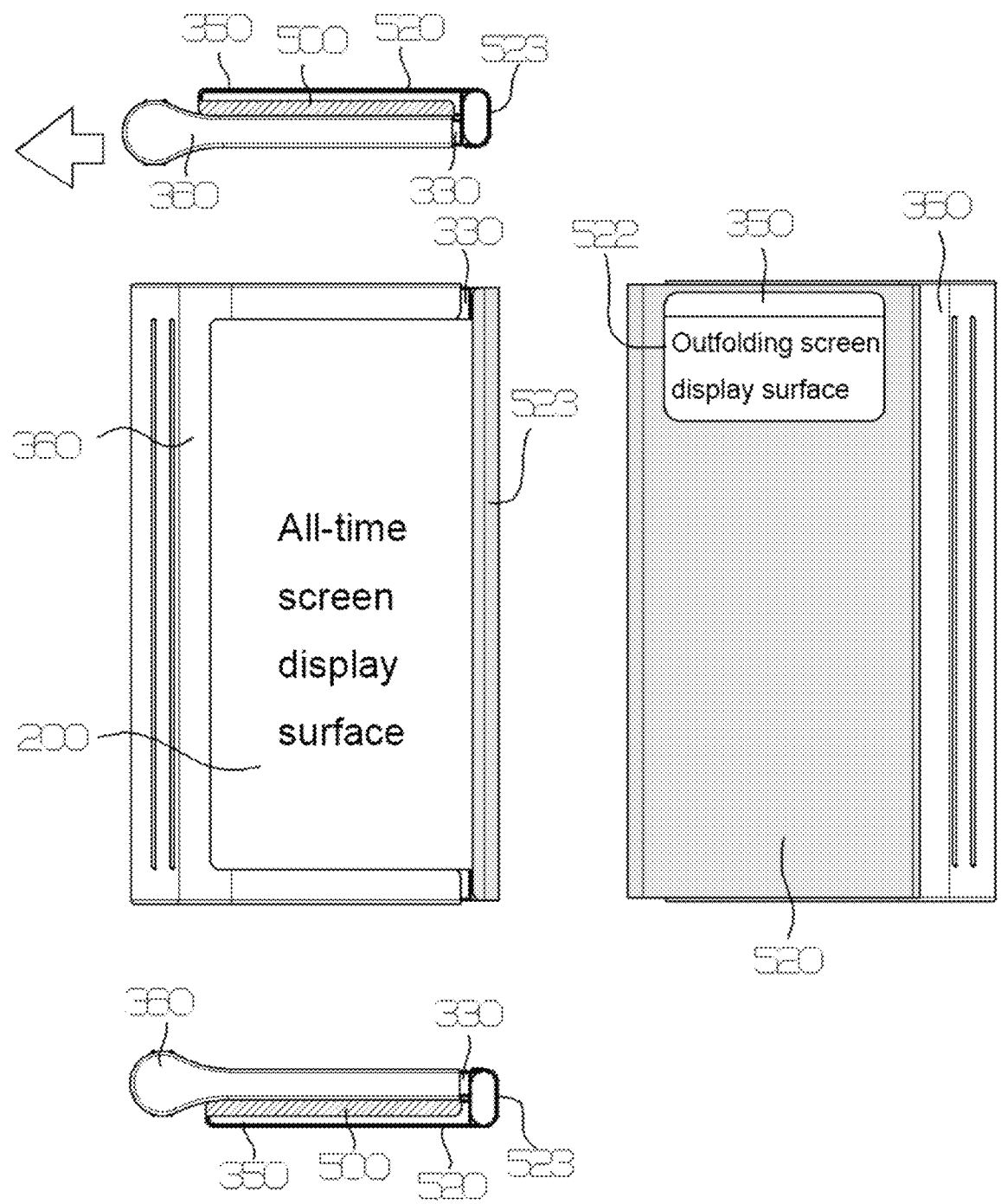
FIG. 57 is a front view, a rear view, a bottom view and a top view showing a folded state of a tenth embodiment additionally applying a display device cover which covers an all-time display screen of a one-stage outfolding image display device to the keyboard unit of the ninth embodiment.
Figure 58:
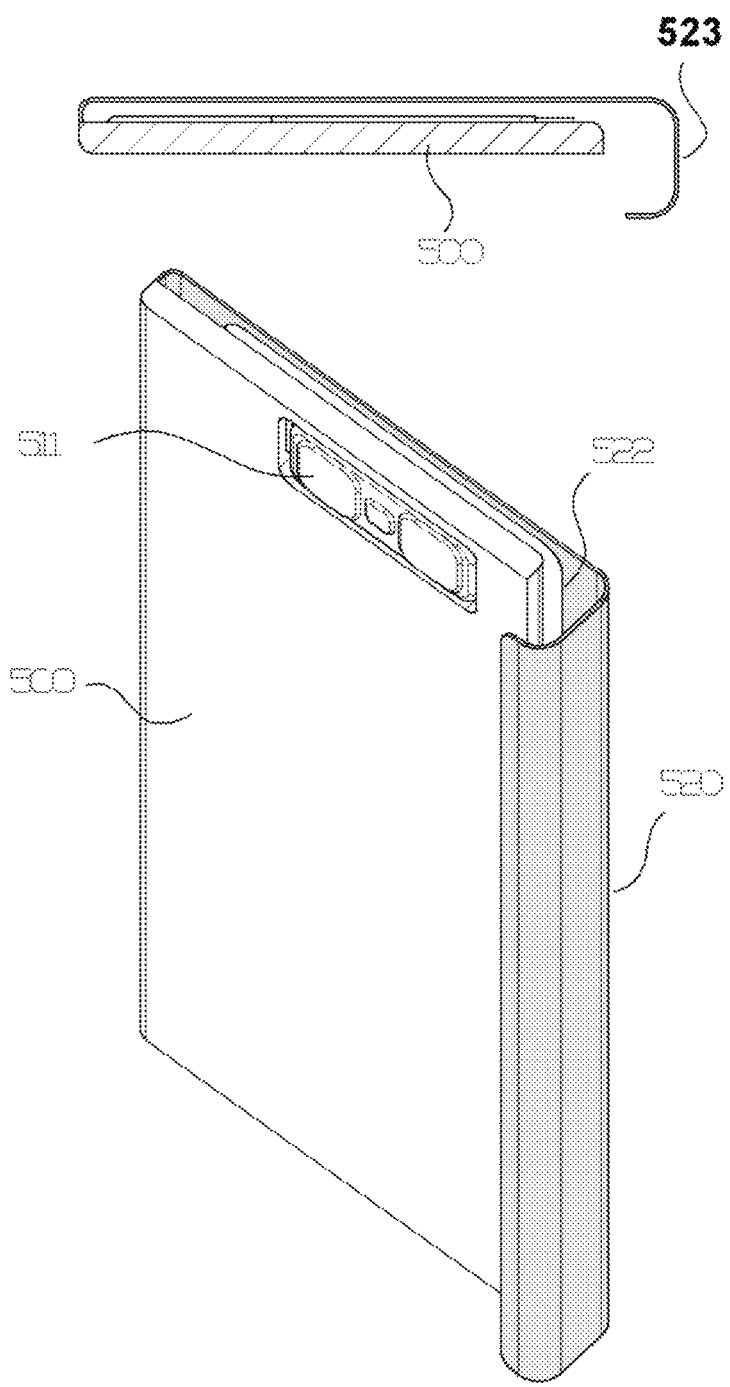
FIG. 58 is a top view and a perspective view showing the keyboard unit of the tenth embodiment.

In addition, FIG. 57 is a front view, a rear view, a bottom view and a top view showing a folded state of a tenth embodiment additionally applying a display device cover which covers an all-time display screen of a one-stage outfolding image display device to the keyboard unit of the ninth embodiment, and FIG. 58 is a top view and a perspective view showing the keyboard unit of the tenth embodiment.

As shown in FIGS. 47 to 56, the bodies 300 of the ninth embodiment and the tenth embodiment include an upper body 330 for supporting the center portion of the flexible display device 200 on the front surface, applying a configuration or a component for performing outfolding at one side where outfolding can be performed, and applying a configuration and a component related to performing rolling on one end portion of the flexible display device 200 at one side opposite to the one side where outfolding can be performed; and a rollable cover 360 provided with a configuration and a component related to performing rolling on one end portion of the flexible display device 200, and connected to one side of the upper body 330; and a lower body 350 for supporting the opposite end portion of the flexible display device 200 on the front surface, applying a configuration or a component for performing outfolding at one side where folding can be performed, and connected to the upper body 330.

The keyboard application space 372 is formed by removing an area on the opposite side of the front surface of the lower body 350, where interference with the rollable cover 360 does not occur in a minimized state.

It is shown through the above description of the embodiments that which area of which component constituting the body 300 is removed to form the keyboard application space 372 capable of attaching, detaching, storing or withdrawing the keyboard unit 500.

For all the embodiments described above, since the depth of the area removed to form the keyboard application space 372 is preferably as deep as possible to secure the thickness of the keyboard unit 500, it may be removed as deep as the front surface supporting the flexible display device. However, if the entire surface is removed, the flexible display device may not be supported, and only the unavoidable portions may be partially removed to penetrate.

In addition, as shown in FIG. 8 of the first embodiment, for all the embodiments described above, state switching (attaching, detaching, storing or withdrawing) of the keyboard unit 500 from the keyboard application space 172 may be performed by linearly moving the keyboard unit 500 in a direction parallel or perpendicular to the folding axis direction of the flexible display device 200 regardless of a folded or unfolded state of the body 300, by rotating the keyboard unit 500 after moving it to the end portion of the keyboard application space 172 in a direction perpendicular to the folding axis direction of the flexible display device 200, or by attaching or detaching the keyboard unit regardless of the folding axis direction of the flexible display device 200 when the surface on which the keyboard application space 172 is formed is exposed.

A selective latching mechanism, including a magnet, a Velcro 373 or a guide, may be applied to a corresponding component of the body 300 and the keyboard unit 500 in which the keyboard application space 172 is formed so that state switching (attaching, detaching, storing or withdrawing) of the keyboard unit 500 can be performed from the keyboard application space 172.

In addition, a keyboard unit sensing means 374 for sensing whether the keyboard unit 500 has been separated from or coupled to the keyboard application space 372 may be applied to any one of the keyboard unit 500 and the body 300, and since various means including a limit switch and an optoelectronic device may be applied as the keyboard unit sensing means 374, and the application position varies depending on the state switching method of the keyboard unit 500, drawings thereof are omitted.

The following description relates to the keyboard unit 500 applied to the keyboard application space 372 formed in the image display device 100 provided with a keyboard.

For all the embodiments of the first to eleventh embodiments, the keyboard unit 500 is provided with a charging means including a battery and a charging terminal, and drawings thereof are omitted.

As shown in FIG. 21 of the third embodiment, the perimeter of the exposed edge of the body 300 or out of the edge, in the perimeter of the keyboard body which is a main component of the keyboard unit 500 and described below, is formed by applying a protruding bumper 530 or made of a soft material capable of absorbing shock so that the keyboard unit 500 may absorb drop shock applied to the body 300 or the flexible display device 200 when a free fall situation occurs while the keyboard unit 500 is applied to the keyboard application space 372.

As shown in FIGS. 4 to 31, the keyboard unit 500 applied to the first to fifth embodiments includes a keyboard body described below, in which four or more rows of parallel keys are arranged on one side, and a folding groove 504 is formed in a keyboard body portion located at the free end portion of the infolding body 2 320 or the lower body 350 so that the keyboard body portion out of the free end portion of the infolding body 2 320 or the lower body 350 may be rotated and folded toward the vertical surface of the free end of the infolding body 2 320 or the lower body 350, and keys of a fifth row may be applied in an area between the end portion of the keyboard body parallel to the folding groove 504 and the folding groove 504.

As the rear camera 13 is fixedly applied to the body 300 of the first embodiment as shown in FIGS. 4 to 12, unlike the keyboard unit 500 applied to the third to eleventh embodiments, a camera unit 510 includes a camera module 511, a supporting arm 512 and a rotation support piece 513 is not applied to the keyboard unit 500 applied to the first and second embodiments.

In addition, since the camera unit 510 is not applied to the keyboard unit 500 applied to the first and second embodiments, a camera module storage space 501, a supporting arm storage groove 502, a support slope surface 503, a supporting arm protrusion sensing means 540, and a hand position sensing means 550 of the camera unit 510 of the third to eleventh embodiments described below in relation to the camera unit 510 are not applied to the keyboard unit 500 applied to the first and second embodiments.

As shown in FIGS. 13 to 63 of the third embodiment to the eleventh embodiment, for all the embodiments, the keyboard unit 500 includes a keyboard body (an identification symbol is not assigned and not shown) having keys arranged on one side; and a camera unit 510 including a rotatable single or dual camera module 511, and a supporting arm 512 of a predetermined length, an end of which is assembled at one side of the keyboard body in a rotatable state, having a rotation support piece 513 formed at the opposite end to rotate and support the camera module 511.

The keyboard body includes, on one side, a camera module storage space 510 formed to store and rotate the camera module 511 without interference with individual keys of the keyboard body, a supporting arm storage groove 502 formed to store and maintain the supporting arm 512 without interference with individual keys of the keyboard body, and a support slope surface 503 formed at an end portion of the supporting arm storage groove 502 to apply a contact sustaining force to the supporting arm 512 so that the supporting arm 512 rotating and protruding from the supporting arm storage groove 502 may maintain a predetermined angle and a standing state without help of an external force.

Since the rear camera 13 is fixed on the opposite side of the screen display surface of the shape-invariant tablet 10 as shown in the examples of FIG. 1 and should always watch only the opposite side of the screen display surface, or the rear camera 13 is fixed on the body 300 as shown in FIGS. 4 to 12 of the first and second embodiments of the present invention and should always watch only the opposite side of the screen display surface supporting the flexible display device 200, the keyboard unit 500 of the examples of FIG. 1 and the first and second embodiments of the present invention cannot perform the functions as shown in FIGS. 18 and 19 of the third embodiment unless a separate camera performing the function of the camera unit 510 applied to the third to eleventh embodiments is provided. From a different viewpoint, the keyboard unit 500 applied to the third to eleventh embodiments may be regarded as having extended utilization of the camera module 511 without separately applying an additional camera owing to the camera module 511 that can perform the function of the rear camera 13.

In addition, the supporting arm protrusion sensing means 540 capable of sensing a stored or a rotating and protruding state of the supporting arm 512 may be applied to the keyboard body or the camera unit 510 of the keyboard unit 500, and since the types and applicable positions of applicable sensing means are diverse, separate drawings are omitted.

In addition, as shown in FIG. 16 of the third embodiment to FIG. 63 of the eleventh embodiment, the length of the supporting arm 512 may be fixed and invariant, or the supporting arm 512 may be extended by applying a multi-stage sliding or rotating shaft folding method, which is a general method not shown in the drawings.

In addition, as shown in FIG. 16 of the third embodiment to FIG. 63 of the eleventh embodiment, in the keyboard unit 500, the hand position sensing means 550 for sensing a user's hand entering the camera module area 600 under the camera module 511 in a character input state or a user's hand moving from the camera module area 600 under the camera module 511 toward the keys for inputting characters may be applied in one end portion of the keyboard body located on the opposite side of the camera module storage space 501.

As shown in FIGS. 18 and 19 of the third embodiment, for all the embodiments from the third to eleventh embodiments, the keyboard unit 500 performs input control handling similar to using a mouse by a user without carrying and applying a physical mouse, as well as the function of a keyboard, which is a simple character input tool, and it is possible to scan and input attached documents or attach photographed images in real-time while doing a document work.

To perform these functions, after the keyboard unit 500 applied to all the embodiments from the third embodiment to eleventh embodiment is withdrawn or separated from the keyboard application space 372, components related to maintaining a posture are applied so that the supporting arm 512 may rotate and protrude from the supporting arm storage groove 502 toward the outside in the length direction of the keyboard body and maintain a stable state by the support slope surface 503, and may be supported by the rotation support piece 513 to maintain the rotated and fixed state toward the camera module area 600 under the camera module.

As shown in FIG. 18, when any one of user's hands enters the camera module area 600 outside a typing area from the typing area with or without passing through the hand position sensing means 550, a control unit 400 applied to the body 300 may receive input signals from the keyboard unit sensing means 374, the supporting arm protrusion sensing means 540, the hand position sensing means 550, and the camera module 511, compare in real-time the shape of the user's hand changing in the camera module area 600 with data on the hand shape inputted by the user in advance, and perform a promised navigation function according thereto.

Since the data compared with the shape of the user's hand positioning in the camera module area 600 is diverse according to preference of use and difference in the shape is obvious, a first state (finger protrusions face upwards), a first state (the thumb faces upwards while crunching the fist), a state of stretching only the index finger, a state of an open palm showing the back of the hand, a state of an open palm showing the lines of the palm, a state of an open palm with the thumb standing upwards, a rotated state of a fist, a rotated state of an open palm, and a state of snapping four fingers except the thumb of the open palm, which are generally easy to compare, can be easily reviewed.

In addition, as shown in the example of FIG. 1, if the keyboard body can be maintained without shaking only on the user's knees even in the air, such as a space on the user's knees or a sofa where a working plate 1 does not exist, a stable proxy mouse input using the camera unit 510 can be allowed.

As shown in FIG. 19, when a document or a photographing target enters the camera module area 600 and a scan or photographing standby mode is activated by a user's key input reserved in advance, the document or photographing target in the camera module area 600 is transmitted to the screen in real time, and when key handling assigned to photographing is performed, photographing is completed, and the camera module switches to the standby mode for subsequent photographing, and when it is desired to get out of the photographing standby mode thereafter, the user terminates the standby mode by pressing again a key reserved in advance for activation or entering a new key promised for switching to an inactive mode.

In addition, as shown in FIGS. 26 to 31 of the fifth embodiment, a display device cover 520 covering the all-time screen display surface of the flexible display device 200 positioning on the front surface of the upper body 330 is formed to be extended or assembled as a separate component at an edge of the keyboard unit 500.

In addition, as shown in FIGS. 45 and 46 of the eighth embodiment and FIGS. 57 and 58 of the tenth embodiment, a display device cover 520 covering the outfolding screen display surface of the flexible display device 200 positioning on the front surface of the lower body 350 is formed to be extended or assembled as a separate component at an edge of the keyboard unit 500, and an edge cover 523 covering the portion where outfolding of the flexible display device 200 is generated is formed to be extended at one end of the display device cover 520.

In addition, as shown in FIGS. 26 to 31 of the fifth embodiment, FIGS. 45 and 46 of the eighth embodiment, and FIGS. 57 and 58 of the tenth embodiment, a cover penetration window 522 is formed in the display device cover 520 to be penetrated or partially removed to confirm partial image information even when the display device cover 520 covers the all-time screen display surface of the flexible display device 200 positioning on the front surface of the upper body 330 or the outfolding screen display surface of the flexible display device 200 positioning on the front surface of the lower body 350, or not to cover the camera module 511 after the display device cover 520 is opened.

As shown in FIG. 40 of the seventh embodiment, FIG. 56 of the ninth embodiment, and FIG. 62 of the eleventh embodiment, unless the body 300 is unfolded, the camera module 511 of the keyboard unit 500 is in a state unable to photograph as it exists in a hidden state.

When the keyboard unit 500 is pushed up a predetermined distance from the keyboard application space 372 and the module 511 is switched to an exposed state to be able to photograph using the camera module 511 of the keyboard unit 500 even when the body 300 is not unfolded, the control unit 400 detects this state and automatically activates the photographing standby mode, and contrarily, when the keyboard unit 500 is pushed back into the keyboard application space 372 and returned to the original position, return to the original position is sensed, and the photographing standby mode is terminated.

In addition, since the camera module 511, which is pushed up a predetermined distance from the keyboard application space 372 and switched to an exposed state, may change the direction of the exposed surface by the camera module storage space 501 and the rotation support piece 513 formed in the keyboard body, the photographing direction can be simply changed without changing the direction of the body 300.

The concept as shown in FIG. 40 of the seventh embodiment, FIG. 56 of the ninth embodiment, and FIG. 62 of the eleventh embodiment described above may be applied to all the third to eleventh embodiments of the present invention, and if the keyboard unit 500 is pushed up a predetermined distance from the keyboard application space 372 and the camera module 511 is switched to an exposed state while the body 300 is partially or fully unfolded by extending this concept, the camera module 511 may have an effect of working as a dual camera and simultaneously participating an existing front camera 12 applied to the body 300 in photographing while maintaining a predetermined distance in the direction of the same photographing side, and this enables 3D photographing by using only its own camera without applying an additional camera.

As shown in FIG. 44 of the seventh embodiment and FIG. 55 of the ninth embodiment, in the embodiments of the present invention, the body 300 maintains a state unfolded at an acute-angle, and the keyboard unit 500 may be detached or withdrawn from the keyboard application space 372 and maintain a state capable of performing keyboard input functions, and in this case, the user on the front and back sides on the basis of the folding axis of the body 300 may works while seeing the same screen or different screens.

Comparing the drawings shown in FIG. 2 of the first embodiment to FIG. 58 of the tenth embodiment with FIG. 63 of the eleventh embodiment, it is understood that the directions of the keys on the keyboard are different, although the direction of attaching and detaching or withdrawing the keyboard unit 500 from the keyboard application space 372 is the same.

The direction of withdrawing the keyboard unit 500 and the direction of arranging the keys applied to the keyboard unit 500 may be designed to arrange the first row of the basic keys at the front end of the withdrawing direction as shown in FIG. 63, or when the fourth row or the fifth row of the basic keys can be provided as shown in the drawings shown in FIG. 2 of the first embodiment to FIG. 58 of the tenth embodiment, the fifth row may be arranged at the front end of the withdrawing direction.

In addition, when the keys 505 of the fifth row or the keys 506 of the sixth row are applied to the keyboard unit 500, in addition the four rows of basic keys, and the keys 505 of the fifth row or the keys 506 of the sixth row are located on the opposite side of the four rows of the basic keys with respect to the folding groove 504 formed in the keyboard body, as shown in FIG. 5 of the first embodiment, FIG. 10 of the second embodiment, FIG. 14 of the third embodiment, FIG. 23 of the fourth embodiment, and FIG. 28 of the fifth embodiment, and the keyboard unit 500 maintains a state of coupling to the keyboard application space 372 while the body 300 is in an unfolded state, if the portion of the keys 505 of the fifth row or the keys 506 of the sixth row is rotated and unfolded with respect to the axis of the folding groove using the folding groove 504, unlike the four rows of basic keys existing in a state hidden by the keyboard application space 372, the keys 505 of the fifth row or the keys 506 of the sixth row maintain an exposed state capable of performing immediate key input.

If the immediate exposure function of the keys 505 of the fifth row or the keys 506 of the sixth row is applied, limited key input is allowed without moving the keyboard unit 500 from the keyboard application space 372, and if a unique function is assigned to each of the keys 505 of the fifth row or the keys 506 of the sixth row, diverse application examples may be implemented, including real-time operation of a game by key input, not by touch handling, while playing the game using an unfolded screen.

In addition, as shown in FIG. 22 of the fourth embodiment and FIG. 26 of the fifth embodiment, when the keys 505 of the fifth row maintain a standing posture in a folded state using the folding groove 504, the folding axis-related part, which is a vulnerable portion of the flexible display device, is covered without applying a separate cover.

While the embodiments of the present invention have been described with reference to the accompanying drawings, those skilled in the art may understand that the present invention may be embodied in other specific forms without changing the spirit or essential features of the present invention. Therefore, it should be understood that the embodiments described above are illustrative for all respects and not restrictive.

The invention claimed is:

1. An image display device provided with a keyboard, the device comprising:
   a flexible display device capable of being bent, rolled or expanded;
   a body supported at a first side so that the flexible display device may be bent, rolled or expanded, and having a keyboard application space formed by removing an area to have a predetermined depth and range, from a portion of an exposed surface on an opposite side of the first side to which the flexible display device is applied, toward the first side, and a component related to attachment, detachment, storage and withdrawal of an object applied to the keyboard application space; and
   a keyboard unit applied to the keyboard application space in a state capable of switching an application state to be coupled to and carried together with the body or to be detachable from the body, and performing a function as an input means by using a wired or wireless communication means,
   wherein the body includes:
      an infolding body 1 for supporting one side portion of the flexible display device at the first side, and including a minimum curvature section for securing a minimum curvature in case of an infolding state at one side where folding can be performed; and
      an infolding body 2 for supporting an opposite side portion of the flexible display device at the first side, and sharing the minimum curvature section with the infolding body 1 at one side where folding can be performed, and wherein the infolding body 2 includes a rear camera for photographing a rear subject and;
   wherein the keyboard application space is formed in an area on the opposite side of the first side of the infolding body 2 where interference with the rear camera does not occur and outside the minimum curvature section.

2. The device according to claim 1, wherein the body includes a component related to performing rolling on one end portion of the flexible display device and a rollable cover connected to one side of the infolding body 1, the infolding body 1 supports a center portion of the flexible display device at the first side, includes a minimum curvature section for securing a minimum curvature in case of an infolding state at one side where infolding can be performed, and includes a component related to performing rolling on one end portion of the flexible display device at one side opposite to the one side where infolding can be performed, and the infolding body 2 is connected to one side where infolding of the infolding body 1 can be performed, shares the minimum curvature section with the infolding body 1 at the one side where infolding can be performed, and supports an opposite end portion of the flexible display device at the first side.

3. The device according to claim 1, wherein a perimeter of an exposed edge of the body or out of the edge, in a perimeter of the keyboard unit, is formed by applying a protruding bumper or made of a soft material capable of absorbing shock so that the keyboard unit may absorb drop shock applied to the body or the flexible display device while the keyboard unit is attached to or stored in the keyboard application space.

4. The device according to claim 1, wherein state switching of the keyboard unit from the keyboard application space may be performed by linearly moving the keyboard unit in a direction parallel or perpendicular to a folding axis direction of the flexible display device regardless of a folded or unfolded state of the body, by rotating the keyboard unit after moving it to an end portion of the keyboard application space in a direction perpendicular to the folding axis direction of the flexible display device, or by attaching or detaching the keyboard unit regardless of the folding axis direction of the flexible display device when the surface on which the keyboard application space is formed is exposed.

5. The device according to claim 1, wherein the keyboard unit is provided with a charging means including a battery and a charging terminal.

6. The device according to claim 1, wherein a keyboard unit sensing means for sensing whether the keyboard unit has been separated from or coupled to the keyboard application space is applied to any one of the keyboard unit and the body.

7. The device according to claim 1, wherein the keyboard unit includes a keyboard body, in which four or more rows of parallel keys are arranged on one side, wherein a folding groove is formed in a keyboard body portion located at a free end portion of the infolding body 2 or the lower body so that the keyboard body portion out of the free end portion of the infolding body 2 or the lower body may be rotated and folded toward the vertical surface of the free end of the infolding body 2 or the lower body.

8. The device according to claim 7, wherein keys of a fifth row are applied in an area between an end portion of the keyboard body parallel to the folding groove and the folding groove.

9. The device according to claim 1, wherein the keyboard unit includes:
a keyboard body having keys arranged on one side; and
a camera unit including a rotatable camera module, and a supporting arm of a predetermined length, an end of which is assembled at one side of the keyboard body in a rotatable state, having a rotation support piece formed at an opposite end to rotate and support the camera module,
wherein the keyboard body includes, on one side, a camera module storage space formed to store and rotate the camera module without interference with individual keys of the keyboard body, a supporting arm storage groove formed to store and maintain the supporting arm without interference with individual keys of the keyboard body, and a support slope surface formed at an end portion of the supporting arm storage groove to apply a contact sustaining force to the supporting arm so that the supporting arm rotating and protruding from the supporting arm storage groove may maintain a predetermined angle and a standing state without help of an external force.

10. The device according to claim 9, wherein the supporting arm protrusion sensing means capable of sensing a stored or a rotating and protruding state of the supporting arm is applied to the keyboard body or the camera unit of the keyboard unit.

11. The device according to claim 9, wherein a length of the supporting arm is fixed and invariant or may be extended by applying a multi-stage sliding or rotating shaft folding method.

12. The device according to claim 9, wherein the keyboard unit includes a hand position sensing means for sensing a user's hand entering a camera module area under the camera module in a character input state or a user's hand moving from the camera module area under the camera module toward the keys capable of inputting characters provided, at one end portion of the keyboard body located on an opposite side of the camera module storage space.

13. An image display device, comprising:
a flexible display device capable of being bent, rolled or expanded;
a body supported at a first side so that the flexible display device may be bent, rolled or expanded, and having a keyboard application space formed by removing an area to have a predetermined depth and range, from a portion of an exposed surface on an opposite side of the first side to which the flexible display device is applied, toward the first side, and a component related to attachment, detachment, storage and withdrawal of an object applied to the keyboard application space; and
a keyboard unit applied to the keyboard application space in a state capable of switching an application state to be coupled to and carried together with the body or to be detachable from the body, and performing a function as an input means by using a wired or wireless communication means,
wherein the body includes;
a center body for supporting a center portion of the flexible display device at the first side, including a component for performing outfolding at one side where folding can be performed, and including a minimum curvature section for securing a minimum curvature in case of an infolding state at an opposite side where folding can be performed;
an upper body including a component for performing outfolding on one side and connected to the center body to perform outfolding at an end portion of the flexible display device together with the center body, configuring a free end at an opposite end portion, and supporting an end portion of the flexible display device at the first side; and
a lower body sharing the minimum curvature section with the center body at one side connected to the center body and capable of performing infolding, configuring a free end at an opposite end portion, and supporting an opposite end portion of the flexible display device at the first side, and
wherein the keyboard application space is formed on an opposite side of a front surface of the upper body or on an opposite side of a front surface of the lower body, the keyboard application space is located outside the minimum curvature section on the opposite side of the front surface of the lower body.

14. The device according to claim 13,
wherein, when the keyboard application space is formed on the opposite side of the front surface of the lower body.

15. The device according to claim 13, wherein a display device cover for covering an all-time screen display surface of the flexible display device positioning one side of the upper body is formed to be extended or assembled as a separate component at an edge of the keyboard unit.

16. An image display device, comprising
a flexible display device capable of being bent, rolled or expanded;
a body supported at a first side so that the flexible display device may be bent, rolled or expanded, and having a keyboard application space formed by removing an area to have a predetermined depth and range, from a portion of an exposed surface on an opposite side of the first side to which the flexible display device is applied, toward the first side, and a component related to attachment, detachment, storage and withdrawal of an object applied to the keyboard application space; and
a keyboard unit applied to the keyboard application space in a state capable of switching an application state to be coupled to and carried together with the body or to be detachable from the body, and performing a function as an input means by using a wired or wireless communication means,
wherein the body includes:
an upper body for supporting one side portion of the flexible display device at the first side, and applying a configuration or a component for performing outfolding at one side where folding can be performed, and a rollable cover connected to one side of the upper body; and
a lower body for supporting an opposite side portion of the flexible display device at the first side, applying a configuration or a component for performing outfolding at one side where folding can be performed, and connected to the upper body, and
wherein the keyboard application space is formed in an area on the opposite side of the first side of the lower body where interference with the rollable cover does not occur.

17. The device according to claim 16,
wherein the body includes a component related to performing rolling on one end portion of the flexible display device,
the upper body supports a center portion of the flexible display device at the first side and includes a component related to performing outfolding at one side where outfolding can be performed and includes a component related to performing rolling on one end portion of the flexible display device at one side opposite to the one side where outfolding can be performed,
the lower body supports an opposite end portion of the flexible display device at the first side and applies a configuration or a component for performing outfolding at one side where folding can be performed and is connected to the upper body, and
the keyboard application space is formed in an area on an opposite side of the first side of the lower body, where interference with the rollable cover does not occur.

* * * * *